(12) United States Patent
Ushiyama et al.

(10) Patent No.: US 8,059,560 B2
(45) Date of Patent: Nov. 15, 2011

(54) TREE-TYPE NETWORK SYSTEM, NODE DEVICE, BROADCAST SYSTEM, BROADCAST METHOD, AND THE LIKE

(75) Inventors: Kentaro Ushiyama, Nagoya (JP); Yuji Kiyohara, Nagoya (JP); Hiroaki Suzuki, Nagoya (JP); Yasushi Yanagihara, Nagoya (JP); Hideki Matsuo, Nagoya (JP); Koichi Iijima, Higashikurume (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 891 days.

(21) Appl. No.: 11/979,623

(22) Filed: Nov. 6, 2007

(65) Prior Publication Data

US 2008/0089248 A1    Apr. 17, 2008

Related U.S. Application Data

(63) Continuation-in-part of application No. PCT/JP2006/309042, filed on Apr. 28, 2006.

(30) Foreign Application Priority Data

May 10, 2005  (JP) .................................. 2005-137677
Jun. 30, 2005  (JP) .................................. 2005-191905

(51) Int. Cl.
*H04L 12/56* (2006.01)
*H04L 12/28* (2006.01)
(52) U.S. Cl. ........................................ 370/254; 370/400
(58) Field of Classification Search ........................ None
See application file for complete search history.

(56) References Cited

U.S. PATENT DOCUMENTS

| 7,185,077 | B1 * | 2/2007 | O'Toole et al. | 709/223 |
| 2003/0101253 | A1 * | 5/2003 | Saito et al. | 709/223 |
| 2004/0088361 | A1 * | 5/2004 | Statman | 709/206 |
| 2006/0106836 | A1 | 5/2006 | Masugi et al. | |

FOREIGN PATENT DOCUMENTS

| JP | A 2003-169089 | 6/2003 |
| JP | A-2004-15507 | 1/2004 |
| JP | A 2004-166081 | 6/2004 |
| JP | A 2004-246790 | 9/2004 |
| JP | A 2004-341576 | 12/2004 |

OTHER PUBLICATIONS

Office Action issued in Japanese Patent Application No. 2005-137677, on May 11, 2010 (with translation).
Sep. 28, 2010 Office Action issued in Japanese Patent Application No. 2005-191905 (with translation).

* cited by examiner

*Primary Examiner* — Chirag Shah
*Assistant Examiner* — Srinivasa Reddivalam
(74) *Attorney, Agent, or Firm* — Oliff & Berridge, PLC

(57) ABSTRACT

A tree type network system including an information delivery device, a plurality of node devices, and an administration, wherein the node devices are connected in a tree-like shape via a communication route while placing the information delivery device in an uppermost level and forming a plurality of hierarchy levels, and the delivery information is sequentially transferred from the node device in an upper hierarchy level to the node devices in lower hierarchy levels, wherein the administration device includes: a device for acquiring attribute information of a node device, which transmits participation request information, and determines device information on the basis of the attribute information thus acquired upon receipt of participation request information of requesting device information of node device as connection candidate, and a device for transmitting the connection end candidate date information thus determined to the node device which transmits the participation request information.

36 Claims, 32 Drawing Sheets

FIG. 5B

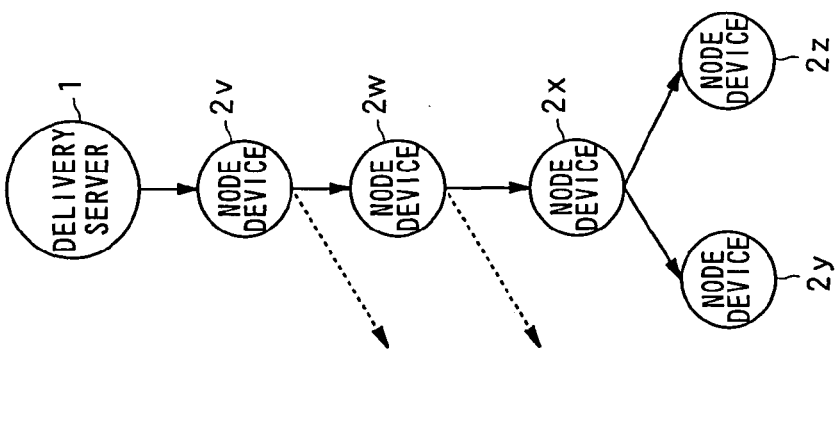

ADMINISTRATION SERVER
100

FIG. 5A

PARENT CANDIDATE NODE DEVICE INFORMATION LIST L1{}
SAVED IN MEMORY UNIT 12 OF NODE DEVICES 2y AND 2z

| NODE DEVICE | DEVICE INFORMATION ||||||
|---|---|---|---|---|---|---|
| | ATTRIBUTE INFORMATION | DELIVERY ABILITY INFORMATION | HIERARCHY INFORMATION | DESCENDANT NODE DEVICE NUMBER INFORMATION | TOP INFORMATION | IP ADDRESS INFORMATION |
| 2v | A1 | 4 | 1 | 16 | Yes | 100.101.101.1 |
| 2w | A2 | 3 | 2 | 9 | Yes | 100.101.101.2 |
| 2x | A3 | 2 | 3 | 2 | Yes | 100.101.101.3 |
| 2y | A3 | 2 | 4 | 0 | No | 100.101.101.4 |
| 2z | A4 | 2 | 4 | 0 | Yes | 100.101.101.5 |

FIG. 5C

DEVICE INFORMATION OF TOP NODE SAVED IN MEMORY
UNIT 102 OF ADMINISTRATION SERVER 100

| ATTRIBUTE INFORMATION | A1 | A2 | A3 | A4 |
|---|---|---|---|---|
| DEVICE INFORMATION OF TOP NODE DEVICE | DEVICE INFORMATION OF NODE DEVICE 2v | DEVICE INFORMATION OF NODE DEVICE 2w | DEVICE INFORMATION OF NODE DEVICE 2x | DEVICE INFORMATION OF NODE DEVICE 2y |

FIG. 6A

DEVICE INFORMATION OF NODE DEVICE 2t INCLUDED IN CONNECTION REQUEST INFORMATION Sr

| ATTRIBUTE INFORMATION | DELIVERY ABILITY INFORMATION | DESCENDANT NODE DEVICE NUMBER INFORMATION | IP ADDRESS |
|---|---|---|---|
| A3 | 1 | 0 | 100.101.101.9 |

FIG. 6B

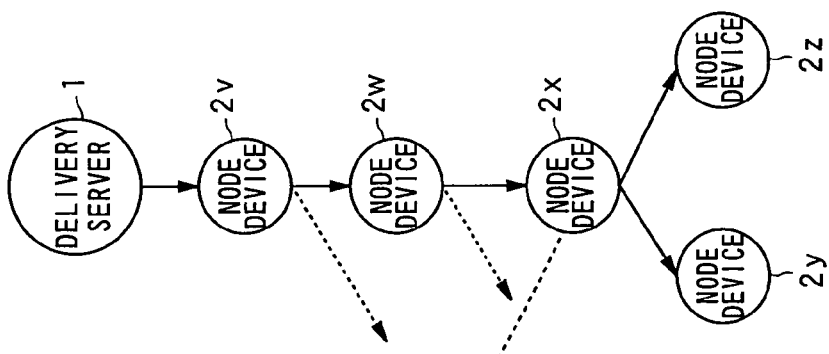

FIG. 6C

CHILD NODE DEVICE INFORMATION LIST L2{} SAVED IN MEMORY UNIT 12 OF NODE DEVICE 2x

| NODE DEVICE | DEVICE INFORMATION | | | | | |
|---|---|---|---|---|---|---|
| | ATTRIBUTE INFORMATION | DELIVERY ABILITY INFORMATION | HIERARCHY INFORMATION | DESCENDANT NODE DEVICE NUMBER INFORMATION | TOP INFORMATION | IP ADDRESS INFORMATION |
| 2y | A3 | 2 | 4 | 0 | No | 100.101.102.4 |
| 2z | A4 | 2 | 4 | 0 | Yes | 100.101.102.5 |
| 2t | A3 | 1 | 4 | 0 | No | 100.101.102.9 |

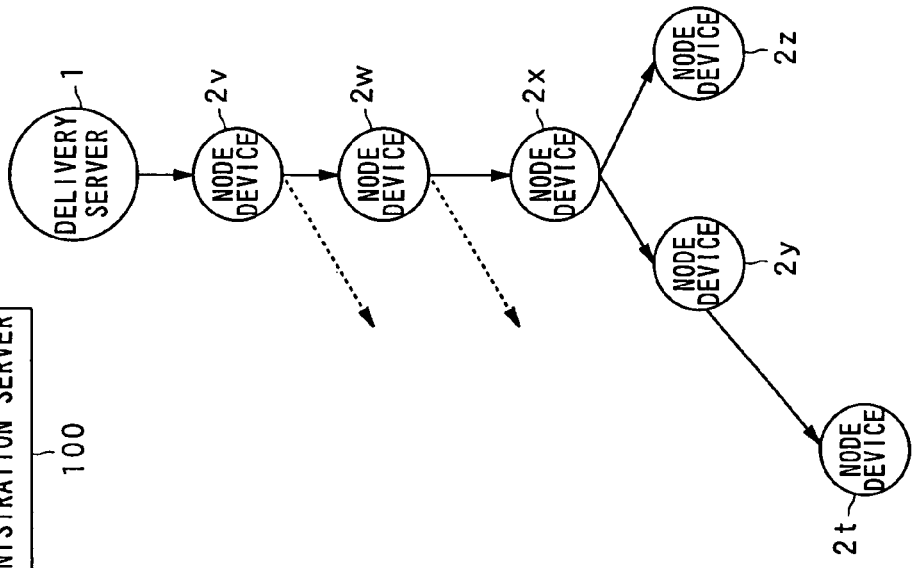

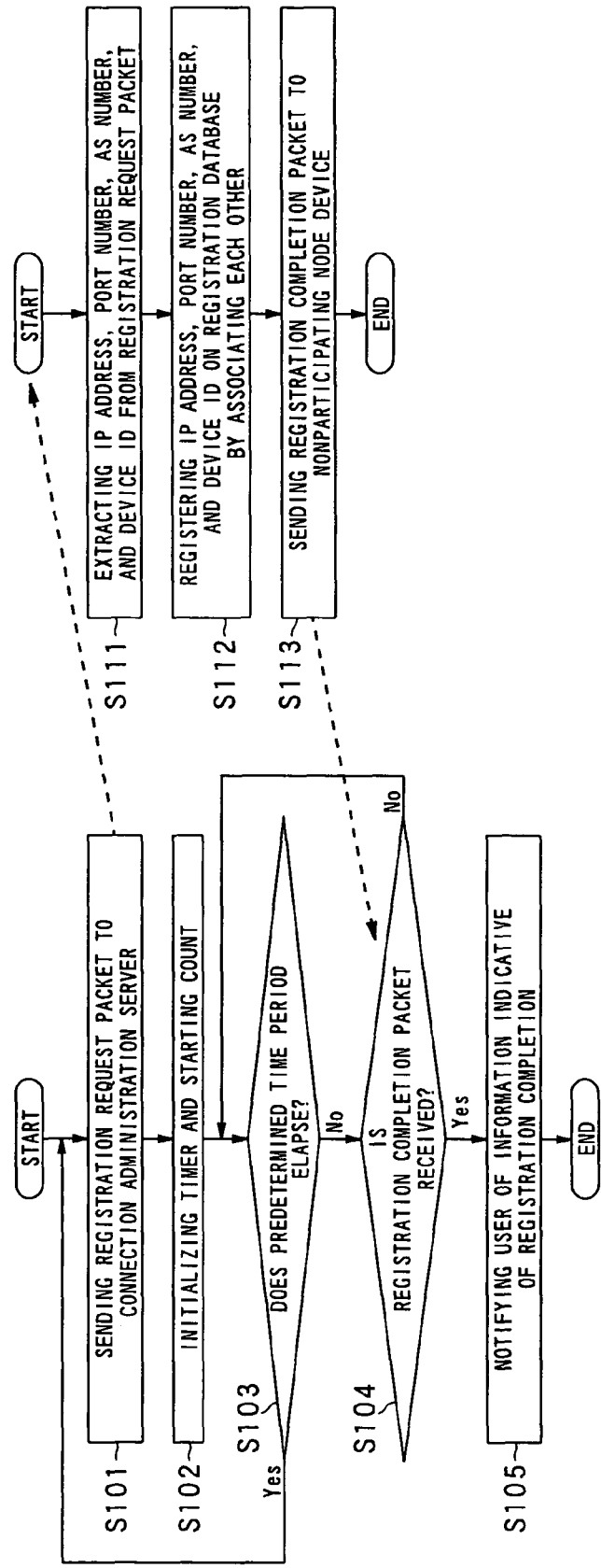

PROCESS IN NONPARTICIPATING NODE DEVICE

PROCESS IN CONNECTION ADMINISTRATION SERVER

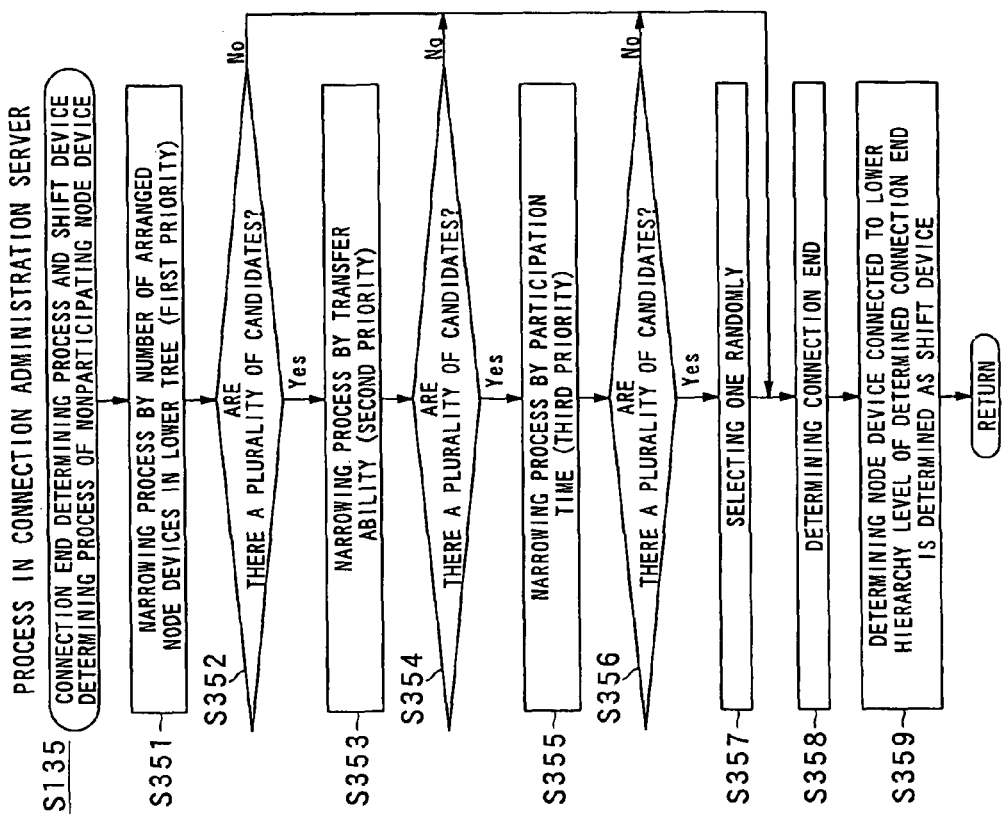
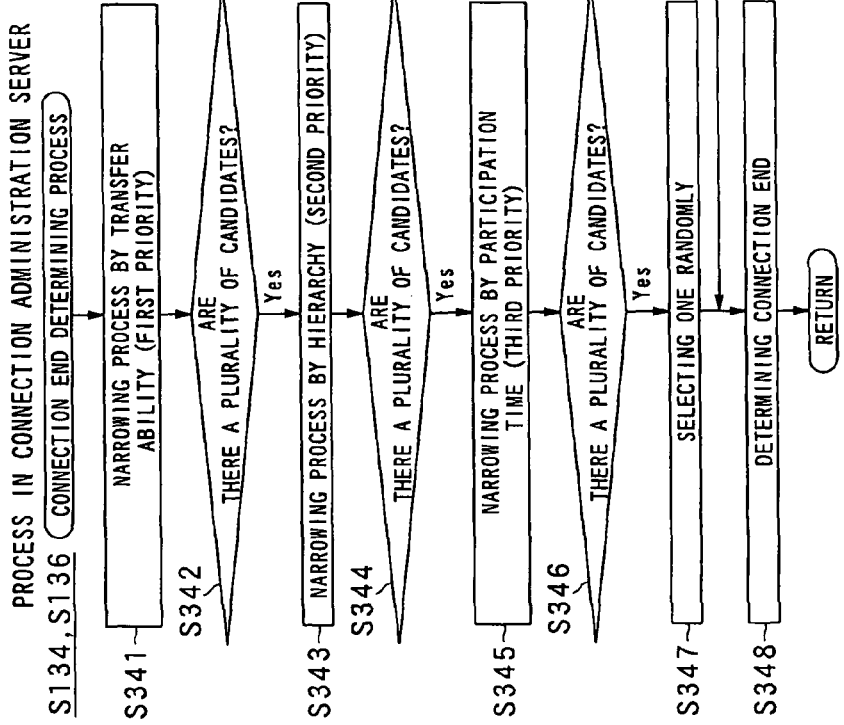

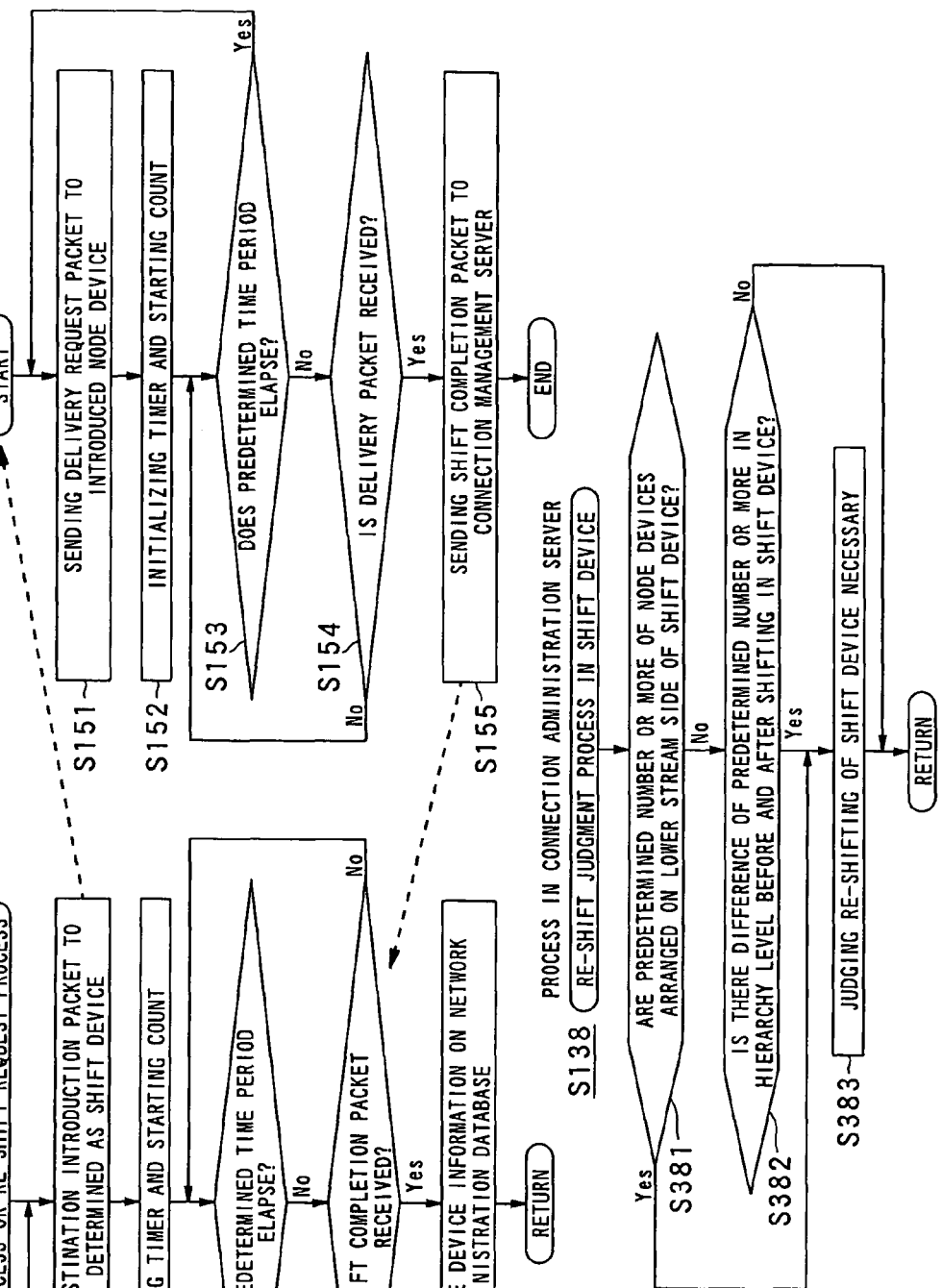

TREE-TYPE NETWORK SYSTEM, NODE DEVICE, BROADCAST SYSTEM, BROADCAST METHOD, AND THE LIKE

CROSS REFERENCE TO RELATED APPLICATION

This is a Continuation-in-Part of International Application No. PCT/JP2006/309042 filed Apr. 28, 2006, which claims the benefit of Japanese Applications No. 2005-137677 filed May 10, 2005 and No. 2005-191905 filed Jun. 30, 2005. The disclosure of the prior applications is hereby incorporated by reference herein in their entirety.

BACKGROUND OF THE INVENTION

1. Field of the Invention

The present invention relates to the technical field of a node device and the like in a tree type network system or a broadcast system and especially, relates to a technical field of a tree type network system, a node device and the like of the system, and a connection administration device for managing connection status between a broadcast station and each of node devices and connection administration method in a broadcast system in which a node device itself decides connection status in consideration of device information of each other.

2. Discussion of the Related Art

In recent years, in a network environment technology such as the internet, a content data distribution delivery technique which enables delivery of content data between user terminal devices is especially proposed.

This system is a so-called peer-to-peer type content data delivery system. Unlike a client server type content delivery system, transmission and reception of stream delivered content data is performed between node devices as clients. When a node device participates in the system, the node device is connected to any of node devices which configure the system to receive content data, and the data is transferred (relayed) to a lower stream (lower hierarchy level) node device. Moreover, each of the node devices can leave the network arbitrarily or can be connected to an upper stream (upper hierarchy level) node device according to a predetermined condition.

In general, such a topology (connection relation) is managed by a dedicated server and a node device which newly participates in the system acquires location information of an already-participated node device, which is to be connection destination, (for example, IP address and port number) from the dedicated server to be connected to the already-participated node device. That is, the dedicated server decides a node device to which a node device newly participating in the system is to be connected to receive delivery of content data.

On the other hand, as disclosed in Patent Document 1, a distribution administration type network file system in which each of node devices has topology information for recognizing network connection relation, and without necessity of a dedicated server as mentioned above, each node device is connected to a node device recognized by the topology information has been proposed.

Patent Document 1: Japanese Published Unexamined Patent Application No. 2003-169089

SUMMARY OF THE INVENTION

Meanwhile, in a peer-to-peer type information communication system where all node devices participating in the system have equal functions, when compared with a client server type information communication system, there is an advantage that network resources in the system can be efficiently utilized. However, on the other hand, there is a disadvantage that each of the node devices knows only information of node devices in the vicinity of the node device itself. Therefore, when a node device is to participate in this kind of content data delivery system, the node device inquires an administration server or the like, controlling entire connection mode of the system, of to which node device access (connection) is tried, and is connected to a node device, which already participates in the system, according to an instruction from the administration server.

Therefore, when a certain node device withdraws from the system, a node device, connected as a lower hierarchy of the withdrawn node device and receiving content data, must inquire an administration server of another node device, to which the node device can connect, wherein administration server is temporarily applied with excessive load and the entire system suffers from bad influence.

Moreover, a tree type network system is configured that content data delivered from the uppermost level delivery server such as a broadcast station device is sequentially transferred from an upper stream node device to a lower stream node device. Therefore, a node device in the upper stream has more important role as provider for service than a lower stream node device. Accordingly, in order for configuring of a more stable system, it is desirable to locate a node device having higher delivery adequacy on an upper side of stream. In other words, it is desirable that a node device having delivery ability high enough to be used as a delivery server is arranged in an upper side of stream.

However, to realize optimum allocation, an administration server should completely grasp attribute information and ever-changing connection structure of all node devices. Moreover, since optimization and reallocation of the entire system is carried out every time a node device participates in or withdraws from the system, load is applied not only to the administration server but also to the entire system.

In addition, the internet can be regarded as an aggregation of network configured by the internet service providers (ISPs) as providers of various internet connection services and each of the ISPs (network of the ISP) is connected with each other by internet exchange. Then, each of node devices in a content delivery system belongs to any of the ISPs and when certain content data is transmitted from one node device to other node device and ISPs to which the node devices belong to differ from each other (in other words, when the network connection groups differ), the content data is transmitted via (over) the internet exchange.

When content data is thus transmitted via (over) the internet exchange, in many cases, the data passes along network route (in other words, number of HOP increases). Therefore, there arises a problem that probability of occurrence of lack or delay of data packet, forming the content data, becomes high. However, there is a content delivery system having a topology between node devices, configured without giving consideration to such the problem.

The present invention is made in consideration of the above problems, and the first object is to provide a tree type network system having node devices each optimally allocated, and a node device, information delivery method and the like in the system.

Moreover, the second object is to provide a connection administration device, connection administration method, broadcast system, and the like, which enable configuration of a topology where lack or delay of data packet is reduced even in a case where a plurality of node devices, belonging to different network connection groups such as an ISP, participate in a broadcast system.

With the above problems being taken into consideration, according to a first aspect of the present invention there is provided a tree type network system having an information delivery device for delivering delivery information, a plurality of node devices for receiving the delivery information, and an administration device for receiving participation request information indicative of participation request transmitted from the node device when the node device participates in the system, wherein the plurality of node devices are connected in a tree-like shape via a communication route while placing the information delivery device in an uppermost hierarchy level and forming a plurality of hierarchy levels, and the delivery information transmitted from the information delivery device is sequentially transferred from the node device in the uppermost hierarchy level to the node devices in lower hierarchy levels, wherein the administration device including:

a memory means for saving device information of a predetermined number of node devices with respect to each attribute information of the node devices;

a participation request information receiving means for receiving the participation request information of requesting device information of a node device, being a candidate to be connected, from the node device which is to participate in the tree type network system;

an attribute information acquisition means for acquiring attribute information of a node device which transmits the participation request information;

a connection end candidate information determining means for determining device information to be connection end candidate information on the basis of the device information of the information delivery device and the attribute information thus acquired among device information of the node device thus saved by the memory means; and a connection end candidate information transmission means for transmitting the connection end candidate information thus determined to the node device which transmits the participation request information, wherein the node device including:

a participation request information transmission means for transmitting the participation request information to the administration device at a time of participating in the tree type network system;

a connection end candidate information receiving means for receiving the connection end candidate information thus transmitted from the administration device;

a connection request information transmission means for transmitting connection request information requesting connection to the node device or the information delivery device concerning the connection end candidate information thus received;

a connection request information receiving means for receiving the connection request information thus transmitted from another node device;

a judgment means for judging whether or not the node device itself is connected when the connection request information receiving means receives the connection request information; and a node device connection means for connecting the node device which is a transmission end of the connection request information to the node device itself, and for transferring the delivery information by connecting the node device of the transmission end of the connection request information when it is judged that the node device of the transmission end of the connection request information should be connected to the node device itself.

According to the present invention, since each of the node devices participating in a system is connected with each other so that a node device having higher upper level adequacy becomes a parent node device based on such device information, it is possible to configure a more stable network system.

Moreover, according to the present invention, when participation request information requesting device information of a node device to be a connection end to which a new node device is to be connected is received from the new node device to be participating in a broadcast system upon participation into the system, affiliation information indicating a network connection group to which the new node device belongs to in the network is acquired and based on the acquired affiliation information and affiliation information indicating network connection groups to which each of already-participating node devices belongs to, for example, it is decided that a node device of which network connection group is the same as that of the new node device as a connection end and device information of the decided connection end is transmitted as connection end information to the new node device. Therefore, when a plurality of node devices which belong to different network connection groups such as ISP, it is possible to configure a topology so that transmission of broadcast information via (over) internet exchange is reduced and, consequently, lack or delay of data packet can be reduced.

BRIEF DESCRIPTION OF THE DRAWINGS

FIG. 5(A) is a view showing parent candidate node device information list L1{ }saved in memory unit 12 of a node device 2*y* and a node device 2*z*.

FIG. 5(B) is a view showing an example of a tree type network system S. (C) A view for showing device information of a top node device saved in memory unit 102 of the administration server 100.

FIG. 6(A) is a view showing device information of a node device 2*t* included in connection request information Sr.

FIG. 6(B) is a view showing an example of the tree type network system S.

FIG. 6(C) is a view showing child node device information list L2 { } saved in the memory unit 12 of the node devices 2*y* and 2*z*.

FIG. 7(A) is a view showing parent node device information list L1 { } saved in the memory unit 12 of the node device 2*t*.

FIG. 7(B) is a view showing an example of the tree type network system S.

FIG. 29(A) is a flowchart showing registration request process in a control unit 221 of a nonparticipating node device.

FIG. 29(B) is a flowchart showing registration receiving process in a control unit 335 of the connection administration server 300.

FIG. 31(A) is a flowchart showing details of connection end determining process in Steps S134 and S136 shown in FIG. 30 (B).

FIG. 31(B) is a flowchart showing details of connection end determining process and shift device determining process in Step S135 shown in FIG. 30 (B).

FIG. 32(A) is a flowchart showing details of shifting request process and re-shifting request processing in Steps S137 and S145 shown in FIG. 30 (B).

FIG. 32(B) is a flowchart showing shifting process in the control unit 221 of the node device 2 as a shifting device.

FIG. 32 (C) is a flowchart showing details of re-shifting judgment process of the shift device in Step S138 shown in FIG. 30 (B).

DETAILED DESCRIPTION OF THE PREFERRED EMBODIMENTS

Figure 1:
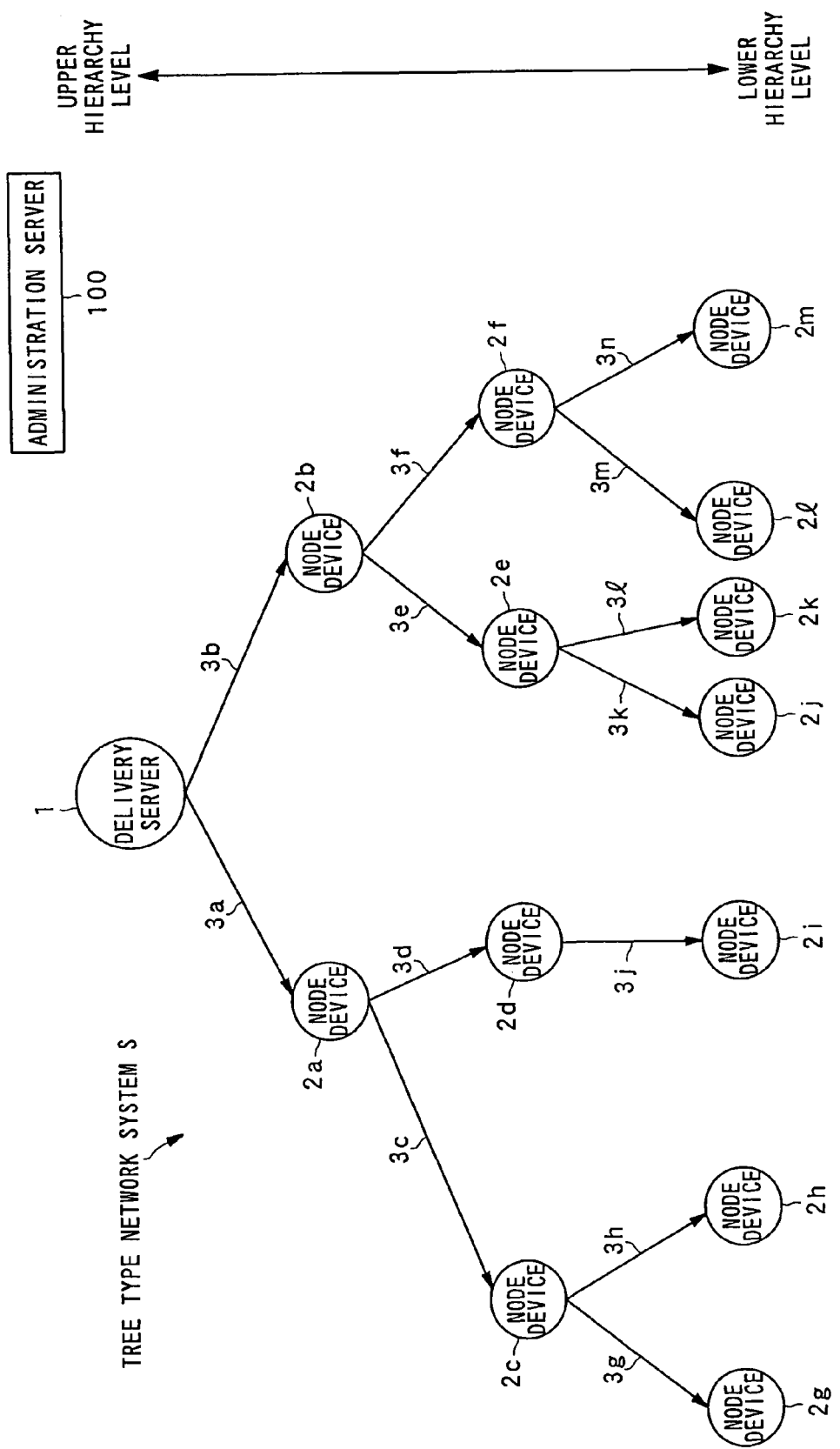
FIG. 1 is a block diagram showing schematic structure of a tree type network system S according to a first embodiment.

Preferred embodiments of the present invention will be described as follows. Hereinafter, each designation of numerical reference in the drawings is typically as follows:

2 (2a, 2b, 2c, ... ): node device;
11: control unit;
12: memory unit;
13: buffer memory;
14: decoder unit;
15: image processing unit;
16: display unit;
17: audio processing unit;
18: speaker;
19: communication unit;
20: input unit;
21: bus;
100: administration server;
101: control unit;
102: memory unit;
103: communication unit;
104: bus;
S: tree type network system;
1: delivery server;
3 (3a, 3b, 3c): communication route;
Sc: connection end candidate request;
Nk{ }: connection end candidate;
(Nk{ }): connection end candidate notification;
L1{ }: parent candidate node device information list;
L2{ }: child node device information list;
Sr: connection request information;
200: broadcast station device;
211: control unit;
212: memory unit;
213: accelerator for encryption;
215: communication unit;
216: input unit;
217: bus;
2 (2a, 2b, 2c, ... ): node device;
221: control unit;
222: memory unit;
223: buffer memory;
224: accelerator for decryption;
225: decoder unit;
226: image processing unit;
227: display unit;
228: audio processing unit;
229: speaker;
229a: communication unit;
229b: input unit;
229c: IC card slot;
229d: bus;
229e: IC card;
300: connection administration server;
335: control unit;
336: memory unit;
337: communication unit;
338: bus; and
NT: net work.

First Embodiment

Hereafter, best embodiments of the present invention will be explained on the basis of figures. Note that the embodiments explained below are embodiments for the cases where the present invention is applied to a tree type computer network system.

[1. Configuration of Tree Type Network System]

First, with reference to FIG. 1, schematic structure and the like of a tree type network system according to a first embodiment will be explained.

FIG. 1 is a view for showing an example of connection status of each device in a tree type network system according to the first embodiment. In the example of FIG. 1, electronic connection status between each device in a tree type network system S (for example, connection relation such as establishment of communication between devices) is shown. In the present embodiment, a node device as a receiving device in the present invention reproduces content delivered from a delivery server 1 while temporarily saving the delivered content in a buffer memory included in a node device 2.

The tree type network system S is configured by including, as shown in FIG. 1, the delivery server 1 (information delivery device) which delivers content data such as streaming data as delivery information and a plurality of node devices (peers) 2a, 2b, 2c, . . . , 2n to receive content delivered from the delivery server 1 and is a peer to peer (P2P) network system.

Moreover, in the tree type network system S, the plurality of node devices 2a to 2n form a plurality of hierarchy levels with the delivery server 1 as top thereof and, at the same time, are connected via a plurality of communication routes 3a, 3b, 3c, . . . , 3n in a tree shape.

Then, content delivered from the delivery server 1 is sequentially transferred from upper hierarchy node devices 2a, 2b, and the like to lower hierarchy node devices 2g to 2n. Note that in the following explanation, there may be cases where any of node devices 2a to 2n will be called node device 2 for the convenience of explanation.

Furthermore, the delivery server 1 and the plurality of node devices 2a to 2n are physically connected to an Internet network by IX (Internet exchange), ISP (Internet Service Provider), DSL (Digital Subscriber Line) provider ('s device), Fiber To The Hone (FTTH) provider ('s device), communication line (for example, telephone line or optical cable) or the like and unique device ID and IP (Internet Protocol) address are allocated to the delivery server 1 and each of the node device 2a to 2n.

Figure 2:
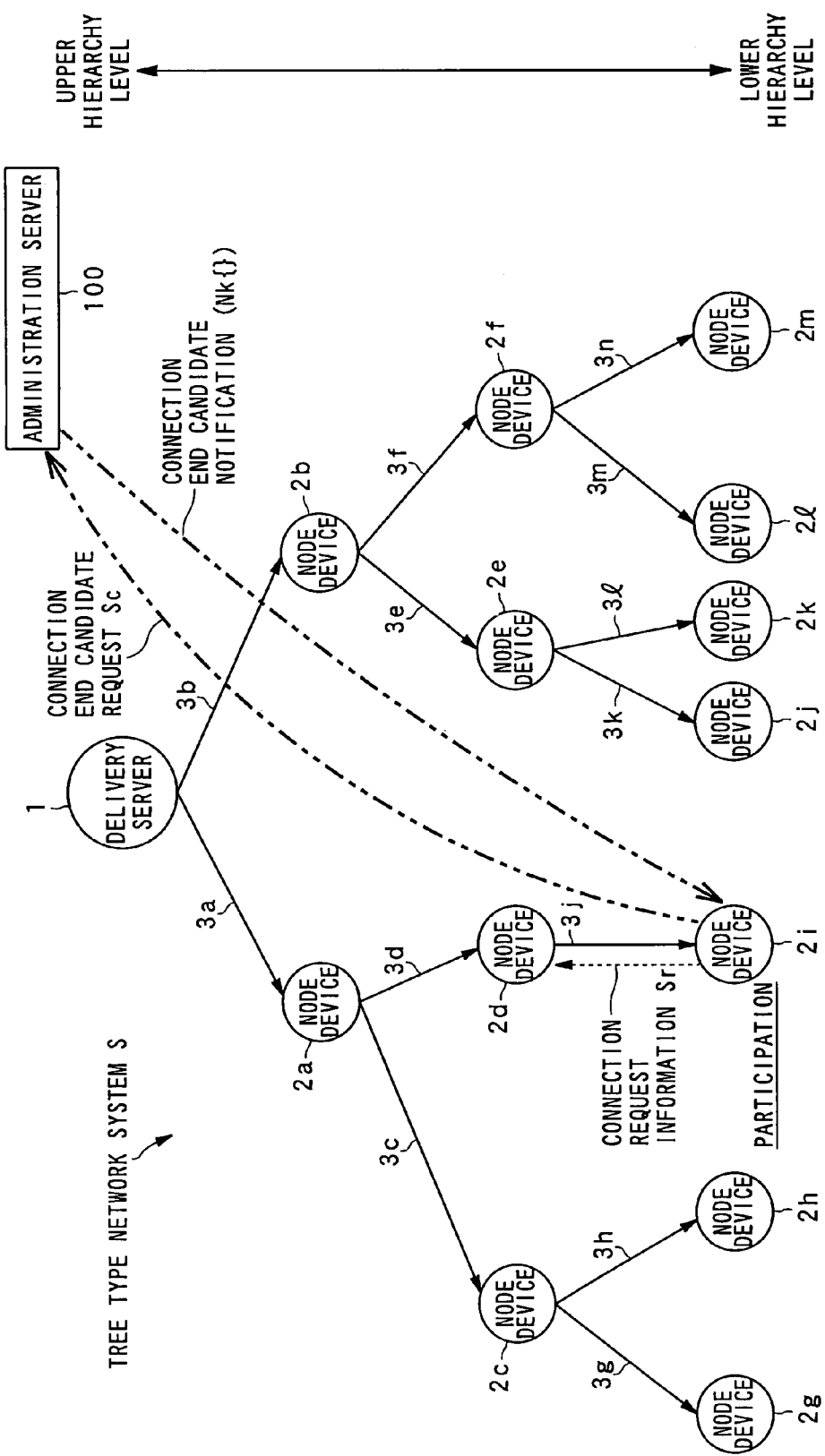
FIG. 2 is a view showing participation of a node device 2*i* into the tree type network system S.

In addition, because an administration server 100 saves device information of node devices, connected to the highest hierarchy with respect to each provider information, indicative of which node device 2 is connected to the network by which network connection service provider, for example as shown in FIG. 2, when a node device 2i requests participation into the network system S, i.e. it requests delivery of content delivered by the delivery server 1, the node device 2i transmits connection end candidate request Sc to the administration server 100 as shown by a dashed-dotted line in the figure to know which higher hierarchy node device 2 is a candidate to be connected with the node device 2i. Then, based on provider information (hereinafter referred to as "attribute information") indicating a network connection service provider to which the node device 2i is connected, the administration server 100 selects a node device 2d as a higher hierarchy node device 2 to which the node device 2i is to be connected and transmits device information of the node device 2d (including IP address) to the node device 2i as connection end candidate notification (Nk{ }), as shown by two-dot chain line in the figure.

Then, the node device 2i transmits connection request information Sr including device information of the self to request connection to a higher hierarchy node device 2 (according to an example shown in FIG. 2, to the node device 2d) to which the node device 2i is to be connected, based on the device information included in the connection end candidate notification (Nk{ }), as shown by a dotted line in the figure and upon reception of the request. When the node device 2d judges whether the node device 2d must transfer content to the node device 2i, that is, the node device 2d compares higher level adequacy while comparing device information of the node devices, and when it is judged that the upper level adequacy of the node device 2d is higher and therefore the content must be transferred to the node device 2i, connection between the node devices 2i and 2d is established via a communication route 3j.

In other words, the tree type network system in the present embodiment determines higher level adequacy indicating that the node device 2 must exist in the upper stream (higher hierarchy) of the tree on the basis of device information of each node device 2 or the attribute information to thereby autonomously determine connection status of each node device 2 in the system by each node device 2. to the upper level adequacy. Therefore, it is possible to configure a network system in which each node device 2 is optimally located.

[2-1. Configuration and Function of Node Device]

First, with reference to FIG. 3, configuration and function of the node device 2 will be explained. Each node device 2 has a same configuration.

Figure 3:
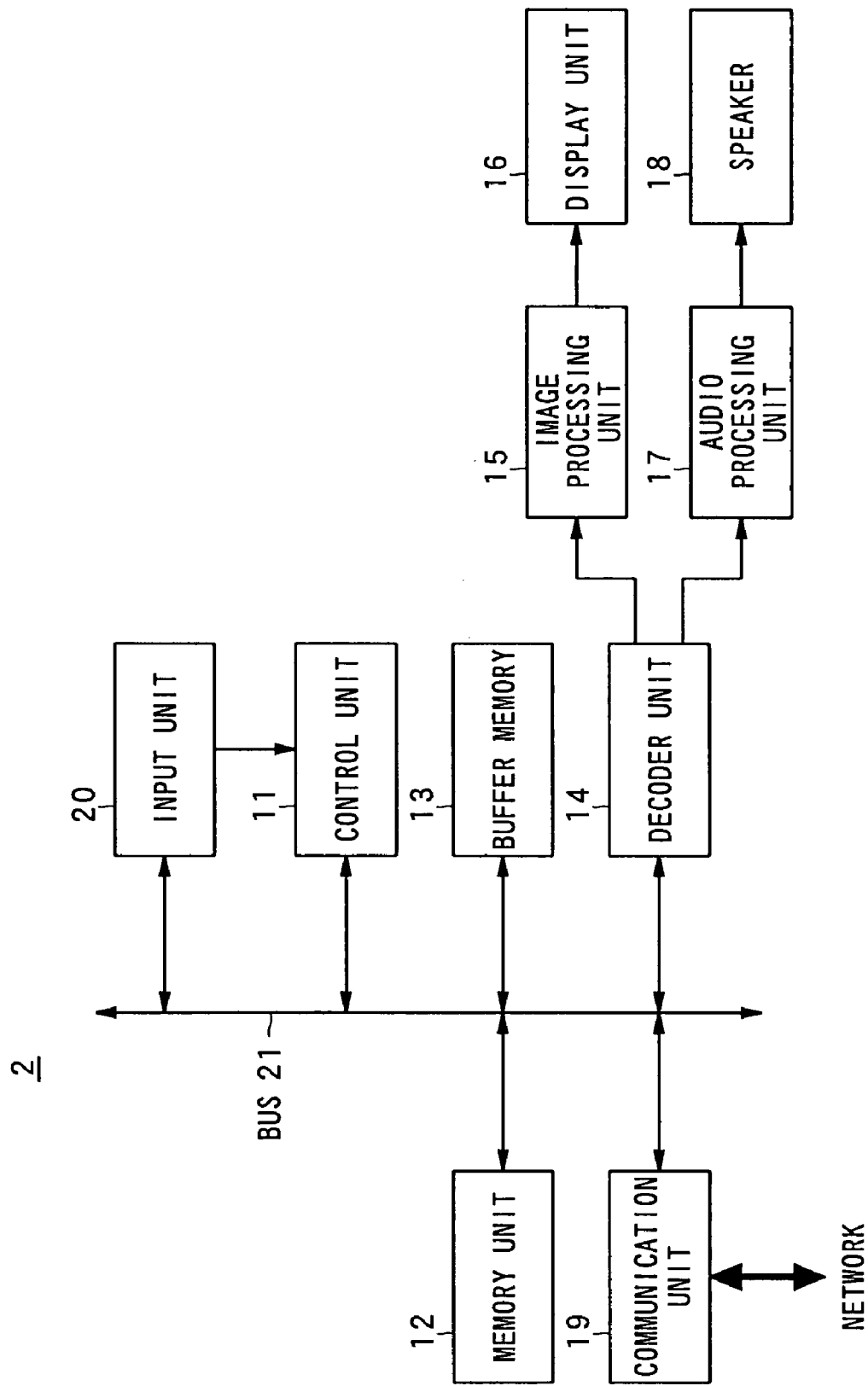
FIG. 3 is a block diagram showing configuration and function of a node device 2.

FIG. 3 is a view for showing an example of schematic structure of the node device 2 according to the first embodiment.

Each node device 2 is configured by including a control unit 11 configured by a CPU having computing function, a RAM for work, a ROM and the like for saving various data and programs, a memory unit 12 configured by an HDD or the like for saving and retaining (storing) programs (including processing programs of the present invention) or the like, a buffer memory 13 for temporarily storing received content data, a decoder 14 for decoding (stretching data, decrypt or the like) encoded video data (image information) and audio data (voice information) included in the content data, an image processing unit 15 for carrying out predetermined graphic processing to the decoded video data or the like to output the data as video signal, display unit 16 such as CRT or liquid crystal display for displaying image based on the video signal outputted from the image processing unit 15, audio processing unit 17 for converting the decoded audio data by digital/analog (D/A) conversion into analog audio signal and thereafter amplifying the converted signal by an amplifier to output, a speaker 18 for outputting the audio signal outputted from the audio processing unit 17 as acoustic wave, communication unit 19 for performing communication control of information between other another node device 2, the administration server 100, or the delivery server 1 through the network, and input unit 20 which receives instruction from a user and provides instruction signal corresponding to the instruction to the control unit 11 (for example, such as an operation panel, a mouse, or a keyboard) and the control unit 11, the memory unit 12, the buffer memory 13, the decoder unit 14, and the communication unit 19 are connected with each other via a bus 21.

The memory unit 12 functions as parent candidate device memory means and child node device memory means, and in the later-described basic processing, generates and saves parent candidate node device information list L1{ } and child node device information list L2.

Moreover, in the memory unit 12, attribute information, hierarchy information, child node device information, IP address information, top information, delivery ability information, and the like of a node device 2 are saved as device information. Here, "attribute information" indicates affiliation information indicative of a network connection service group, to which the node device 2, as mentioned above, belongs in the network and more specifically, indicates provider information indicating that by which network connection provider the node device 2 is connected to the network. As an example, autonomous system (AS) number indicative of network connection service provider, which is connection provider and to which each node device is connected to participate in the network, is determined as attribute information.

Further, "hierarchy information" indicates number of hierarchy levels and is saved in the memory unit 12 after participation into the tree type network system. Furthermore, "descendant node device number information" indicates number of node devices (descendant node devices) connected to the lower stream of the node device 2 itself. In the present embodiment, number of child node devices is set to be "2" for all the time as delivery acceptable number indicating number of child node devices, which can be directly connected with each node device 2. "IP address information" indicates an IP address, which is destination information of the node device 2. Moreover, "top information" indicates, among all the node devices 2 participating in the tree type network system S, whether the node device is a top node device as the uppermost node device located in the uppermost hierarchy level among node devices 2 having the same attribute information and is saved in the memory unit 12 after participating into the system.

Furthermore, the "delivery ability information" indicates delivery ability of various kinds of data including content of the node device 2 and will be explained later in details. In addition, destination information such as IP address of the administration server 100, to which the node device 2 first makes an access to participate in the network system S, is also saved.

When the CPU of the control unit 11 executes processing programs saved in the memory unit 12 or the like, the control unit 11, while controlling the elements that configure the node device 2, functions as a participation request information transmission means, a connection end candidate information receiving means, a connection request information transmission means, a connection request information receiving means, a judgment means, a node device connecting means, a comparison means, a parent candidate device memory means, a parent device selecting means, a parent candidate device saving controlling means, a parent device cut-off means, an upper most node device replacement notification means, a child node device memory means, a child node device selecting means, a child node device cut-off means, a child node device saving controlling means, and a connection end candidate information transmission means.

[2-2. Configuration and Function of System Administration Server Device]

Next, with reference to FIG. 4 and the like, configuration and function of the administration server 100 will be explained.

Figure 4:
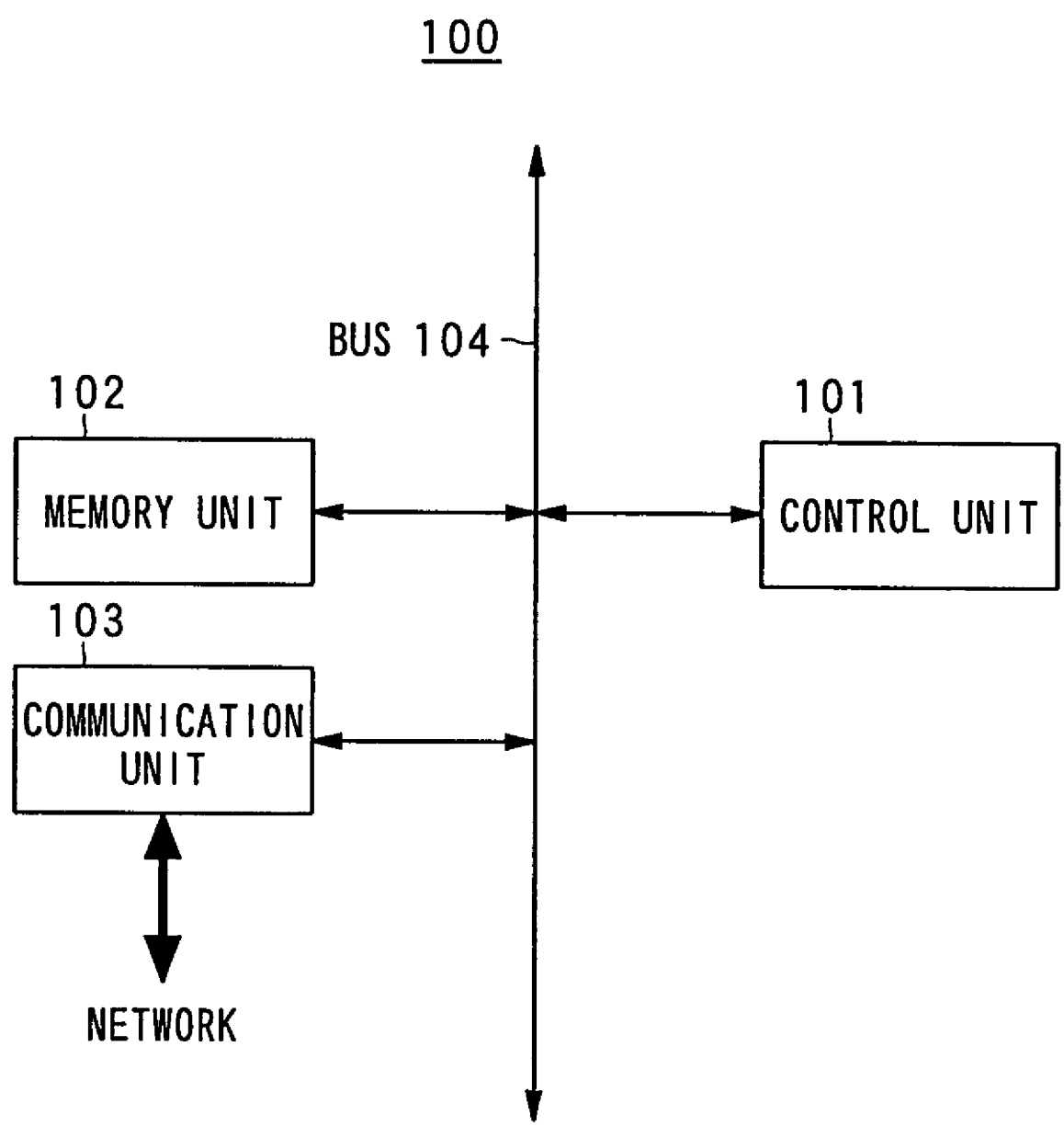
FIG. 4 is a block diagram showing configuration and function of an administration server 100.

FIG. 4 is a view schematically showing structure of the administration server 100.

The administration server 100, as shown in FIG. 4, is structured by including a control unit 101 configured by a CPU having computing function, a RAM for work, a ROM and the like for saving various data and programs, a memory unit 102 configured by an HDD or the like for saving and retaining (storing) programs (including processing programs of the present invention) or the like, and communication unit 103 for performing communication with the delivery server 1 or node device 2 through the network and each of the component is connected with each other via bus 104.

Note that in the memory unit 102, device information of a top node device (uppermost node device), which is the highest node device 2, is saved for each attribute information of node devices 2 participating in the tree type network system S. Moreover, in the memory unit 102, device information of the delivery server 1 is also saved.

Then, when the CPU of the control unit 101 executes processing programs saved in the memory unit 102 or the like, the control unit 101, while controlling the elements that construct the administration server 100, functions as a memory means, a memory controlling means, a participation request information receiving means, an attribute information acquisition means, a connection end candidate information determining means, and a connection end candidate information transmission means. Hereafter, function of each of the means executed by the control unit 101 will be explained in detail.

[3. Configuration of Tree Type Network System]

Next, with reference to FIGS. 5 to 7, a method of configuring a tree type network system will be explained.

FIGS. 5 to 7 are views for explaining how a node device 2*t* participates in the tree type network system S, and FIGS. 5(A) and 5(B) are views for explaining parent candidate node device information list L1{ } saved in memory unit 12 of a node device 2*y* and a node device 2*z*, which are connected to the lowest hierarchy level.

As shown in FIG. 5 (B), the node devices 2*y* and 2*z* connected to the lowest hierarchy level receive content delivered from the delivery server 1 from a node device 2*x*, which is an upper hierarchy node device 2. In the following explanation, with regard to relationship between such a node device 2*x* and node devices 2*y* and 2*z*, the node device 2*x* is called a "parent node device" of the node devices 2*y* and 2*z*, and the node devices 2*y* and 2*z* are called "child node device(s)" of the node device 2*x*. Moreover, each of the node devices 2*y* and 2*z* commonly having the parent node device (in the example of the figure, the node device 2*x*) is called "brother node device".

In addition, a node device 2*v* transmits (transfers) content delivered from the delivery server 1 to a node device 2*w* which is a lower hierarchy node device 2. Then, receiving the content, the node device 2*w* transmits (transfers) the content to the node device 2*x*, which is a lower hierarchy node device 2 for the node device 2*w*. Thus, the content is transferred to the node devices 2*y* and 2*z*, which are connected to the lowest level of hierarchy. In the following explanation, with regard to relationship between such a node device 2*x* and all the node devices 2 existing on a communication route from the delivery server 1 to the node device 2*x* (node devices 2*x*, 2*w*, and 2*v*), node devices 2*x*, 2*w*, and 2*v*, are called "ancestral node devices" of the node device 2*z*. Moreover, with regard to relationship between such the node device 2*v* and node devices from the node device 2*w*, connected as a lower hierarchy of the node device 2*v* to the lowest hierarchy node devices 2*y* to 2*z* (i.e., node devices 2*w*, 2*x*, 2*y*, and 2*z*), the node devices 2*w*, 2*x*, 2*y*, and 2*z* are called "descendant node devices". Note that the descendant node device of the node device 2*v* is not limited only to the node devices 2*w*, 2*x*, 2*y*, and 2*z* shown in FIG. 5 (B). Node devices on a communication route from the node device 2*v* (and node device 2*w*) indicated by dotted lines in the figure, the node devices not illustrated but connected in the lower level of the node device 2*v* (and 2*w*), are also included, and there exist a total of "16" descendant node devices of the node device 2*v*. Therefore, the number of descendant node devices of the node device 2*v* is "16".

Then, as shown in FIG. 5 (A), in the memory unit 12 of the node devices 2y and 2z, device information of all the node devices 2 existing on a communication route from the delivery server 1 to the each of the node devices 2y and 2z, that is, device information of all the ancestor node devices is saved as parent candidate node device information list L1{ } (parent candidate device information). Here, a parent candidate node device means a candidate from node devices 2, which is to be a parent node device. In the parent candidate node device information list L1{ }, device information of parent candidate node devices are saved. With regard to the device information, including device information of a node device 2 which is a connection end candidate included in connection end candidate notification NK{ } received from the administration server 100 upon participation into the system, device information of other node device 2, which is a connection end candidate included in connection end candidate notification Nk{ } transmitted from the other node device 2 due to later-described various processing executed by other node device 2 participating in the system S during participation in the system S is added to parent candidate node device information list L1{ } and saved. Moreover, when the node device 2 performs various processes described later, update of the parent candidate node device information list such as addition and deletion of device information is performed.

According to the example shown in FIG. 5 (A), the node devices 2y and 2z save device information of the node devices 2v, 2w, 2x, 2y, and 2z in the parent candidate node device information list L1{ }.

Moreover, in the memory unit 102 of the administration server 100, device information of the top node device as the upper most node device is saved for each attribute information. More specifically, for example, as shown in FIG. 5 (C), a top node device, of which attribute information is "A1", is the node device 2v, a top node device, of which attribute information is "A2", is the node device 2w, a top node device of which attribute information is "A3" is the node device, 2x, and a top node device, of which attribute information is "A4", is the node device 2z. As such, device information of the top node devices for each attribute information is saved in the memory unit 102.

[3-1. Priority]

Here, priority in the tree type network system S will be explained with reference to the parent candidate node device information list L1{ } shown in FIG. 5 (A).

In the tree type network system S, a node device matching the following criteria has higher priority as a node device to be located in the upper stream. <1> delivery ability thereof is high; <2> number of hierarchy level number is small (already in upper stream); <3> number of descendant node devices is large; and <4> it is a top node device.

Here, explanation will be given about delivery ability in criterion <1>. A communication route 3 appended to a node device 2 can transmit content more quickly when effective bandwidth is larger. When the device itself has a high processing ability, or when the transmission rate is constant, the number of node devices which can be connected can be increased.

Moreover, with regard to continuous connection time of each of the node devices 2, the longer a node device 2 participates in the system S, the higher the possibility for the node device of keeping connection. Therefore, it can be evaluated that the node device is highly stable. In case where an amount of already received content data, still retained in a buffer memory, is large, it is possible to more stably deliver the data to another node device. Therefore, it is preferable to determine the delivery ability based on effective bandwidth of a communication route appended to a node device 2, processing ability of the device itself, continuous connection time, and amount of content data saved in a buffer memory.

In the present embodiment, delivery ability is determined based on effective bandwidth of a communication route 3 appended to a node device 2, processing ability and continuous connection time of the device itself.

Moreover, an explanation is given of the priority of a node device which should be in upper stream by use of device information, indicated in the parent candidate node device information list L1{ } shown in FIG. 5 (A). Because the node device 2v has the highest delivery ability with delivery ability information "4" (criterion <1>), has at present low hierarchy level number (criterion <2>), has many descendant node devices (criterion <3>), and is a top node device at present (criterion <4>), the priority of the node device 2v which should be in an upper stream has the highest priority. Therefore, the node device 2v is positioned in the uppermost stream in the tree type network system S shown in FIG. 5 (B).

The descendant node device of the node device 2v is not limited only to the node devices 2w, 2x, 2y and 2z, shown in FIG. 5 (B). Node devices on a communication route from the node device 2v (and node device 2w) indicated by dotted lines in the figure, and the node devices not illustrated but connected in the lower level of the node device 2v (and 2w), are also included. There exist a total of "16" descendant node devices of the node device 2v. Therefore, the number of descendant node devices of the node device 2v is "16".

Thus, according to the priority determined on the basis of delivery ability or number of descendant node devices, node devices 2w, 2x, 2y, and 2z are sequentially connected to thereby configure the system S.

More specifically, when a parent node device a node device 2 tried to be connected by each node device 2 is determined out of the parent candidate node device information list L1{ }, saved in the memory unit 12 of each of the node devices 2, such the parent node device is determined in accordance with "upper level priority" set on the basis of the above-mentioned priority criteria and attribute information of the device itself. Moreover, when each of the node devices 2 determines a child node device, a child node device is determined out of the child node device information list L2{ } in accordance with "lower level priority", determined on the basis of attribute information of the device itself and the above-mentioned priority. In other words, the attribute information is a network connection service group, to which the node device 2 belongs, showing connection area of a node device 2, and by connecting node devices 2 having the same attribute information, the devices are connected with each other via a communication route having relatively smaller communication load (for example, having less relays, in other words, having short network distance). For example, it is possible to reduce concentration of load (access) on a specific IP router or the like and to realize improvement of running efficiency of the system. The "upper level priority" and the "lower level priority" will be explained in the following [3-2. Participation into tree type network system] in detail.

[3-2. Participation into Tree Type Network System]

With reference to FIG. 6, it will be explained how a node device 2 participates in the tree type network system S.

FIG. 6 (A) is a view for showing device information of a node device 2t included in connection request information Sr for participation into the tree type network system S shown in FIG. 6 (B). FIG. 6 (C) is a view for showing the child node device information list L2{ } saved in the memory unit 12 of the node device 2x which receives the connection request information Sr.

Now, the node device 2t, which is going to newly participate in the system S, transmits connection end candidate request Sc to the administration server 100 as indicated by dashed-dotted line. It is assumed that the node device 2t saves destination information such as IP address of the administration server 100 in advance when shipped from a factory and in the connection end candidate request Sc, device information of the node device 2t is included. Then, upon receipt of the request, the administration server 100 transmits connection end candidate notification (Nk{ }) including device information, including IP address of a node device 2, to which the node device 2t is to request connection, as connection end candidate Nk.

The administration server 100 sets a top node device having the same attribute information as that of the node device 2t included in the connection end candidate request Sc as the connection end candidate Nk{ }. According to FIGS. 6 (A) and 5 (C), because attribute information of the node device 2t is "A3", the administration server 100 refers to the memory unit 102 and transmits connection end candidate notification (Nk{ }) including device information of the node device 2x as a top node device corresponding to the attribute information "A3".

Then upon receipt of the notification, the node device 2t transmits connection request information Sr to the node device 2x, as shown in the figure by a dotted line. It is assumed that, in the connection request information Sr, device information of the node device 2t is included.

Upon receipt of the connection request information Sr from the node device 2t, the node device 2x compares device information of the node device 2t included in the connection request information Sr with the device information of the self, and considers which is appropriate as a parent node (consideration on upper level adequacy).

Then, delivery ability and number of node devices 2 connected in the lower stream (that is, descendant node devices) of the both are compared, and it is judged that <1> one having higher delivery ability has higher upper level adequacy and <2> one having fewer descendant node devices has higher upper level adequacy. Therefore, according to the example shown in FIG. 6, since delivery ability of the node device 2t is "1" while that of the node device 2x is "2", it is understood that the node device 2x has higher upper level adequacy.

However, since delivery permissible number of the node device 2x is "2", the number is satisfied by the current child node devices 2y and 2z. This means the node device 2t cannot be connected as a child node device. Therefore, the node device 2x refers to the child node device information list L2{ } (FIG. 6 (C)), compares device information of each node device 2, and cuts-off a node device 2 having the lowest priority (lower level priority) as a child node device.

Then, delivery ability of each node device 2 and numbers of the node device connected in the lower stream (that is, a descendant node device) are compared and lower level adequacy (adequacy as a child node device) is set such that <1> a node device 2 having high delivery ability has high lower level adequacy, and <2> a node device 2 having more descendant node device has high lower level adequacy when the devices have similar delivery ability. Using this criterion, "lower priority" is determined in the order of <1> a node device 2 having the same attribute information and highest lower level adequacy, <2> a node device having different attribute information but highest lower level adequacy, <3> a node device 2 having the same attribute information, and <4> a node device 2 having different attribute information.

Therefore, according to the example shown in FIG. 6, the node device 2y having the same attribute information as the node device 2x and highest lower level adequacy has the highest priority, and followed by the node device 2z having different attribute information but high lower level adequacy. Finally, the node device 2t having the same attribute information but lower level adequacy has the lowest priority. Therefore, the node device 2x cuts off connection with the node device 2t having the lowest level priority. At this time, as parent candidate for the node device 2t, the node device 2x transmits connection end candidate notification (Nk{ }) including child node device information list L2{ } (FIG. 6 (C)), owning itself, as connection end candidate Nk to the node device 2t.

Receiving the notification, the node device 2t adds the connection end candidate Nk included in the connection end candidate notification (Nk{ }) to the parent candidate node device information list L1{ }, selects a node device 2 having the highest upper level priority as the parent node from node devices 2, included in the parent candidate node device information list L1{ }, and transmits connection request information Sr to the selected device to thereby request connection. Then, as shown in FIG. 7 (A), the node device 2t can be connected to the node device 2y, which is most appropriate as the parent node device of the node device 2t. FIG. 7 (A) is an explanatory view for explaining the parent candidate node device information list L1{ }, saved in the memory unit 12 of the node device 2t, which has finished participation into the tree type network system S.

A node device 2 having the highest upper level priority (a node device to be determined as a parent node device) is determined in consideration of the priority based on the delivery ability, and number of descendant node devices and the like, as explained in [3-1. Priority], and attribute information of the device itself. More specifically, "upper level priority" is determined by, in the order of: <1> a node device 2 having higher upper level adequacy, <2> a node device 2 having the same attribute information, and <3> a node device 2 which has as much as possible similar hierarchy information.

Meanwhile, "has higher upper level adequacy" means only judgment of whether or not upper level adequacy is higher, and does not mean judgment of whether or not "select a node device having the highest upper level adequacy from among all the node devices 2 that the node device knows". In other words, using the network connection method of the present embodiment, among node devices 2 in the upper stream, one with relatively high upper level adequacy is connected. Therefore, when it is simply provided that "one of node devices 2 having the highest upper level adequacy that the node device knows is selected", when a certain node device 2 withdraws from the system, concentration of connection occurs because descendant node devices try to be connected with an upper stream terminal. Therefore, in the above criteria, whether the node device 2 has higher upper level adequacy than the node device itself is judged only in <1>, and upper level priority is decided more strictly by criteria <2> and <3>.

Moreover, "having similar hierarchy information" in the criterion <3> means that there is small difference in numbers of hierarchy level, and, for example, in case of brother node devices, because their numbers of hierarchy level are the same, difference in number of hierarchy level is 0, wherein their hierarchy information can be said similar.

Therefore, upper level priority of a node device 2 having higher upper level adequacy (criterion <1>), same attribute information as the node device itself (criterion <2>), and similar hierarchy information (criterion <3>) is the highest, followed by one having higher upper level adequacy (criterion <1>) and same attribute information as the node device itself (criterion <2>); one having higher upper level adequacy (criterion <1>) and similar hierarchy information (criterion <3>); and one having higher upper level adequacy (criterion <1>), in an upper level priority descending order.

As explained above, each node device 2 refers to attribute information of other node devices 2 and that of the self, compares the information with each other, and each node device 2 autonomously configure a network to thereby configure the tree type network system S having higher reliability.

[3-3. Configuration Example of Tree Type Network System]

Next, with reference to FIGS. 8 to 19, an example of how a tree type network system S is configured will be explained more in detail. In the following explanation, a node device, of which attribute is "AX" (X is any number from 1 to 4) and delivery ability is "PX" (X is any number from 1 to 4), is denoted as a node device 2-AX-PX. The delivery ability is increased as the number becomes larger from "P1", "P2", "P3" to "P4".

Explanation will be given of operation when a plurality of newly participating node devices shown in right side columns in FIGS. 8 to 19 participate in the system in the sequence from the top of the column to the bottom.

Figure 8:
FIG. 8 is a view showing how a node device participates in the tree type network system S.
Figure 9:
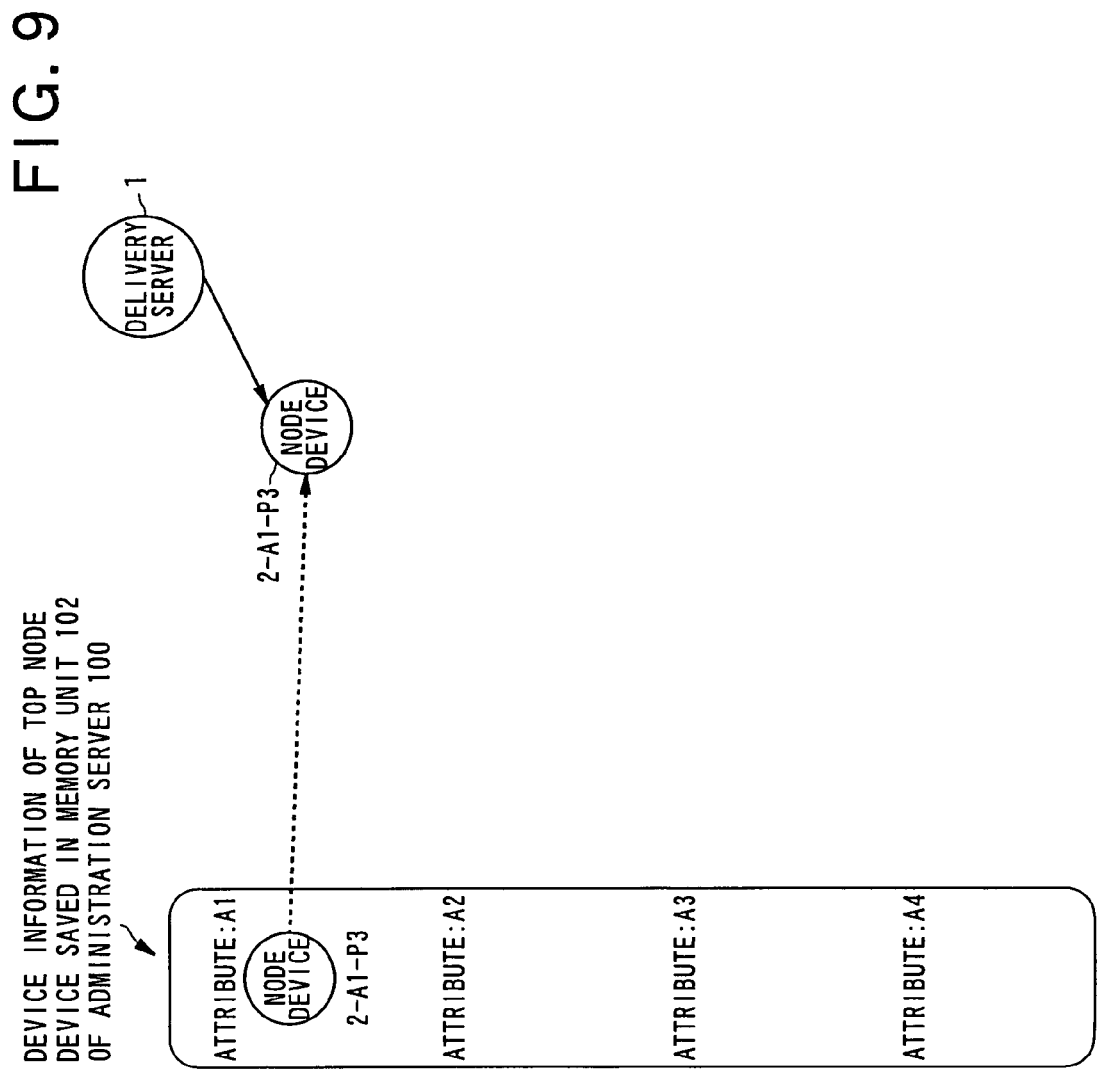
FIG. 9 is a view showing how a node device participates in the tree type network system S.

First, as shown in FIGS. 8 and 9, when a node device 2-A1-P3 (of which attribute is "A1" and delivery ability is "P3") transmits connection end candidate request Sc to the administration server 100, the node device 2-A1-P3 receives IP address of the delivery server 1 as connection end candidate notification (Nk{ }) from the administration server 100, and makes a connection to the delivery server 1 to thereby receive delivery of content based on this. Meanwhile, the administration server 100 causes the memory unit 102 to save attribute information of the node device 2-A1-P3 as attribute information of a top node device, having attribute of "A1".

Figure 10:
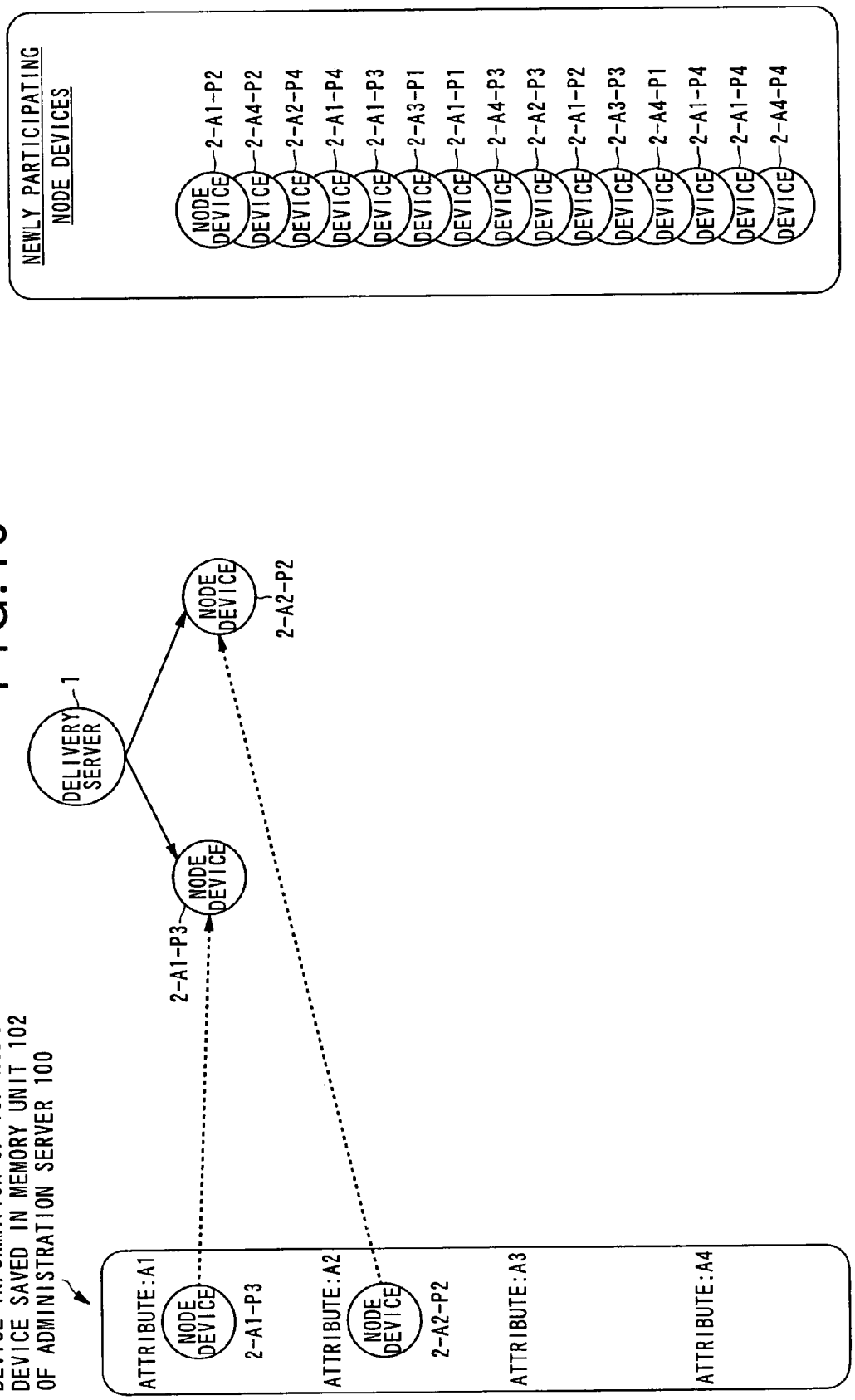
FIG. 10 is a view showing how a node device participates in the tree type network system S.

Subsequently, as shown in FIG. 10, a node device 2-A2-Pa transmits connection end candidate request Sc to the administration server 100, and since the administration server 100 has not fulfilled its delivery permissible number, the administration server 100 transmits IP address of the delivery server 1 as connection end candidate notification (Nk{ }) to the node device 2-A2-P2. Then, attribute information of the node device 2-A2-P2 is saved in the memory unit 102 as attribute information of a top node device of which attribute is "A2". The node device 2-A2-P2 is connected to the delivery server 1 and receives delivery of content.

Figure 11:
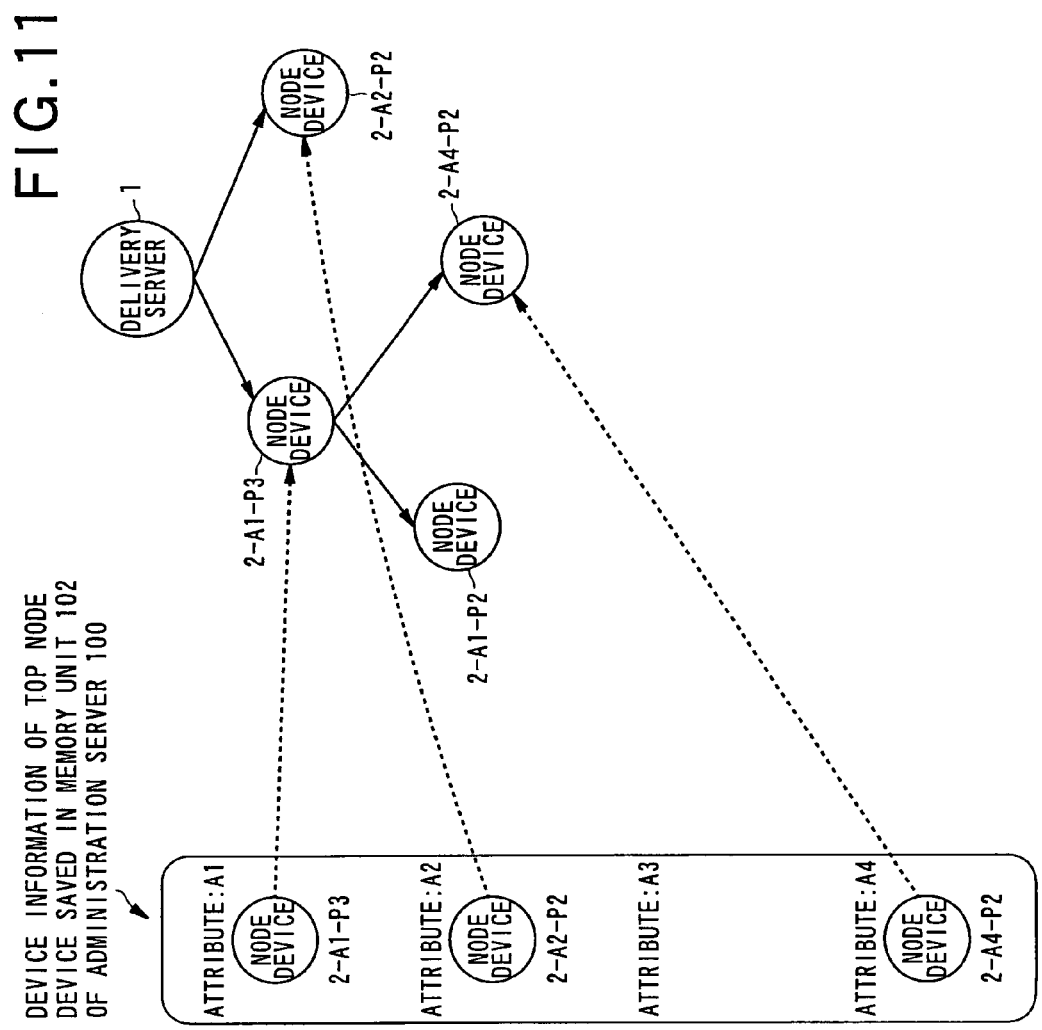
FIG. 11 is a view showing how a node device participates in the tree type network system S.

Then, as shown in FIGS. 10 and 11, when a node device 2-A1-P3 participates in the system, the administration server 100 teaches the node device 2-A1-P2 the attribute information of the node device 2-A1-P3, which is the top node device of attribute "A1", as connection end candidate notification (Nk{ }). The node device 2-A1-P2, which receives the notification, transmits connection request information Sr to the node device 2-A1-P3, which is the top node device of attribute "A1". Then, when the node device 2-A1-P3, which is the top node device of attribute "A1", receives the connection request information Sr, the node device 2-A1-P3 compares upper level adequacy of the node device 2-A1-P2, which has transmitted the connection request information Sr, and that of the node device 2-A1-P3. As a result, the node device 2-A1-P3 having higher delivery ability stays in the upper level, the node device 2-A1-P2 is connected as a child node device of the node device 2-A1-P3, and content is transferred to the node device 2-A1-P2 (vide FIG. 11).

Subsequently, when a node device 2-A4-P2 participates in the system, the administration server 100 received connection end candidate request Sc from the node device 2-A4-P2 does not memorizes a top node device of attribute "A4" in the memory unit 102. Accordingly, the administration server teaches the node device 2-A4-P2 device information including destination information of the delivery server 1 as connection end candidate notification (Nk{ }).

Upon receipt of the notification, the node device 2-A4-P2 transmits connection request information Sr to the node device 2-A1-P3. When the node device 2-A1-P3 receives the connection request information Sr, the node device 2-A1-P3 compares upper level adequacy of the node device 2-A4-P2 and the node device 2-A1-P3. As a result, the node device 2-A1-P3 having higher upper level adequacy stays in the upper level the node device 2-A4-P2 is connected thereto as a child node device and content is transferred to the node device 2-A4-P2.

Figure 12:
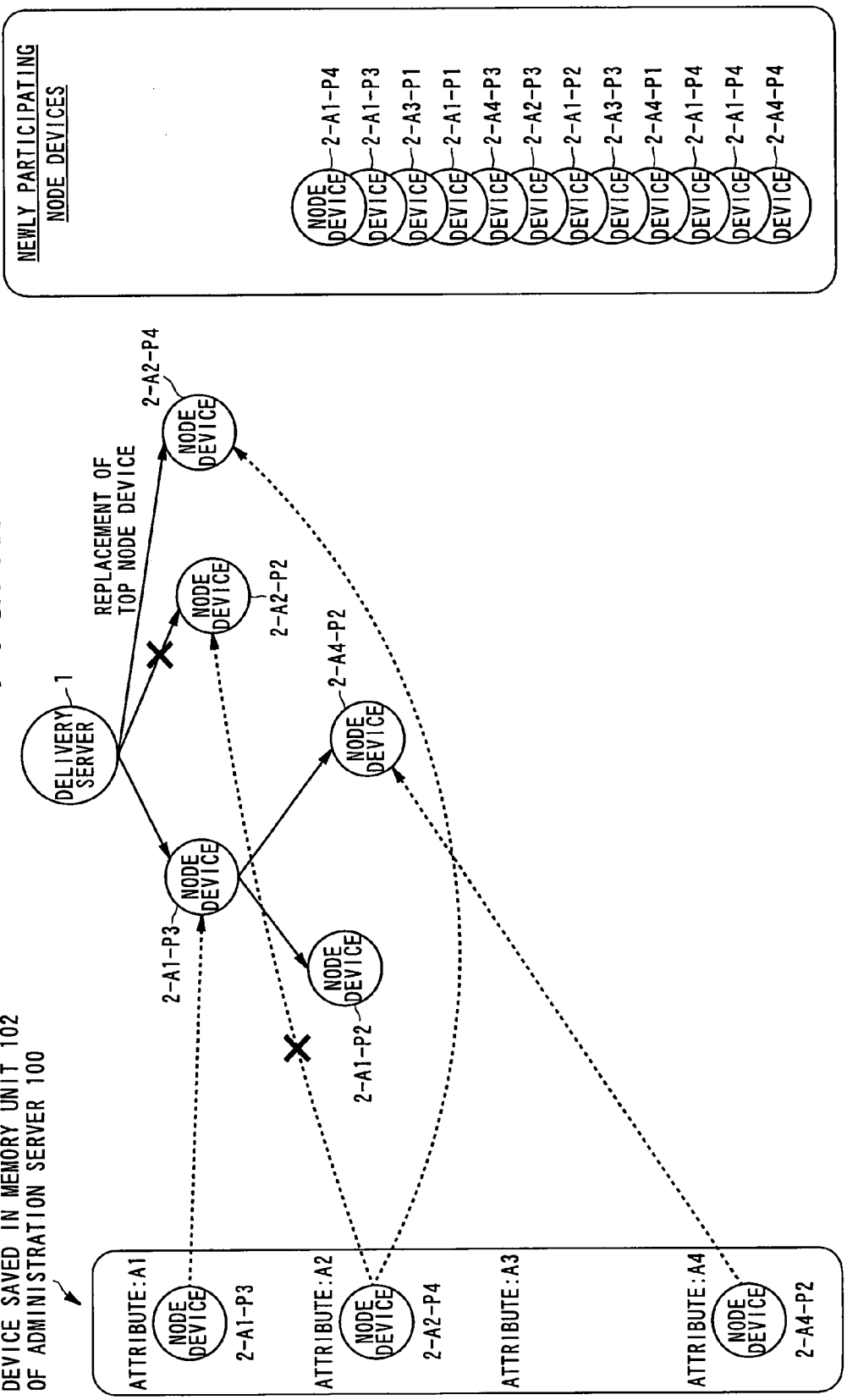
FIG. 12 is a view showing how a node device participates in the tree type network system S.

Next, as shown in FIGS. 11 and 12, when a new node device 2-A2-P4 transmits connection end candidate request Sc to the administration server 100 for the purpose of newly participating in the system S, and the administration server 100 receives the request. The administration server 100 teaches attribute information of the node device 2-A2-P2, which is a top node device of attribute "A2", as connection end candidate notification (Nk{ }). Upon receipt of the notification, the node device 2-A2-P4 transmits connection request information Sr to the node device 2-A2-P2. When the node device 2-A2-P2, which is the top node device of attribute "A2", receives the connection request information Sr, the node device 2-A2-P2 compares upper level adequacy of the node device 2-A2-P4 and the node device 2-A2-P2. As a result, the node device 2-A2-P4 having higher upper level becomes the new top node device of attribute "A2" (replacement of top node device), is connected with the delivery server 1, causes the node device 2-A2-P2 to be connected as a child node, and transfers content to the node device 2-A2-P2 (refer to FIG. 12). Then, the node device 2-A2-P2 informs the administration server 100 that the top node device of attribute "A2" has been replaced with the node device 2-A2-P4.

Figure 13:
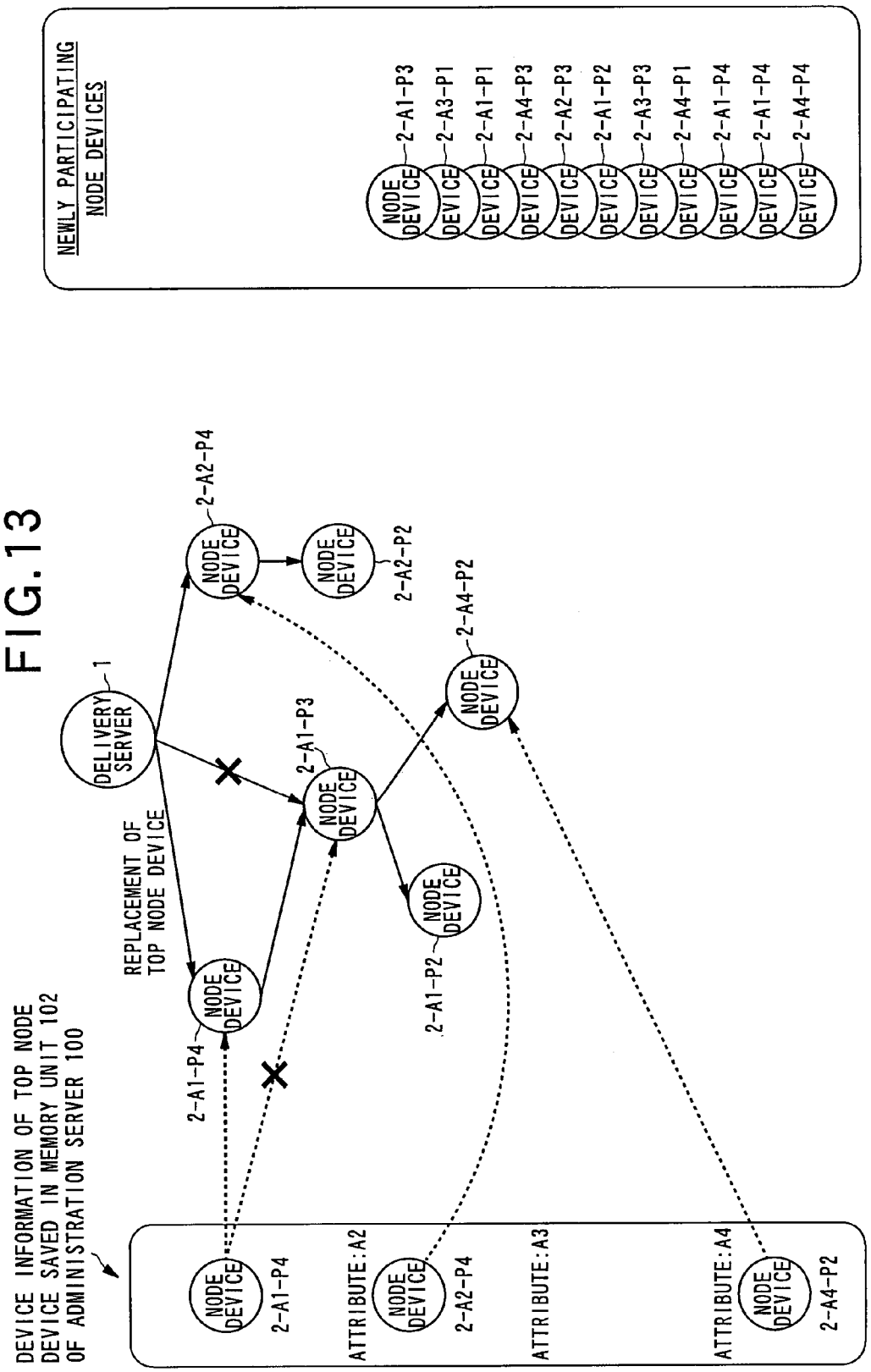
FIG. 13 is a view showing how a node device participates in the tree type network system S.

Then, as shown in FIG. 13, next newly participating node device 2-A1-P4 receives attribute information of the node device 2-A1-P3, which is a top node device of attribute "A3", as connection end candidate notification (Nk{ }) from the administration server 100, and performs connection request to the node device 2-A1-P3 in a similar manner. When the node device 2-A1-P3 receives the connection request, the node device 2-A1-P3 compares upper level adequacy of the node device 2-A1-P4 and the node device 2-A1-P3, in a manner similar to the above. As a result, the node device 2-A1-P4 having higher upper level becomes the new top-node device of attribute "A1" (replacement of top node device), is connected with the delivery server 1, causes the node device 2-A1-P3 to be connected as a child node, and transfers content to the node device 2-A1-P3. Then, the node device 2-A1-P4 informs the administration server 100 that the top node device of attribute "A1" has been replaced with the node device 2-A1-P4.

Figure 14:
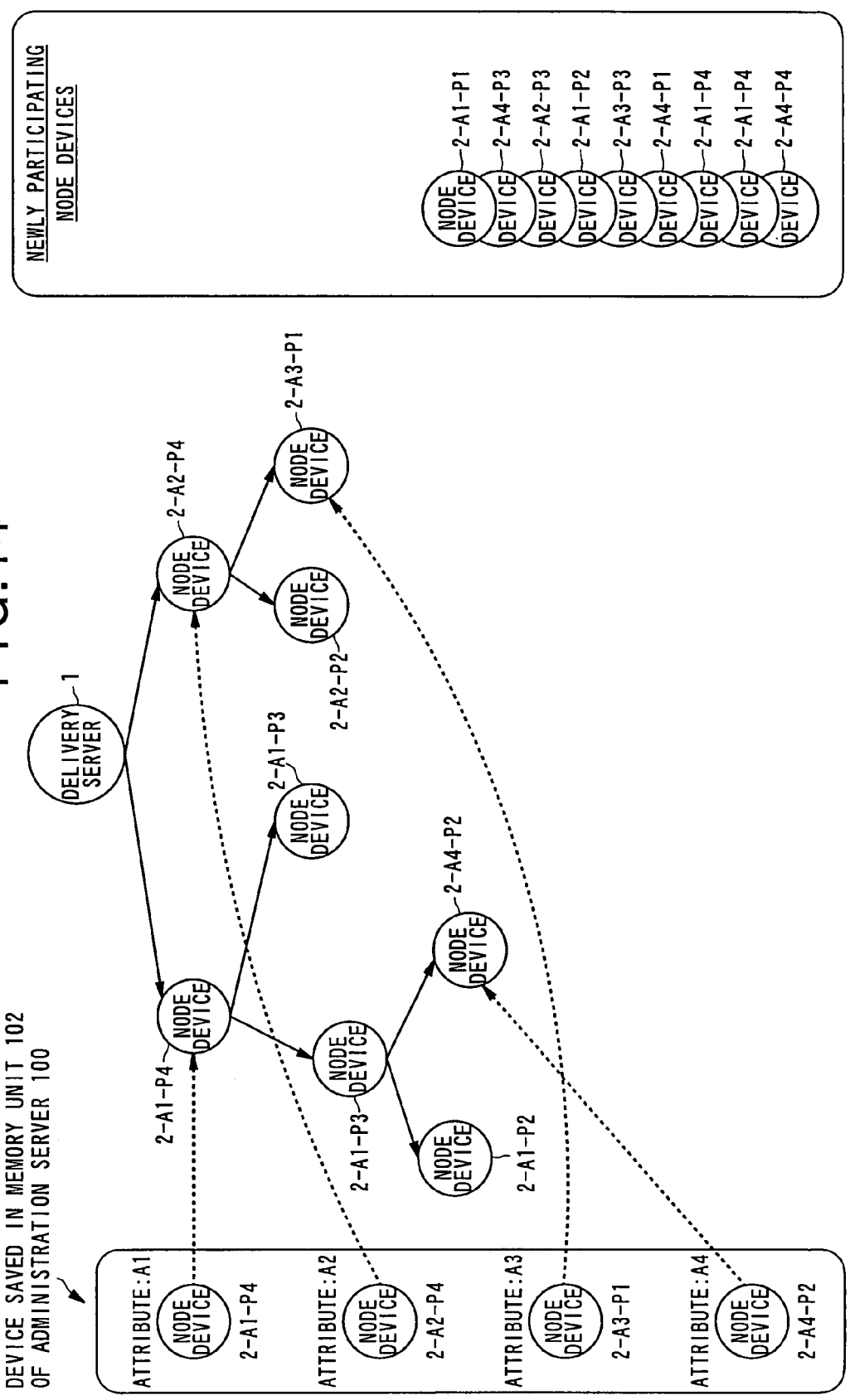
FIG. 14 is a view showing how a node device participates in the tree type network system S.

Connection status of node devices 2-A1-P3 and 2-A3-P1 after participation into the system S is shown in FIG. 14 in a similar manner.

Subsequently, when a node device 2-A1-P1 transmits connection end candidate request Sc to the administration server 100 for the purpose of newly participating in the system S and the administration server 100 receives the request, the administration server 100 teaches attribute information of the node device 2-A1-P4, which is a top node device of attribute "A1", as connection end candidate notification (Nk{ }). Upon receipt of the notification, the node device 2-A1-P1 transmits connection request information Sr to the node device 2-A1-

P4. When the node device 2-A1-P4, which is the top node device of attribute "A1", receives the connection request information, the node device 2-A1-P4 compares upper level adequacy of the node device 2-A1-P1 and the node device 2-A1-P4. As a result, the node device 2-A1-P4 having higher upper level adequacy stays in the upper level. However, since a child node device and two node devices 2-A1-P3 have been already connected to the node device 2-A1-P4, if the node device 2-A1-P1 is connected as a child node, it exceeds the upper maximum delivery number of "2". Therefore, the node device 2-A1-P4 cuts-off the node device 2-A1-P1 having the lowest lower level adequacy after comparing the lower priority of two node devices 2-A1-P2 and 2-A1-P3 with that of the node device 2-A1-P1 (refer to FIG. 15). Then, the node device 2-A1-P4 transmits child node device information list L2{ } to the node device 2-A1-P1 as connection end candidate notification (Nk{ }) when cuts-off the node device 2-A1-P1. Upon receiving the notification, the node device 1-A1-P1 newly saves the device information included in the connection end candidate notification (Nk{ }) as parent node device candidate list L1{ }, performs connection request to the node device 2-A1-P3 selected from the list as a node device having the highest upper priority, and is connected to the node device 2-A1-P3 as a child node device thereof.

Figure 15:
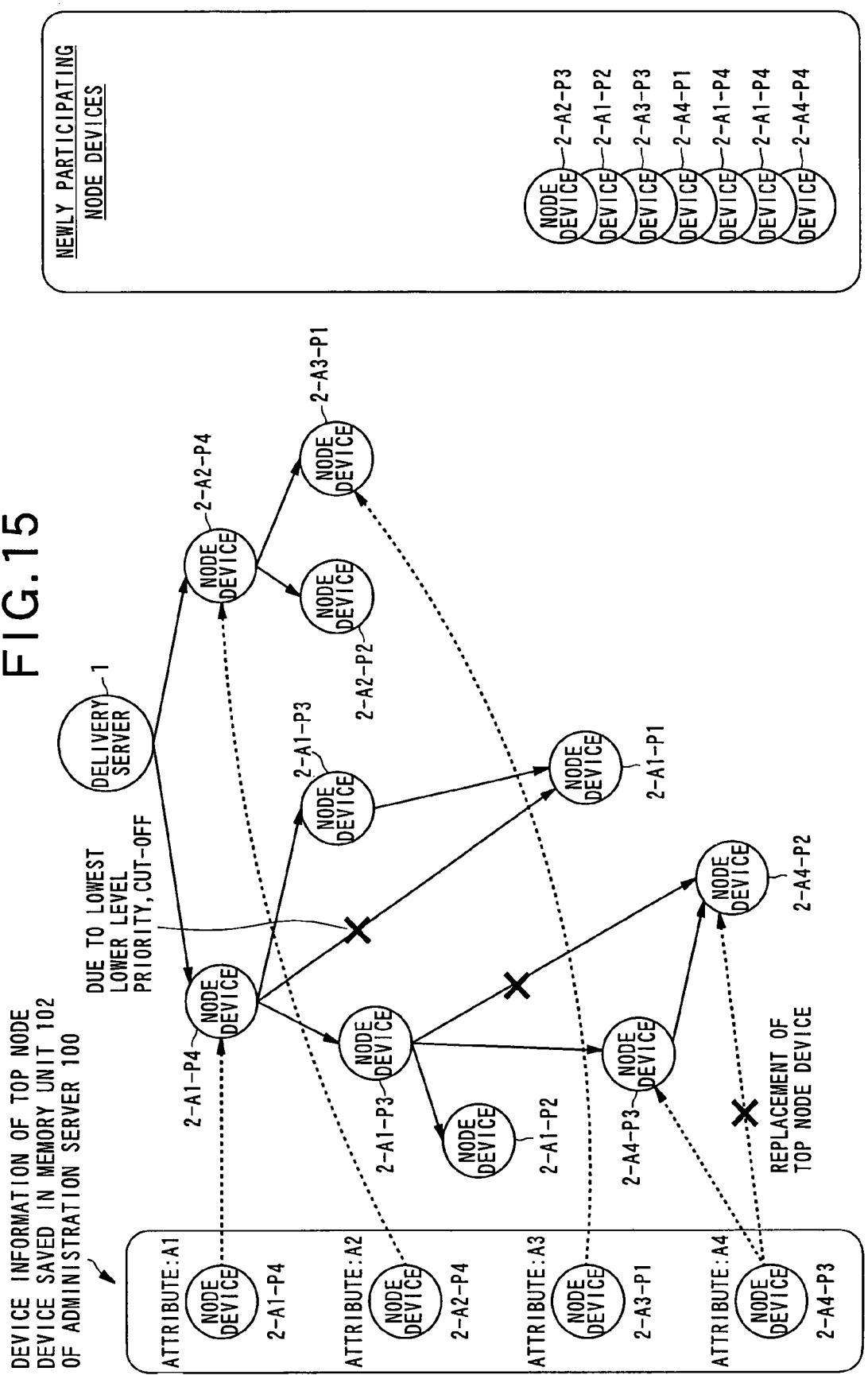
FIG. 15 is a view showing how a node device participates in the tree type network system S.

Moreover, as shown in FIGS. 14 and 15, the following newly participating node device 2-A4-P3 receives attribute information of the node device 2-A4-P2, which is the top node device of attribute "A4" from the administration server 100 as connection end candidate notification (Nk{ }) in a similar manner, and performs connection request to the node device 2-A4-P2. Receiving the request, the node device 2-A4-P2 compares upper level adequacy of the node device 2-A4-P3 and the node device 2-A4-P2. As a result, the node device 2-A4-P3 having higher delivery ability becomes the new top node device of attribute "A4" (replacement of top node device), is connected with the delivery server 1, causes the node device 2-A4-P2 to be connected as a child node, and transfers content to the node device 2-A2-P2. Then, the node device 2-A4-P3 informs the administration server 100 that the top node device of attribute "A4" has been replaced with the node device 2-A4-P3.

Figure 16:
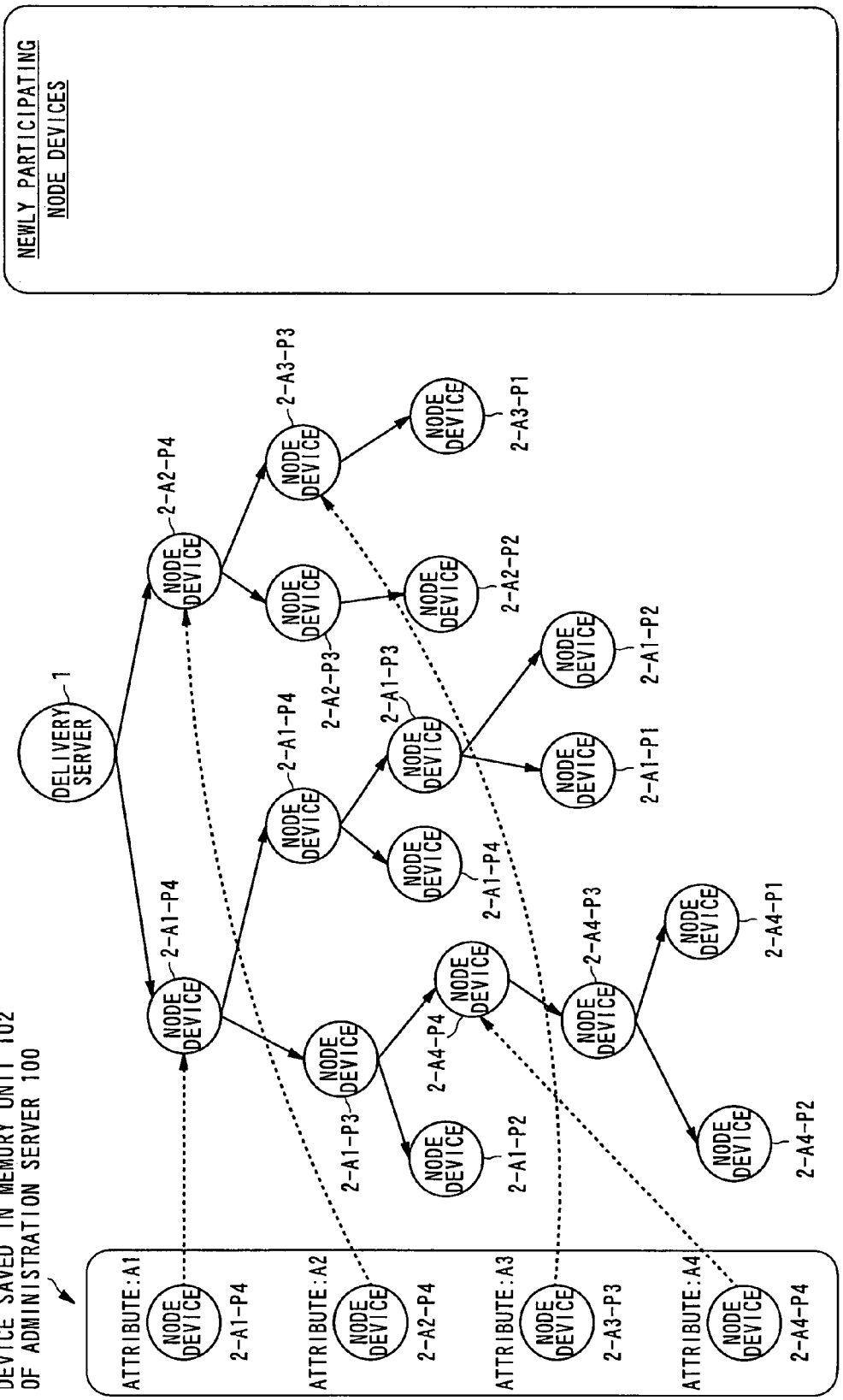
FIG. 16 is a view showing how a node device participates in the tree type network system S.
Figure 17:
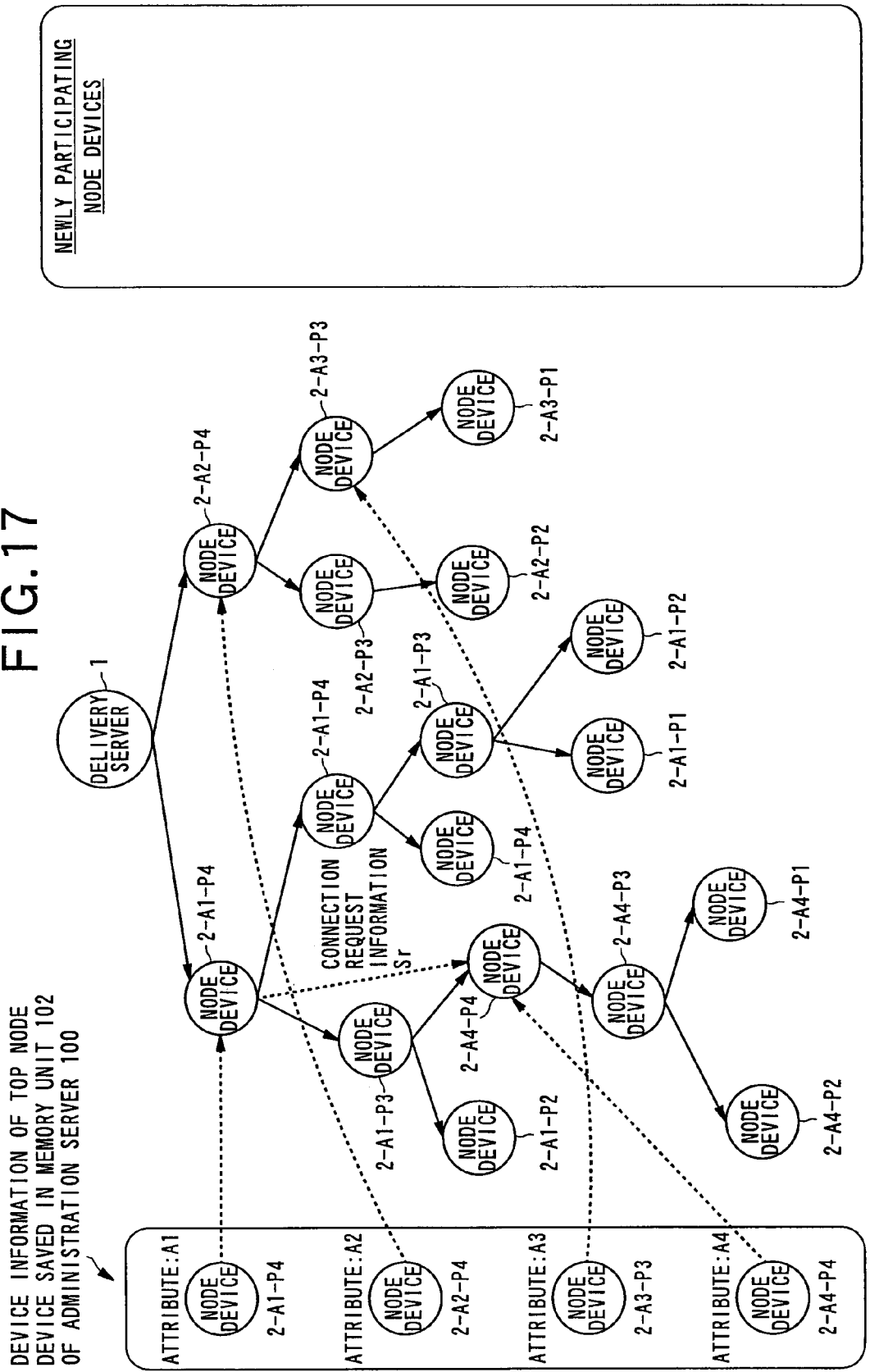
FIG. 17 is a view showing how a node device participates in the tree type network system S.
Figure 18:
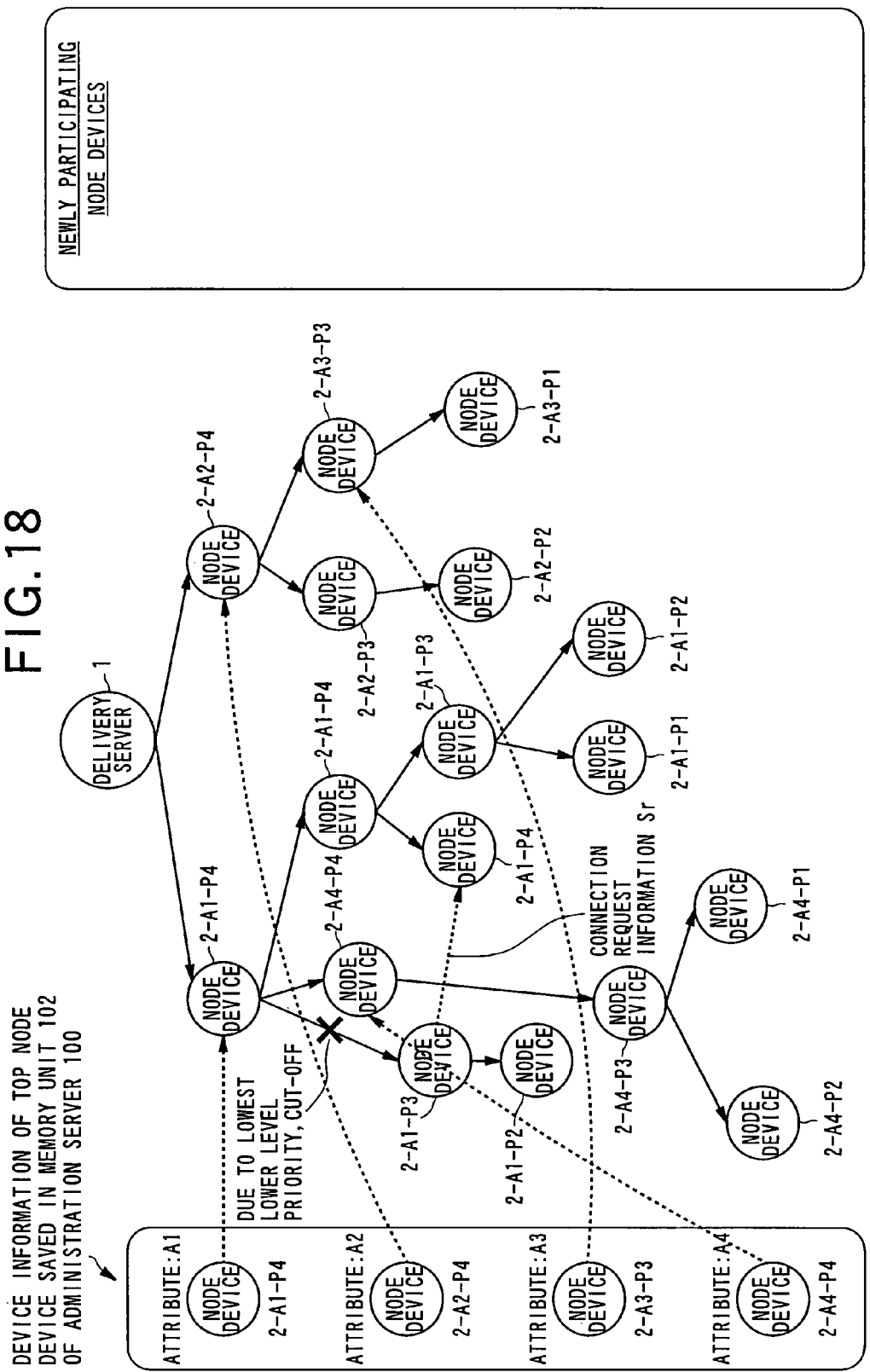
FIG. 18 is a view showing how a node device participates in the tree type network system S.
Figure 19:
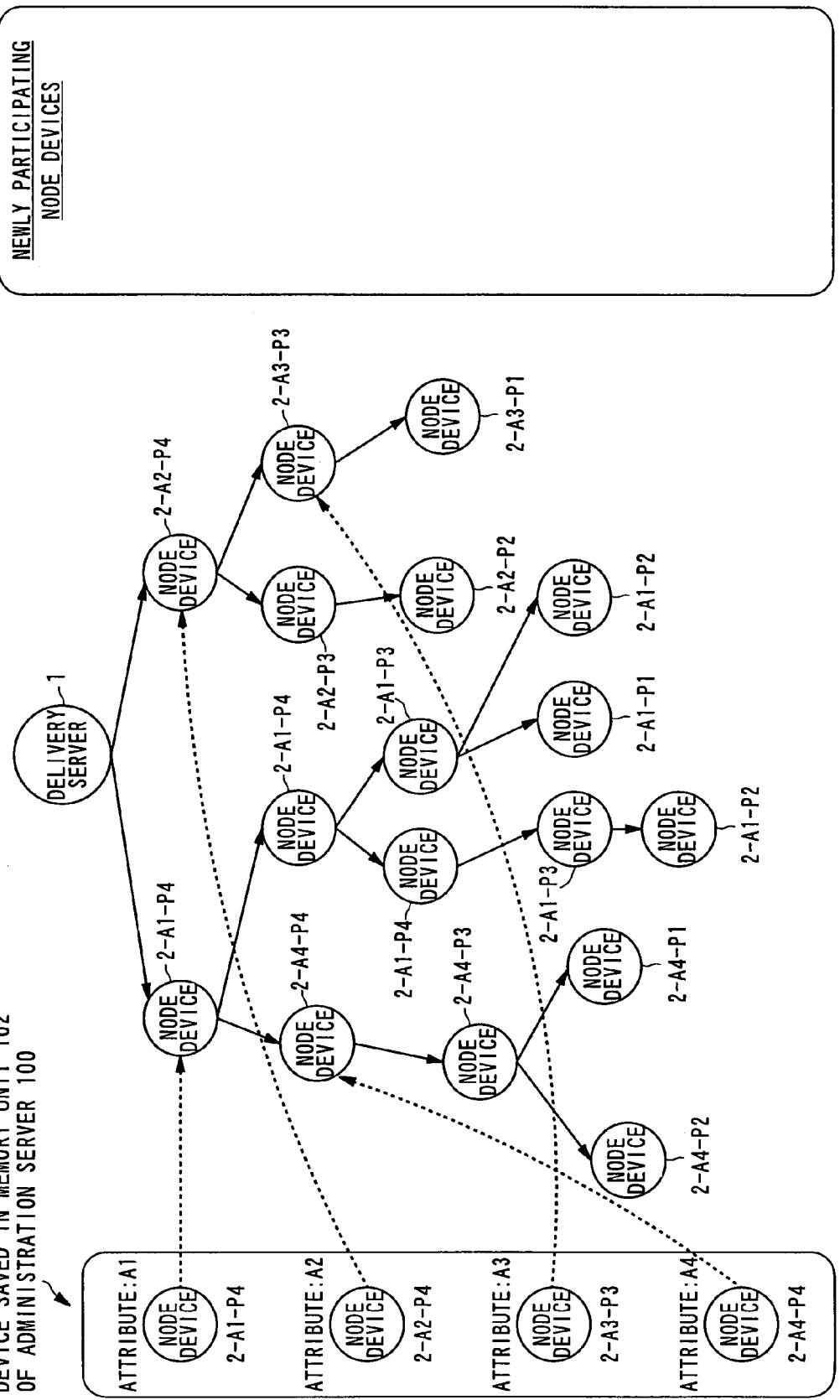
FIG. 19 is a view showing how a node device participates in the tree type network system S.

Then, among newly participating node devices shown in the right-side column of FIG. 15, status of the last node device 2-A4-P4 after participation is shown in FIG. 16.

According to the figure, the node device 2-A4-P4 which participated in the system last of all, has a node device 2-A1-P3 having lower delivery ability as a parent node device. Therefore, the node device 2-A4-P4 transmits connection request information Sr to the node device 2-A1-P4, which was selected as a node device having highest upper level priority from parent candidate node device information list L1{ } of the node device 2-A4-P4 (refer to FIG. 17). However, since the node device 2-A1-P4 already has two node devices 2-A1-P3 and 2-A1-P2 connected as child node devices, if the node device 2-A4-P4 becomes a child node device, it exceeds the delivery permissible number of "2". Therefore, the node device 2-A1-P3 having the lowest lower priority is cut-off (refer to FIG. 18).

Then, the node device 2-A1-P4 transmits child node device information list L2{ } to the node device 2-A1-P3 as connection end candidate notification (Nk{ }) when the node device 2-A1-P3 is cut off. Upon receipt of the notification, the node device 2-A1-P3 newly saves the device information included in the connection end candidate notification (Nk{ }) as parent node device candidate list L1{ }, selects the node device 2-A1-P4 having the highest upper level priority as a parent node device, transmits connection request information Sr thereto, and receives content transferred from the node device 2-A1-P4 (refer to FIG. 19).

Since each node device 2 thus compares upper level adequacy, upper level priority, and lower level priority with each other and autonomously configures a network, it is possible to configure a more reliable tree type network system S.

[4. Specific Processing in Each Node Device and Administration Server]

Subsequently, various processing performed in each node device 2 and the administration server 100 will be explained in detail using flowcharts.

[4-1. Basic Processing in Each Node Device]

Figure 20:
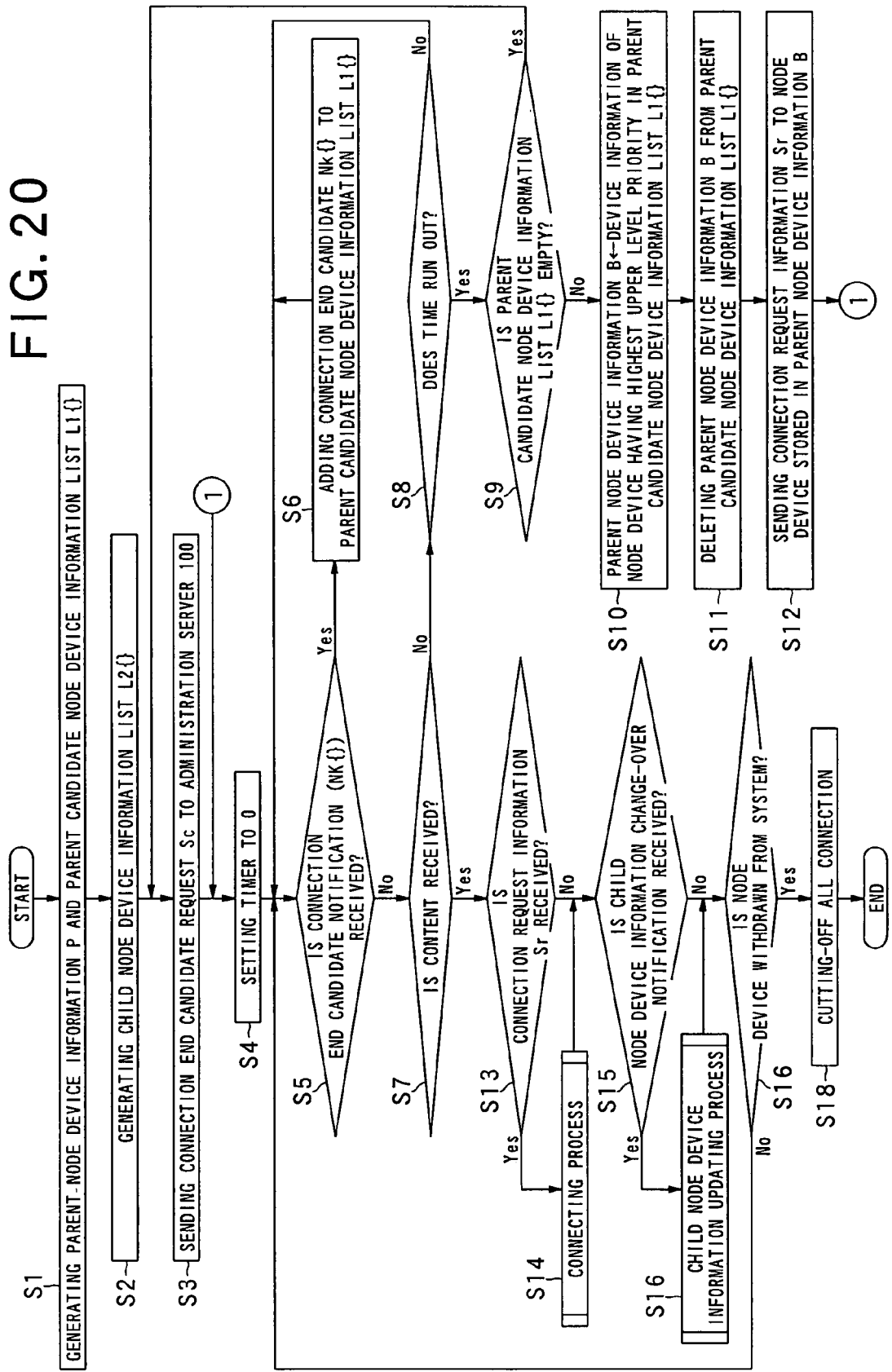
FIG. 20 is a flowchart showing basic process in a control unit 11 of the node device 2.

In use of a flowchart shown in FIG. 20, processing in each node device 2 will be explained in detail. Process shown in the flowchart is carried out on the basis of control by the control unit 11 based on a program (including a processing program), saved in advance in a ROM (not shown) or the like in the memory unit 12 or the control unit 11. A node device 2 carrying out the process is described as a node device 2N.

First, when participating in the tree type network system S, the node device 2N generates parent node device information B, parent candidate node device information list L1{ }, and child node device information list L2{ } in the memory unit 12 (Steps S1 and S2). This is because the control unit 11 to function both as parent candidate device memory control means and child device memory control means, and simultaneously functions as parent candidate device memory means and child node device memory means along with the memory unit 12. When the parent node device information B and the lists L1{ } and L2{ } already exist in the memory unit 12, since they are old information, existing information and lists are deleted and new ones are generated. Since the parent node device information B and the lists L1{ } and L2{ } are thus initialized when processing is started, the information and lists may be generated in the RAM for work instead of the memory unit 12. At this point of time, the parent node device information B and the lists L1{ } and L2{ } are empty.

Subsequently, the control unit 11 functions as participation request information transmission means and transmits connection end candidate request (participation request information) Sc including device information of the node device 2N to inquire a connection end node device 2, to which content is to be transferred (transmitted) for participation into the system, to the administration server 100 (Step S3). Then, using a built-in clock or the like prepared in the node device 2N as a timer, setting the timer to 0 (resetting the timer), the node device 2N begins to check time (Step S4).

Then, it is judged whether or not the node device 2N received device information of one or more node device 2, to which the node device 2N is to be connected, as connection end candidate notification (NK{ }) (Step S5). Connection end candidate notification (Nk{ }) is transmitted from the administration server 100, which receives the connection end candidate request Sc as the participation request information; a node device 2, to which connection process (described later) is carried out; or a node device 2 among node devices 2 included in the parent candidate node device information list L1{ } in which child node device information update process (described in detail later) is performed.

Then, when the control unit 11 functions as connection end candidate information receiving means and receives connection end candidate notification (Nk{ }) (Step S5: Yes), the control unit 11 functions as parent candidate device memory means and adds device information of node devices, which are connection end candidates, included in the connection end candidate notification (Nk{ }) thus received to the parent candidate node device information list L1{ } (Step S6), and the process goes to Step S5.

Explaining specifically by use of FIGS. 5 and 6, since attribute of the node device 2t newly participating in the system is "A3", the node device 2t receives device information of a node device 2x including IP address of the node device 2x (attribute information, delivery ability information, hierarchy information, child node information, top information, and IP address) which is a top node device of attribute "A3" and adds (saves) the device information to parent candidate node device information list L1{ } in the memory unit 12 of the node device 2t.

Then, when the connection end candidate notification (Nk{ }) has not been received as a result of the judgment in Step S5, (Step S5: No), it is judged whether or not content is received (Step S7). When it is not received (Step S7: No), the process goes to Step S8 to thereby perform time-out process. That is, it is judged whether or not a predetermined period of time passes since measurement of time started in Step S4 (timeout) (Step S8) and when the time does not pass (Step S8: No), the process goes to Step S5 and content will be received in Step S7.

On the other hand, when the time passes as a result of judgment (Step S8: Yes), it is judged whether or not the parent candidate node device information L1{ } is empty (Step S9). When it is empty (Step S9: Yes), the process goes to Step S3 and connection end candidate request Sc is transmitted to the administration server 100 again. Meanwhile, when the parent candidate node device information list L1{ } is not empty (Step S9: No), the control unit 11 functions as parent device selecting means to thereby select a node device 2 having the highest upper level priority as a parent node device (parent device) from the parent candidate node device information list L1{ }, and saves device information in the parent node device information B of the memory unit 12 (Step S10). Then, the control unit 11 deletes node device 2 (parent node device information B) selected as a parent node device from the parent candidate node device information L1{ }. Then, the control unit 11 functions as connection request information transmission means, and transmits connection request information Sr to the node device 2 as a parent device regarding device information stored in the parent node device information B of the memory unit 12 (Step S12). Then the process goes to Step S4.

To explain specifically using FIG. 6, since device information of the node device 2x, which is a connection end candidate received from the administration server 100, is saved in the parent candidate node device information list L1{ } of the memory unit 12 of the node device 2t, newly participating in the system, the node device 2t transmits connection request information Sr to the node device 2x on the basis of IP address, included in the device information of the node device 2x. When connection with the node device 2x succeeds, the node device 2t can receive content transferred from the node device 2x. Connection process performed in the node device 2x after receiving the connection request information Sr will be described later in detail.

Moreover, as a result of judgment in Step S7, when content is received (Step 7: Yes), the process goes to Step S13 to thereby judge whether or not connection request information Sr is received (Step S13). When the control unit 11 functions as a connection request information receiving means and the connection request information Sr is received (Step S13: Yes), connection processing to be described later is performed (Step S14). On the other hand, when not received (Step S13: No), it is judged whether or not child node device information changeover notification is received (Step S15).

Then, as a result of the judgment, when the child node information changeover notification is received (Step S15: Yes), child node device information update processing (described later) is performed (Step S16). On the other hand, when the child node device information changeover notification is not received (Step S15: No), by manipulation of the input unit 20 by a user, it is judged whether or not withdrawal from the system is selected (Step S17). When withdrawal from the system is selected (Step S17: Yes), all the connection is terminated (Step S18) and the processing is finished. On the other hand, when withdrawal from the system is not selected (Step S17: No), the process goes to Step S5 and processes from Step S5 to S17 are repeatedly carried out.

[4-2. Connection Target Candidate Notification Processing in Administration Server]

Figure 21:
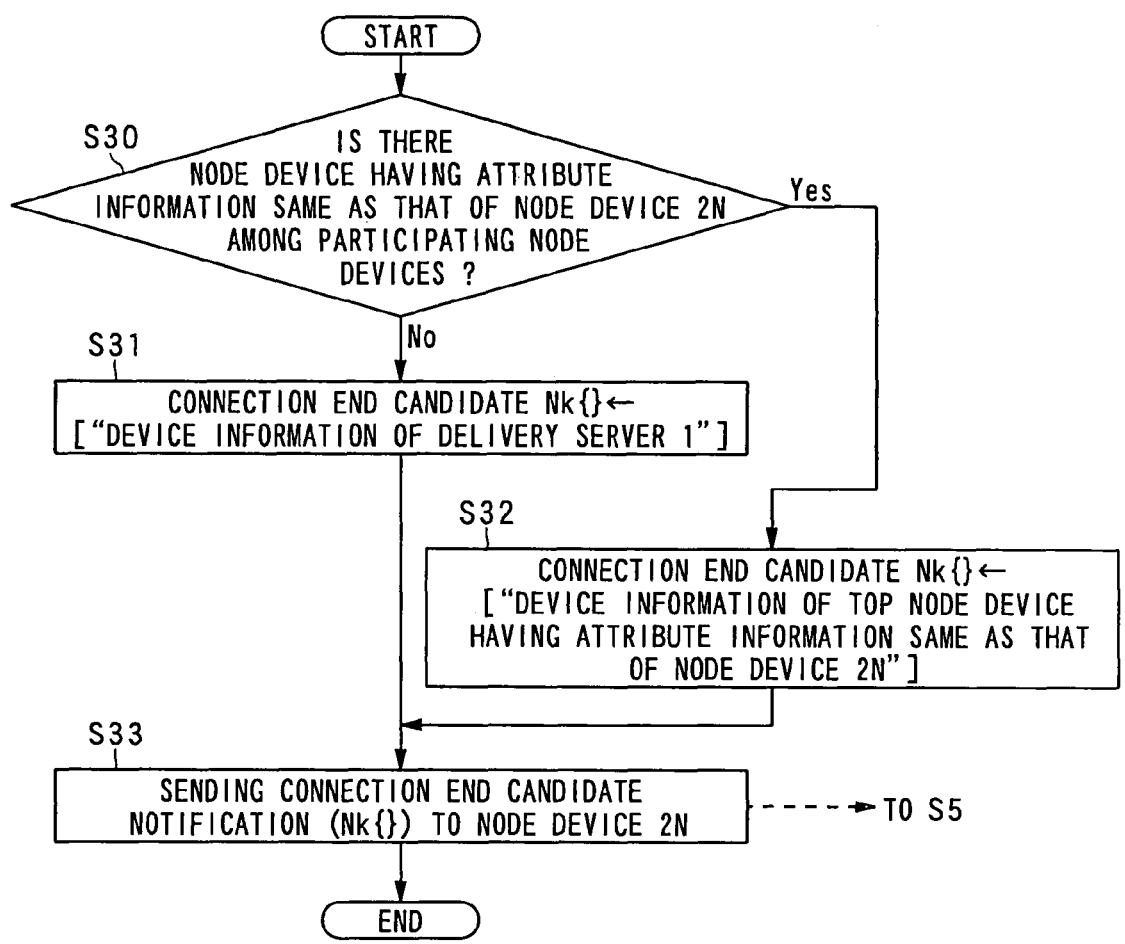
FIG. 21 is a flowchart showing connection end candidate notification process in a control unit 101 of the administration server 100.

Subsequently, connection end candidate notification process performed in the administration server 100 will be explained using a flowchart shown in FIG. 21. The connection end candidate notification process is performed on the basis of control by the control unit 101 and based on a program (including a processing program) saved in advance in an ROM (not shown) or the like in the memory unit 102 or the control unit 101 and is started when the connection end candidate request information Sc as participation request information is received from the node device 2N, which executes the above-mentioned [4-1. Basic processing in each node] explained by use of a flowchart in the FIG. 20.

First, the control unit 101 functions as attribute information acquisition means and acquires attribute information of the node device 2N, which is a transmitter of the connection end candidate request information Sc. In the present embodiment, though it is assumed that attribute information of the node device 2N is included in the connection end candidate request information Sc, attribute information may be requested to a node device 2 which transmits the connection end candidate request information Sc after the reception of the connection end candidate request information Sc.

Then, the control unit 101 functions as connection end candidate information determining means and judges whether or not there exists a node device 2 having the same attribute information as that of the node device 2N in the node devices 2, participating in the system S (Step S30). That is, since the administration server saves device information of the upper most node device (top node device) of each attribute in the memory unit 102 (memory means), when device information of an upper most node device (top node device) having the same attribute as that of the node device 2N is saved in the memory unit 102, it can be judged that a node device 2 belonging to the same attribute as the node device 2N exists among node devices 2 participating in the system S. For example, according to an example of device information of top node devices of each attribute shown in FIG. 5 (C), since device information of the node device 2x having the same attribute as the node device 2t, that is, "A3" is saved, it is judged that a node device 2 having the same attribute as that of the node device 2t exists.

Moreover, as shown in FIG. 8, when there is no node device 2 participating in the system S, it is judged that for the node device 2-A1-P3 participating in the system as the first node device, there is no node device 2 having the same attribute information in the system. Moreover, as shown in FIGS. 9 and 10, in case of the node device 2-A2-P2 subsequently participating in the system, because no device information of a top node device of attribute "A2", which is the same attribute as that of the node device 2-A2-P2, is saved in the memory unit 102 of the administration server 100, it is judged that there is no node device 2 having the same attribute in the system.

Then, when it is judged that there is no node device 2 having the same attribute in the system (Step S30: No), device information of the delivery server 1 is set to be connection end candidate Nk{ } (Step S31). Note that as shown in FIG. 8, even when there is no node device 2 participating in the system, the node device 2-A1-P3 participating in the system as the first node device has no other way but to be directly connected with the delivery server 1. Therefore, it is configured that device information of the delivery server 1 becomes connection end candidate Nk{ }. Thus, even when the administration server 100 does not understand the delivery permissible number of the delivery server 1 in advance, judging only whether there is a top node device having the same attribute in the system substitutes for the information and when top node device of the same attribute is not saved, device information of the delivery server 1 is set to be connection end candidate Nk{ }. As a result, when a node device 2 tries connection with the delivery server 1 after receiving the device information and delivery permissible number of the delivery server 1 exceeds, the delivery server 1 itself performs "child node device information update process" to thereby cut off a node device 2 having the lowest level priority.

On the other hand, in the judgment of Step S30, when it is judged that there is a node device 2 having the same attribute in the system based on the attribute information of the node device 2N, included in the connection end candidate request Sc (Step S30: Yes), device information of the top node device becomes connection end candidate Nk{ }.

Then the control unit 101 functions as connection end candidate information transmission means and transmits connection end candidate notification (Nk{ }) including connection end candidate Nk{ } to the node device 2N, the transmitter of the connection end candidates request Sc (Step S33) to thereby finish the process.

[4-3. Connection Processing in Each Node Device]

Figure 22:
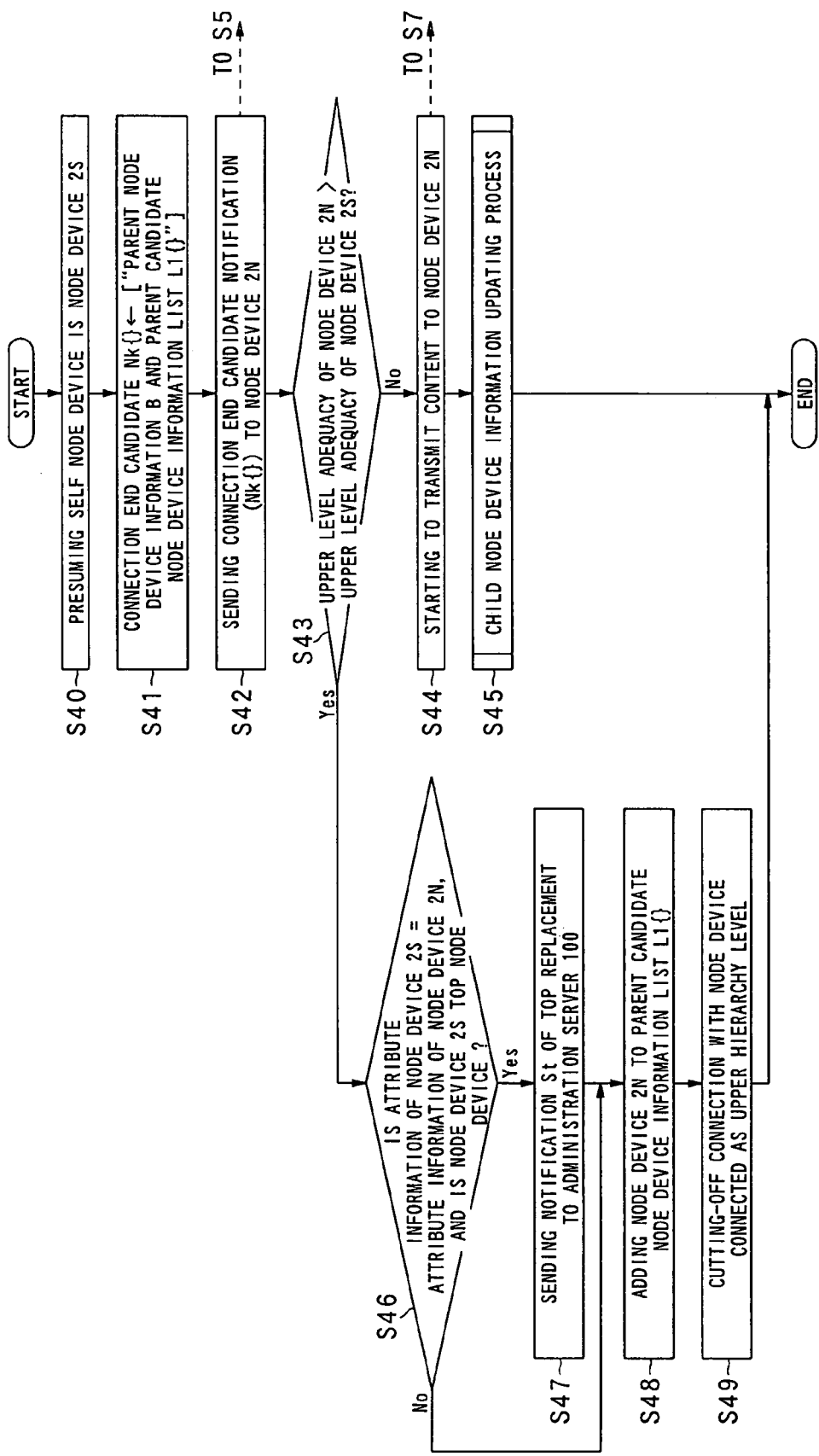
FIG. 22 is a flowchart showing connection process in a control unit 11 of the node device 2.

Subsequently, connection process performed in each node device 2 will be explained by use of a flowchart shown in FIG. 22. The connection processing is started when connection request information Sr from another node device 2, which executed [4-1. Basic processing in each node] explained by use of a flowchart in FIG. 20, is received. Here, connection processing is explained as one performed by a node device 2 which receives the connection request information Sr from the node device 2N, performing the above mentioned process.

First, a node device itself (self node device) is defined as anode device 2S (Step S40). Parent node device information B and parent candidate node device information list L1{ }, saved in memory unit 12 of the node device 2S, are assumed to be connection end candidate Nk{ } (Step S41). That is, the node device 2S teaches the node device 2N, connected as a lower level node device, parent node device information B and parent candidate node device information list L1{ } as the connection end candidate Nk{ }. The node device 2N can know device information of node devices 2 in a direct line of the node device itself, i.e. device information of node devices 2 from the delivery server 1 to the node device 2N, and makes the device information store in parent candidate node device information list L1{ } of the memory unit 12 (for details, vide Step S6).

Purpose of this process is to teach the node device 2N, connected to the node device 2S as a lower level, node device information of node devices 2 in a direct line. Strictly speaking, device information of brother node devices 2 of the node device 2S, included in the parent candidate node device information list L1{ } of the node device 2S, may be excluded from the parent candidate node device information list L1{ }.

Then, connection end candidate notification (Nk{ }) is transmitted to the node device 2N (Step S42). At this time, the connection end candidate notification (Nk{ }) thus transmitted becomes a target for judgment of reception in processing in Step S5 by the node device 2N, which performs the above-mentioned basic process.

Subsequently, the control unit 11 functions as judgment means and comparison means and to judge whether or not the node device 2N, which is transmitter of the connection request information Sr, should be connected. Upper level adequacy of the node device 2N and that of the node device 2S are compared, and it is judged whether or note the node device 2N has higher upper level adequacy (Step S43). That is, it is judged whether or not the node device 2N has higher delivery ability, and when they have similar delivery ability, it is judged whether or not the node device 2N has fewer lower stream node devices than the node device 2S.

As a result of the judgment, when it is judged that upper level adequacy of the node device 2N is not higher (Step S43: No), i.e. upper level adequacy of the node device 2S itself is that of the node device 2N, on a transmission end of the connection request information Sr, or more, it is judged that the node device 2N on the transmission end of the connection request information Sr should be connected to the node device 2N itself. Then the control unit 11 functions as a node device connecting means, and the node device 2N is connected to the node device 2S as a child node device thereof. In other words, the node device 2S becomes a parent node device of the node device 2N, and starts to transfer content to the node device 2N as a child node device (Step S44). The content thus transmitted is subjected to a target for reception of content in the process of Step S7 by the node device 2N, which carries out the above-mentioned basic processing.

Then, child node device information update process is carried out (Step S45), and the process is finished. In the child node device information update process, the node device 2N which becomes a child node device of the node device 2S is added to child node device information list L2{ } in the memory unit 12 of the node device 2S. Further, this event is processed to teach a parent node device or other child node devices by transmitting device information of the node device 2N. Detailed process regarding child node device information update processing will be described later.

Meanwhile, as a result of judgment in Step S43, when it is judged that upper level adequacy of the node device 2N is higher than that of the node device 2S in Step S43, (Step S43: Yes), it is judged whether or not attribute information of the node device 2S and that of the node device 2N are the same, and that the node device 2S is a top node device (Step S46). That is, it is judged whether or not the node device 2S, to which the node device 2N is about to be connected, is a top node device (uppermost node device) having the highest priority in the attribute, to which the node device 2N belongs, and at the upper most stream. When it is judged as a result of judgment that attribute information of the node device 2S is the same as that of the node device 2N and the node device 2S is a top node device (Step S46: Yes), the control unit 11 functions as an upper most node device replacement notification means, and transmits top replacement notification St to the administration server 100 to thereby notify the administration server 100 that the top node device is changed over because the node device 2N having higher upper level adequacy than the node device 2S, which is the top node device of the attribute, becomes a new top node device (Step S47). In the administration server 100, upon receipt of the notification that tells replacement of the top by the top replacement notification St, the control unit 101 functions as an update means and updates a top node device corresponding to the attribute information of the node device 2 which is on a transmission end of the top replacement notification St (same as the transmitter of the top replacement notification St) using device information of a new node device 2 so that the new node device 2 becomes the top node device.

Moreover, when it is judged as a result of judgment in Step S46 that attribute information of the node device 2S and that of the node device 2N are the same, and the node device 2S is not a top node device (Step S46: No), the process goes to Step S48. The control unit 11 functions as parent candidate device memory control means, and adds node device 2N to parent candidate node device information list L1{ } of the memory unit 12 (Step S48). When attribute information of the node devices 2S and 2N differs from each other, or even when they have the same attribute information, when the node device 2S is not a top node device, the node device 2N having higher upper level adequacy becomes a parent node device of the node device 2S, and replacement of the top node device does not occur. Therefore, without accessing to the administration server 100, node device 2N is added to parent candidate node device information list L1{ } saved in the memory unit 12 of the node device 2S.

Then, the control unit 11 functions as parent device cut-off means to cut-off connection with a node device which is connected as higher hierarchy (Step S49), and the process is finished.

Even when the connection with a node device, connected as higher hierarchy, is cut-off by performing the process of Step S49, the node device 2S transmits connection request information Sr to a node device having the highest priority as a new parent node device from parent candidate node device information list L1{ } in the above-mentioned Steps 9 to 12 in basic process performed by the node device 2S and tried to be connected.

At this time, time runs out for the node device 2N which performs the above-mentioned basic processing (vide FIG. 20) in Step S8 of the process (Step S8: Yes), and a new parent node device is selected.

[4-4. Child Node Device Information Update Processing in Each Node Device and Delivery Server]

Figure 23:
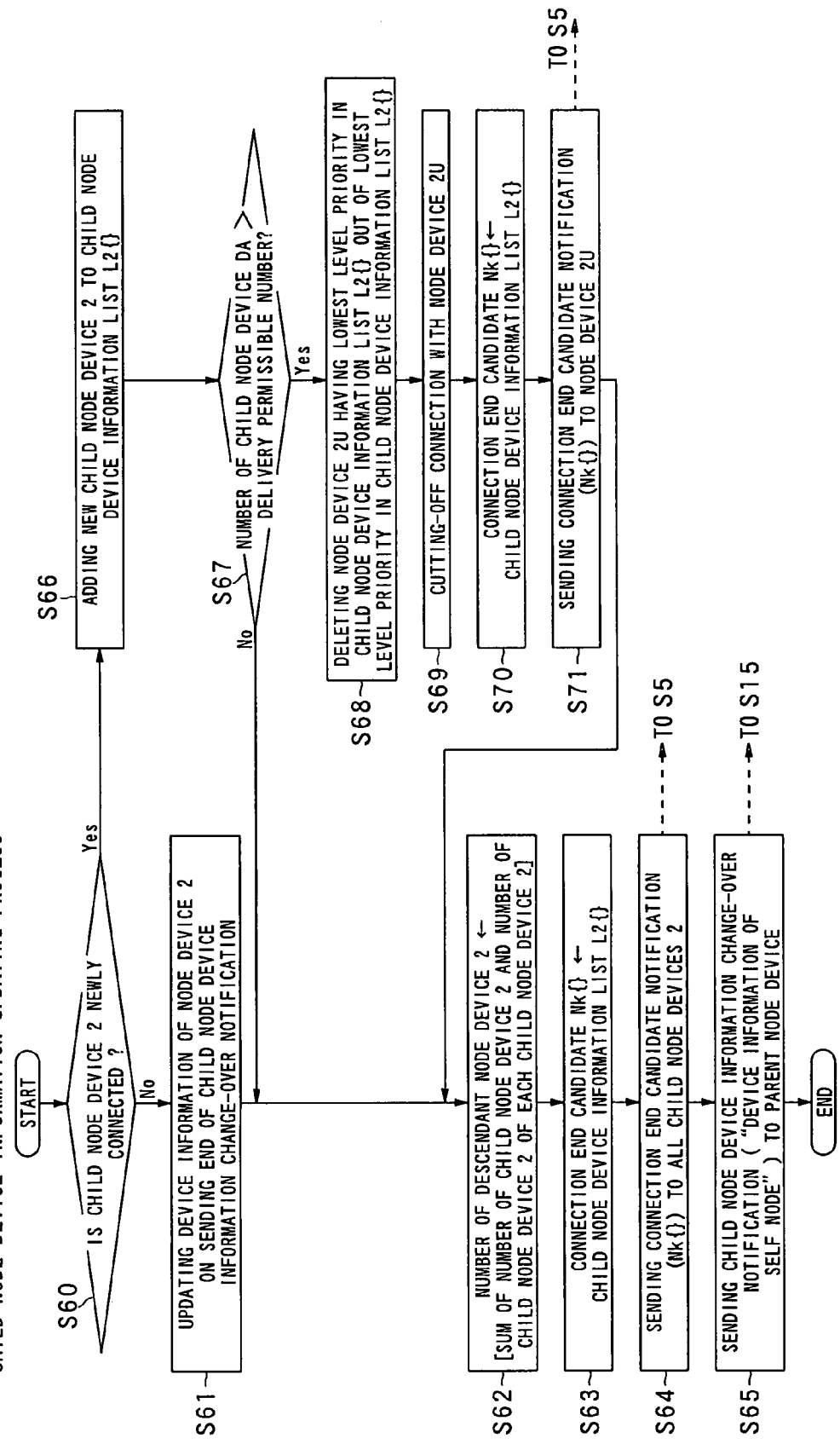
FIG. 23 is a flowchart showing child node device information update process in a control unit 11 of the node device 2.

Subsequently, child node device information update process carried out in each node device 2 and the delivery server 1 will be explained using a flowchart shown in FIG. 23. A child node information update processing performed in node device 2 is the process carried out in both Step S16 of the [4-1. Basic processing in each node device] and Step S45 in the [4-2. Connection processing in each node device]. In the delivery server 1, child node device transmission process is carried out when new connection request information Sr is received from another node device 2. Here, child node device transmission process carried out by the node device 2S will be explained.

First of all, it is judged whether or not a child node device is newly connected (Step S60).

As a result of the judgment, when it is judged that a child node device is newly connected (Step S60: No), device information of a node device 2, which transmits child node device information changing notification in child node device information list L2{ }, is updated (Step S61). Specifically, using descendant node device information changing notification, included in the child node device information changing notification, child node device information of the node device 2 which transmits the child node device information changing notification from the child node device information list L2{ } of the node device itself is updated.

On the other hand, when a child node device 2 is newly connected (Step 60: Yes), a new child node device 2 is added to the child node device information list L2{ } (Step S66). Then, it is judged whether or not the number of child node devices is larger than delivery permissible number (Step S67). When the number of child node devices is larger than the delivery permissible number (Step S67: Yes), the control unit 11 functions as a child node device selection means and a child node device memory means to thereby select a node device having the lowest lower level priority in the child node device information list L2{ } (hereafter referred to as node device 2U), and delete the node device 2U from the child node device information list L2{ } (Step S68). This is for the purpose of matching the number of child node devices to the delivery permissible number. Then the control unit 11 functions as a child node device cut-off means and cuts off connection between the node device 2U and the node device 2S (Step S69). Since the cut-off node device 2U carries out the above-mentioned basic processing (vide FIG. 20), in Step S7 of the basic processing, it is judged that the node device 2U does not receive content (Step S7: No) and in the subsequent Step S8, it is judged that time runs out (Step S8: Yes). Furthermore, in Step S9 and following processing, the node device 2U selects a new parent node device.

Next, the child node device information list L2{ } becomes connection end candidate Nk{ } (Step S70). That is, the node device 2S teaches the node device 2U, which is to be cut off to match the number of child node devices to the delivery permissible number, the child node device information list L2{ } as connection end candidate Nk{ } so that the node device 2U can know node devices connected under the node device 2S (node devices included in the child node device information list L2{ }), and save the list in parent candidate node device information list L1{ } of memory unit 12 (for details, refer to Step S6). Thus, after the connection with the node device 2S is cut off, the node device 2U can be connected with any node device 2, which is connected with the node device 2S, as a lower node device or a lower stream node device 2 (descendant node device). Then, the control unit 11 functions as a connection end candidate information transmission means and transmits connection end candidate notification (Nk{ }) to the node device 2U (Step S71). Then the process moves to Step S62. The connection end candidate notification (Nk{ }) thus transmitted at this time becomes a target for judgment of reception in the processing in Step S5.

Next, number of descendant node devices of the node device 2S is updated (Step S62). More specifically, a sum of the number of child node devices of node device 2S and the number of descendant node devices is acquired. For example, according to the example shown in FIG. 19, since child node device information list L2{ } of the node device 2-A4-P4 saves device information of the node device 2-A4-P3, which is a child node device, based on the saved information, number of child node devices of the node device 2-A4-P3 which is a child node device is acquired as "2". Moreover, since the node device 2-A4-P3 is the only child node device, number of child node device is "1". Then, the number of descendant node devices can be acquired (updated) as "3", which is the sum of the two numbers. In a similar manner thereto, the node device 2-A2-P4 in FIG. 19 can acquire numbers of child node devices of the child node devices 2-A2-P3 and 2-A3-P3 as "1", respectively, on the basis of device information of the two child node devices saved in the child node device information list L2{ }. Furthermore, because number of child node devices of the node device 2-A4-P3 is "2", number of descendant node devices 2 can be updated as "4", which is the sum of the numbers.

Next, child node device information list L2{ } is set is made connection end candidate Nk{ } (Step S63), and connection end candidate notification (Nk{ }) is transmitted to all the child node devices 2 (Step S64). At this time, connection end candidate notification (Nk{ }) thus transmitted becomes a target for judgment of reception in the processing in Step S5 in all the child node devices, which carries out the above-mentioned basic process.

Subsequently, to a parent node device connected as upper hierarchy, child node device information changing notification including device information of the node device 2S itself is transmitted (Step S65), and the process is finished.

The connection end candidate notification (Nk{ }) thus transmitted in Step S65 becomes a target for judgment of reception in the process of Step S15 by all the parent node devices carrying out the above-mentioned basic process.

As described above, according to the first embodiment, since it is constructed such that each node device 2 participating in the tree type network system S having high upper level adequacy becomes a parent node device based on device information, it is possible to configure a network system having high reliability by connecting a node device more suitable as a parent node device in the upper hierarchy.

According to the above-mentioned embodiment, delivery ability is determined based on the maximum accessible number and continued connection time of a child node device. However, it is not limited thereto, and the delivery ability may be determined based on any of processing capability of the node device 2, effective bandwidth of a communication route appended to the node device 2, continued connection time for the node device 2 of participating in the tree type network system S, and amount of content data already received and still retained.

Moreover, in the above-mentioned first embodiment, the administration server 100 is constructed to save device information of top node devices as upper most node devices at the top of hierarchy for each attribute information. However, not limited thereto, for example, device information of node devices in the upper most hierarchy to a hierarchy level lower for a predetermined number may be saved. For example, when the predetermined number is set to be "1", device information of node devices in the upper most hierarchy may be saved for each attribute information and this corresponds to the above-mentioned embodiment. When a plural number such as "2" or "3" is set to be the predetermined number, for example, when "3" is set to be the predetermined number, the administration server 100 may save device information of top three node devices and transmit, when deciding device information of a node device 2 of corresponding attribute information, one of the device information selected for a plurality of corresponding node devices 2 to a node device 2 which transmitted connection end candidate request Sc as connection end candidate Nk{ }, or all the saved device information of all the corresponding node devices 2 may be transmitted to a node device 2 which transmitted connection end candidate request Sc as connection end candidate Nk{ }. In this case, the administration server 100 may manage (save) only a predetermined number of node devices 2 for each attribute information of node devices 2. Therefore, it is possible to autonomously control connection status by each node device 2 while reducing the load.

Moreover, since upper priority is decided based on device information including attribute information such as AS number indicating network connection service group to which node device 2 belongs (affiliation information) and connection request information Sr is transmitted to the node device 2 having the highest upper priority. Therefore, the network S can be configured so that node devices 2 having the same attribute information gather in the same spot and it is possible to prevent the whole system from being affected by reconnection processing when any of node devices 2 is cut-off.

Then, when each node device participates in the tree type network system, inquiry regarding a node device 2 to be a connection end candidate is done to the administration server 100, connection request is made to the node device 2, and the node device 2 judges whether or not it is allowed to connect to itself upon receipt of the request. Therefore, it is possible to configure the tree type network system S having high stability without putting load on the administration server 100.

Moreover, since the administration server 100 may manage (save) only upper most node devices which are the highest node devices 2 for each attribute information of the node devices 2, processing load on the administration server 100 is reduced to minimum and connection status can be controlled autonomously by each node device 2.

Furthermore, even when there is delivery permissible number for a node device 2, lower priority is determined based on device information including attribute information indicative of network connection service group to which the node device 2 belongs (affiliation information), and connection with a node device 2 having the lowest lower level priority is cut off. Therefore, each node device 2 can autonomously and optimally control connection status of the node device 2 itself.

Second Embodiment

Hereafter, a second embodiment of the present invention will be explained based on figures.

[1. Configuration and the Like of Tree Type Network System]

First, with reference to FIG. 24, schematic structure and function of a tree type network system according to the present embodiment (an example of a broadcast system) will be explained.

Figure 24:
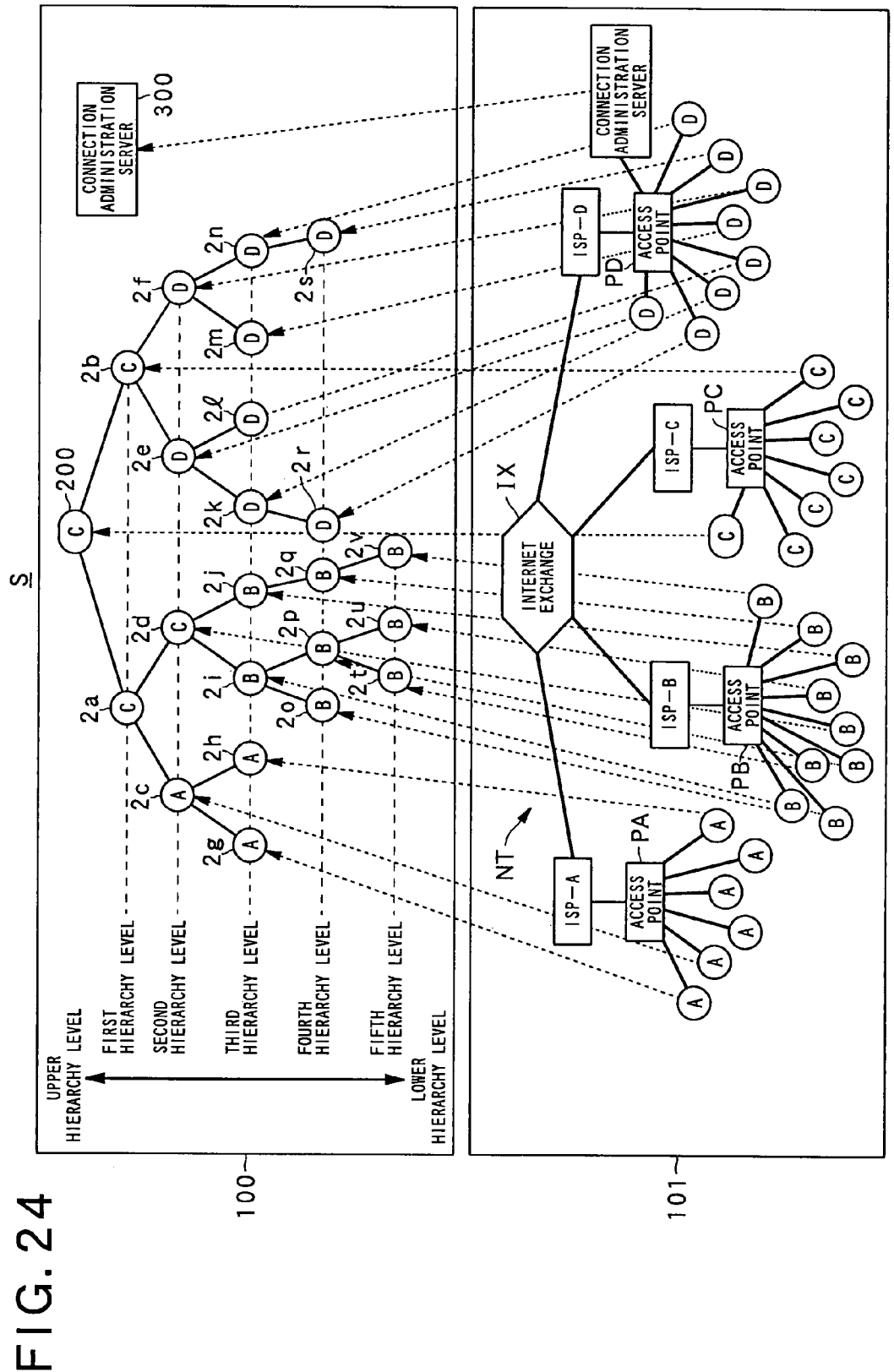
FIG. 24 is a view for showing an example of connection status of each device in a tree type network system according to a second embodiment.

FIG. 24 is a view for showing an example connection mode of each device in a tree type network system according to the second embodiment.

As shown in lower column 101 of FIG. 24, a network NT (a network in real world) such as the internet is made up of an internet exchange IX, ISPs A, B, C, and D as network connection service providers, access points PA, PB, PC, and PD, a router (not shown), a communication line (for example, telephone line or optical cable) and the like.

The tree type network system S according to the second embodiment includes a broadcast station device 200 as a broadcast station for broadcasting content data as broadcast information and a plurality of node devices 2a, 2b, 2c, 2d, . . . for acquiring the broadcast content data. The broadcast station device 200 and each of the node device 2a, 2b, 2c, 2d, . . . are connected to the network NT with any one of ISPs A, B, C, and D via an access point (any of PA, PB, PC, and PD), as shown in lower column 101 of FIG. 24. Then, in the tree type network system S, on the basis of the network NT shown in lower column 101 of FIG. 24, as shown in upper column 100 of FIG. 24, the broadcast station device is positioned at the top (highest), the plurality of node devices 2a, 2b, 2c, 2d, . . . are connected like tree via communication routes to form a plurality of hierarchy levels (in the example of FIG. 24, 5-story hierarchy) (hereafter, a tree network shown in upper column 100 is referred to as an overlay network) Thus, content data broadcasted from the broadcast station device 200 is relayed (transferred) to each node device from upper stream (higher hierarchy) to lower stream (lower hierarchy). In the following explanation, there are cases where any of node devices 2a, 2b, 2c, 2d, . . . will be referred to as a node device 2 for the convenience of explanation.

Moreover, node devices 2a, 2b, 2c, 2d, . . . shown in the upper column 100 of FIG. 24 are node devices 2 participating in the tree type network system S, and the broadcast station device 200 and the node devices 2 already participating in the system belong to any of network connection group A to D classified by ISP. For example, node devices 2c, 2g, and 2h connected to the network NT with the ISP-A belong to the network connection group A, node devices 2i, 2j, 2o, 2p, 2q, 2t, 2u, and 2v connected to the network NT with the ISP-B belong to the network group B, the broadcast station device 200 and node devices 2a, 2b, and 2d connected to the network NT with the ISP-C belong to the network group C, and node devices 2e, 2f, 2k, 2l, 2m, 2n, 2r, and 2s connected to the network NT with the ISP-D belong to the network connection group D.

In the example of FIG. 24, the tree type network system S includes a plurality of sub trees configured by the plurality of node devices 2 belonging to the same network connection group (for example, a sub tree including node devices 2c, 2g, and 2h belonging to the network connection group A, a sub tree including node devices 2i, 2o, 2p, 2t, and 2u belonging to the network connection group B, a sub tree including node devices 2j, 2q, and 2v belonging to the network connection group B, a sub tree including node devices 2a, 2b, and 2d belonging to the network connection group C, a sub tree including node devices 2e, 2k, 2l, and 2r, belonging to the network connection group D, and a sub tree including node devices 2f, 2m, 2n, and 2s, belonging to the network connection group D).

Moreover, information regarding such broadcast station device 200 and each node device 2, connection form (topology) of the broadcast station device 200 and each node device 2, connection condition thereof and the like are managed by a connection administration server 300 as a connection administration device.

Specifically, the connection administration server 300 manages location information of the broadcast station device 200 and each of the node device 2 already participating in the tree type network system S (for example, IP addresses and port numbers (standby port numbers)), affiliate information indicating network groups, to which the broadcast station device 200 and each of the node device 2 belong (in other words, provider information indicating by which ISP the devices are connected to the network NT), and connection status information indicating connection form (topology) and connection status of the broadcast station device 200 and each node device 2 using network administration database.

Here, as an example of affiliate information indicating network connection group, autonomous system (AS) can be mentioned. AS is an aggregation of networks having one (common) operation policy constituting the internet, and the internet can be regarded as a mass of the AS. By dividing into units of AS and managing the network, it becomes easy to reduce overhead of routing thereby making it easy to manage the network NT. In the second embodiment, it is assumed that networks constituted by each ISP (that is, network groups A to D) are divided in unit of AS, and to each of network groups A to D, unique AS numbers which are different from each other are allocated from, for example, numbers of 1 to 65535. The AS numbers, to which the broadcast station device 200 and the node devices 2a, 2b, 2c, 2d, . . . belong, are determined when, for example, IP addresses are allocated by ISPs. For a node device to acquire AS number to which the node device itself belongs, there are two methods: To access the Internet Routing Registry or the WHOIS database of the Japan Network Information Center, or to acquire AS number of a line which a user has purchased from the ISP so that the user inputs the number into a node device in advance. In the present embodiment, ISP is exemplified as an example of network connection group. However, the present embodiment is not limited thereto, and other network operation organization or network operation body may be included.

Moreover, in the connection status information, for the broadcast station device 200 and each node device 2 already participating in the tree type network system S, following information (1) to (7) are included.

(1) Hierarchy information indicating hierarchy level where the broadcast station device 200 and each node devices 2 are positioned in a hierarchical structure in the tree type network system S (for example, in case of a node device 2a shown in FIG. 24, in the first level).

(2) Lower device information indicating node devices 2 connected to a lower level of the broadcast station device 200 and each of the node devices 2 (for example, in case of the node device 2a shown in FIG. 24, node devices 2c and 2d are connected to a hierarchy lower level).

(3) Connection permissible number information indicating number of node devices 2 which can be connected in lower levels of the broadcast station device 200 and each of the node devices 2.

(4) Transfer ability information indicating ability of the broadcast station device 200 and each of the node devices 2 to transfer content data to another node device 2 (for example, total of processing speed (MHz) of CPU of the broadcast station device 200 or the node device 2 and effective bandwidth until the broadcast station device 200 or a node device 2 is connected to ISP via an access point (for example, data transfer rate (bps)).

(5) Participation time information indicating participation time while the broadcast station device 200 and each of the node devices 2 participate in the tree type network system S.

(6) Lower stream device number information indicating number of node devices 2 arranged in lower stream side of the broadcast station device 200 and each of the node devices 2 (for example, number of node devices arranged on lower stream side of the node device 2d shown in FIG. 24 is 8, including 2i, 2j, 2o, 2p, 2q, 2t, 2u, and 2v).

(7) Device number in lower stream tree information indicating number of node devices 2 arranged in a lower tree of which source is a node device connected to a lower hierarchy level of the broadcast station device 200 and each of the node devices 2 (for example, in a lower tree of which source is 2j connected to a lower hierarchy level of the node device 2d shown in FIG. 24, node devices 2j, 2q, and 2v are arranged). Moreover, the connection administration server 300, in response to a request from a nonparticipating node device (anew node device), determines a node device 2, to which the nonparticipating node device is to be connected by use of at least one of either the affiliate information or the connection status information, and transmits device information indicating the decided node device 2 (for example, including location information such as IP address and port number) as connection end information to the nonparticipating node device. Thus, the nonparticipating node device establishes connection with an already-participating node device 2 based on the connection end information, and participates in the tree type network system S.

A nonparticipating node device (a new node device) includes not only a node device participating in the tree type network system S for the first time, but also a node device, which already participates in the system, withdraws due to switch off of the power source, a communication trouble, or the like, and again participates in the tree type network system S.

Moreover, tree-shaped topology in the tree type network system S is formed for each broadcast station device, in other words, for each broadcast channel (in the upper column 100 of FIG. 24, only one broadcast channel is shown) (there may be a case where one broadcast station device covers a plurality of broadcast channels). For example, when a broadcast channel is switched by a user in an already-participating node device 2, the node device 2 establishes connection after acquiring connection end information of an already-participating node device 2 in a broadcast channel after switching from the connection administration server 300. Detailed explanation to switching control of broadcast channel is omitted.

[2. Configuration and the Like of Broadcast Station Device]

Next, with reference to FIG. 25, configuration and function of the broadcast station device 200 will be explained.

Figure 25:
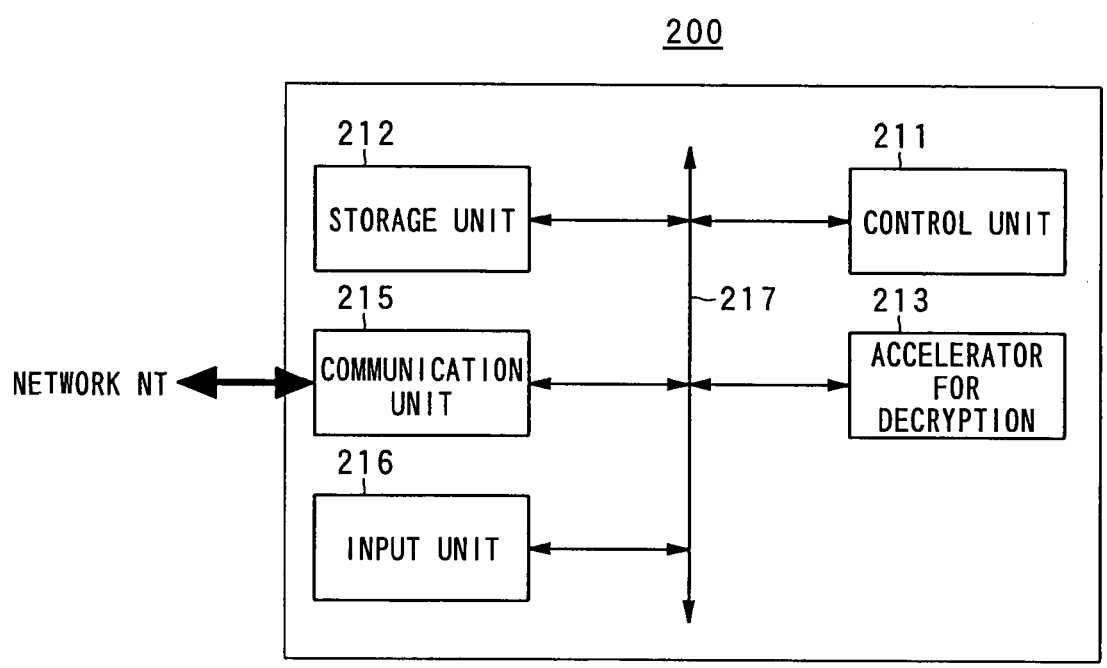
FIG. 25 is a view showing an example of schematic structure of a broadcast station device 200.

FIG. 25 is a view for showing an example of schematic structure of the broadcast station device 200.

The broadcast station device 200, as shown in FIG. 25, is structured by including a CPU having calculating function, a RAM for work, a control unit 211 configured by a ROM and the like for saving various data and programs (including operating system (OS) and various kinds of application), memory unit 212 configured by HDD or the like for saving and storing content data (for example, compressed video data or audio data), an encryption accelerator 213 for encrypting content data by use of an encryption key, a communication unit 215 for carrying out communication control between node device 2 or the like via the network NT, and input unit 216 for receiving instruction from an operator and for giving instruction signal corresponding to the instruction to the control unit 211 (for example, a key board, a mouse, etc.). All these elements are connected with each other via a bus 217.

The control unit 211 integrally controls the whole of the broadcast station device 200 when the CPU executes a program saved in the memory unit 212, encrypts content data saved and stored in the memory unit 212 using an encryption key by the accelerator for encryption 213, generates a plurality of continuous data packets by dividing the content data into a predetermined amount of data, and broadcasts (stream delivery) the data packets to a node device 2 (in case of the example in the upper column 100 of FIG. 24, node devices 2*a* and 2*b*) via the communication unit 215. In a payload part of each data packet, a successive packet number beginning from the top of the content data (sequence number continued in the order of broadcast) is written.

[3. Configuration and the Like of Node Device]

Next, with reference to FIG. 26, configuration and function of a node device 2 according to the second embodiment will be explained.

Figure 26:
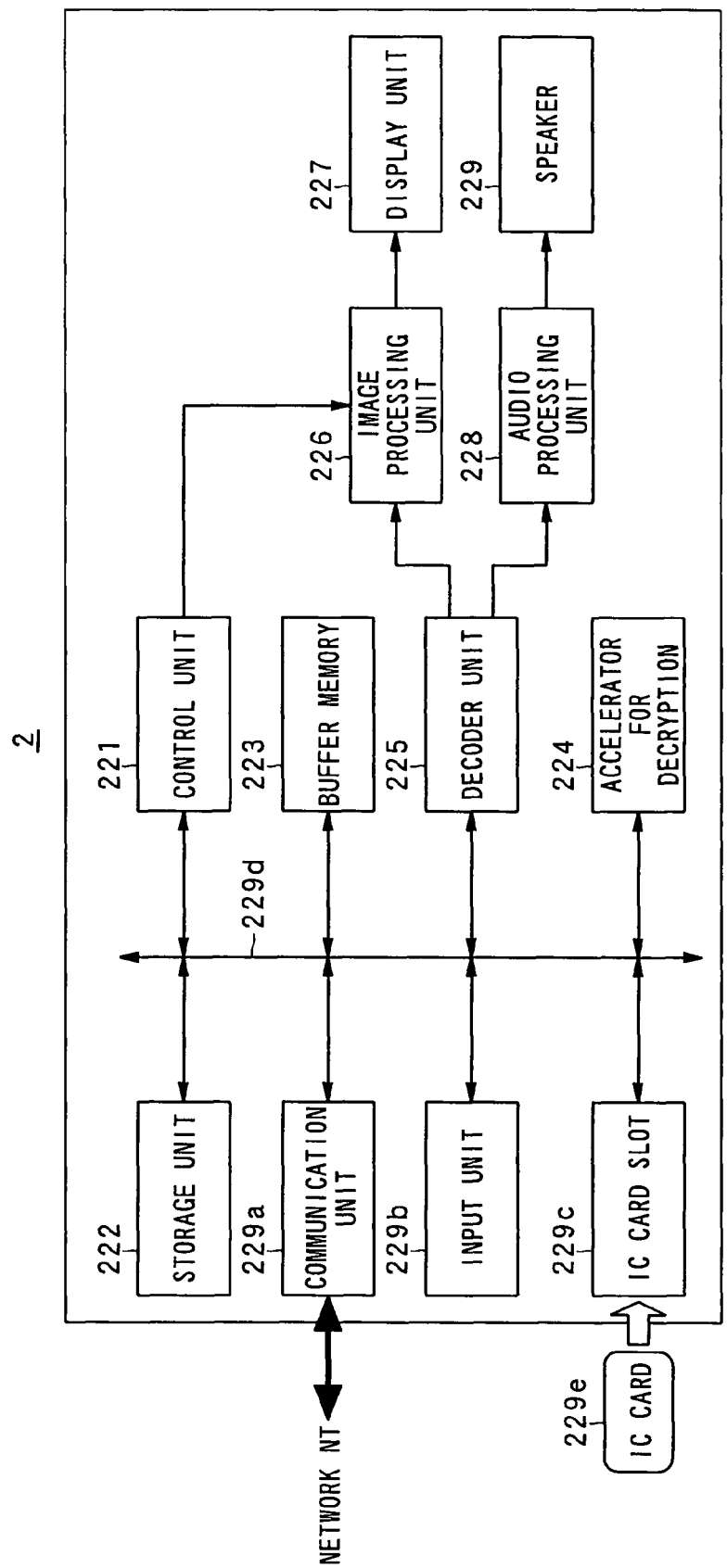
FIG. 26 is a view showing an example of schematic structure of the node device 2.

FIG. 26 is a view for schematically showing an example of schematic structure of a node device 2 according to the second embodiment.

The node device 2 (similar in nonparticipating node device) is constructed by including a CPU having calculating function, a RAM for work, a control unit 21 configured by a ROM and the like for saving various data and programs (including operating system (OS) and various kinds of application), a memory unit 22 configured by an HDD or the like for saving various data, programs, and the like, a buffer memory 223 for temporarily storing (saving) received content data (data packet), a decryption accelerator 224 for decrypting encrypted content data accumulated in the buffer memory 223 using a decryption key, a decoder 225 for decoding (stretching data, or the like) encoded video data (image information) and audio data (voice information) included in the decrypted content data, an image processing unit 226 for carrying out predetermined graphic processing to the reproduced video data or the like to thereby output the data as video signal, a display unit 227 such as CRT or liquid crystal display for displaying image based on the video signal, outputted from the image processing unit 226, an audio processing unit 228 for converting the reproduced audio data by digital/analog (D/A) conversion into analog audio signal and thereafter amplifying the converted signal by an amplifier to output, a speaker 29 for outputting the audio signal outputted from the audio processing unit 228 as acoustic wave, a communication unit 229*a* for performing communication control of information between the broadcast station device 200, another node device 2, and the like via the network NT, an input unit 229*b* which inputs instruction from a user (viewer) and provides instruction signal to the control unit 221 (for example, such as a mouse, a key board, an operation panel, a remote controller, or the like), and an IC card slot 229*c* for loading an IC card 229*e* and connecting it electronically. The control unit 221, the memory unit 222, the buffer memory 223, the accelerator for decryption 224, the decoder unit 225, the communication unit 229*a*, the input unit 229*b*, and the IC card slot 229*c* are connected with each other via a bus 229*d*. Note that as the node device 2, for example, a set top box (STB) or a personal computer may be used.

The IC card 229*e* is tamper-proof (i.e. countermeasure against tampering to prevent confidential data from being read-out by illegal measure and from being analyzed easily). For example, it is distributed by an organizer of tree type network system S or the like to a user. The IC card 229*e* is configured by including an IC card controller including CPU, a tamper-proof non-volatile memory (for example, EEPROM), and the like. In the non-volatile memory, a user ID, a decryption key for decrypting encoded content data, a digital certificate, location information of the connection administration server 300, and the like can be saved.

The buffer memory 223 includes, for example, a first in first out (FIFO) type ring buffer memory, and temporarily accumulates content data received through the communication unit 229*a* in a storage area, indicated by reception pointer.

The control unit 221 integrally controls the entire node device 2 when the CPU reads out and executes a program saved in the memory unit 222 or the like. After participation into the tree type network system S, the control unit receives and writes a plurality of data packet, transmitted from the broadcast station device 200 or the node device 2 in an upper hierarchy level in the buffer memory 223 via the communication unit 229*a*, reads out data packet accumulated in the buffer memory 223 (data packet received in a predetermined period of time), and transmits (transfers) the data packet to a node device 2 connected in a lower hierarchy level via the communication unit 229*a*. Moreover, the control unit 221 reads out data packet accumulated in the storage area of the buffer memory 223, indicated by a reproduction pointer, and outputs the data to the accelerator for decryption 224 or to the decoder unit 225 via the bus 229*d*.

[4. Configuration and the Like of Connection Administration Server]

Next, with reference to FIG. 27, configuration and function of the connection server 300 will be explained.

Figure 27:
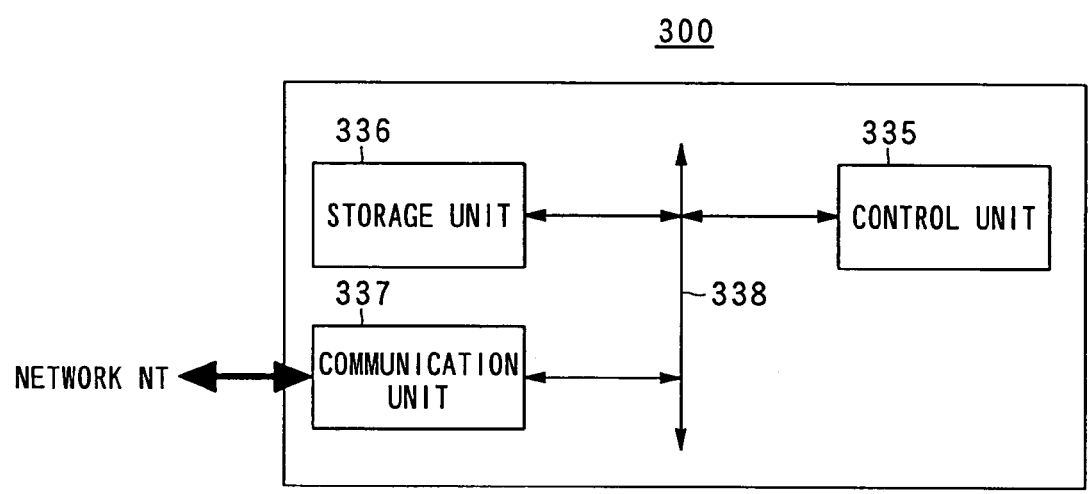
FIG. 27 is a view showing an example of schematic structure of a connection administration server 300.

FIG. 27 is a view for schematically showing an example of structure of the connection administration server 300.

As shown in FIG. 27, the connection administration server 300 is constructed by including a control unit 335 configured by a CPU having computing function, a RAM for work, a control unit 335 configured by a ROM and the like for saving various data and programs (including operating system (OS) and various kinds of application), a memory unit 336 configured by an HDD or the like for saving and storing various data and the like, and a communication unit 337 for controlling communication between the connection administration server 300 and node devices 2 and the like via the network NT, wherein all these elements are connected each other via a bus 338.

In the control unit 336 as device information memory means, a lower level device information memory means, a connection permissible number memory means, a transfer ability memory means, hierarchy position memory means, a participation time memory means, and a lower stream device number memory means, there is configured a network administration database in which location information, affiliation information, connection status information, and the like of the broadcast station device 200 and each of the node devices 2, participating in the tree type network system S are registered.

In the network administration database in the control unit 336, instead of saving affiliate information for every node device, affiliate information may be saved for each sub-tree. In this case, there is included in the affiliate information, for example, information indicating which node device 2 in a sub-tree changes to a node device 2 belonging to other network connection group. This enables to reduce memory capacity of the memory unit 336.

The control unit 335 integrally controls the entire connection administration server 300 when the CPU executes a program saved in the memory unit 336 or the like (including connection administration program of the present invention), and functions as a participation request information receiving means, an affiliation information acquisition means, connection end determining means, a connection end information transmission means, a shift device determining means, a shift destination determining means, a shift destination information transmission means, a re-shift destination determining means, and a re-shift destination information transmission means.

Specifically, when the control unit 335 receives participation request information requesting device information of a node device 2 to be a connection end for a nonparticipating node device from the nonparticipating node device, the control unit 335 acquires affiliation information (for example, AS number) indicating a network connection group, to which the nonparticipating node device belongs as affiliation information acquisition means, determines a broadcast station device 200 or a node device 2 to be a connection end for the nonparticipating node device, based on the acquired affiliation information and affiliation information registered in the network administration database indicating a network connection group, to which the already-participating broadcast station device 200 or the node device 2 belongs (or affiliate information for each sub-tree) as connection end determining means, reads out device information of the broadcast station device 200 or the node device 2 as a connection end (for example, including location information) from the memory unit 335, and transmits the device information as connection end information to the nonparticipating node device.

For example, the control unit 335 as a connection end determining means judges whether device information including affiliation information same as a nonparticipating node device is registered (saved) on the network administration database or not (that is, whether a broadcast station device 200 or a node device 2 belonging to the same network connection group as that of the nonparticipating node device participates in the tree type network system S or not) and when the device information is registered, decides the broadcast station device 200 or the node device 2 corresponding to the device information as connection end. Thus, a nonparticipating node device can be connected to a broadcast station device 200 or a node device 2, belonging to the same network connection group. Therefore, even when a plurality of node devices 2 belonging to different network connection groups such as ISPs participate in the broadcast system, it is possible to configure topology which can reduce the cases where content data is transferred via (over) the IX and, resultantly, it is possible to reduce lacks and delays of data packet.

Meanwhile, when a plurality of device information including the same affiliate information as a nonparticipating node device is registered on the network administration database (for example, when a plurality of node devices 2 belonging to the same network connection group as that of the nonparticipating node device (or when there are a broadcast station device 200 an more than 2 node device 2 belonging to the same network connection group s the nonparticipating node device)), the control unit 335 as connection end determining means narrows one node device 2 (or the broadcast station device 200) from the plurality of node devices 2 (or the one broadcast station device 200 and more than 1 node device 2) and decides the narrowed device as a connection end.

Such narrowing down is carried out based on connection status information registered on the network administration database, and carried out for example by comparing and judging all or a part of judgment elements such as connection permissible number of node devices 2 in lower hierarchy of the broadcast station device 2 or the node device 2, hierarchy of the broadcast station device 2 or the node device 2, transfer ability of the broadcast station device 200 or the node device 2, participation time of the broadcast station device 2 or the node device 2 into the tree type network system S, and number of node device 2, arranged in lower stream tree of the broadcast station device 200 or the node device 2.

More specifically, when narrowing by connection permissible number, from each node devices 2 and the broadcast station device 200, either a node device 2 or the broadcast station device 200, of which number of node devices 2 connected in lower level hierarchy does not reach corresponding connection permissible number, is narrowed. Moreover, in a case of narrowing by hierarchy, among each node devices 2 or the broadcast station device 200, either a node device 2 or the broadcast station device 200, of which hierarchy is in upper hierarchy level than a predetermined standard level (or in the highest level), is narrowed. Further, in a case of narrowing by transfer ability, among each node devices 2 or the broadcast station device 200, either a node device 2 or the broadcast station device 200, of which transfer ability is higher than a predetermined standard level (or the highest level), is narrowed. Furthermore, in a case of narrowing by participation time, among each node devices 2 or the broadcast station device 200, either a node device 2 or the broadcast station device 200, of which participation time is longer than a predetermined standard participation time (or the longest), is narrowed. In a case of narrowing by number of arranged node devices 2 arranged in lower stream tree, among each node devices 2 or the broadcast station device 200, either a node device 2 or the broadcast station device 200, of which number of arranged node devices 2 is lower than a predetermined standard number (or in the lowest), is narrowed (when there are a plurality of lower stream trees in one node device 2 or the broadcast station device 200, one that has fewer number of arranged node devices 2 arranged in the lower trees becomes a target for comparison). Thus, for example, when there are a plurality of node devices 2 belonging to the same network connection group as that of a nonparticipating node device, an appropriate node device 2 or the like is selected from among them and better-balanced and stable topology can be constructed.

Moreover, priority to these judgment elements (e.g. it can be arbitrarily set by an operator) may be set up, judgment elements may be compared and judged sequentially according to the priority (for example, from ones having higher priority) so that node device 2 or the broadcast station device 200 can be narrowed. According to this, better-balanced topology can be configured.

Then, when there are a plurality of node devices 2 having the same affiliate information as that of a nonparticipating node device (or a broadcast station device 200, more than one node device 2) and the number of node devices 2 currently connected to lower hierarchy level of the node device 2 or the like reaches the corresponding connection permissible number, the control unit 335 as a shift device determines a node device 2 which shifts the current connection end out of the node devices 2 connected to the lower hierarchy of the node device; the control unit 335 as a shift destination determining means newly determines a node device 2 to be a new connection end (shift destination) with respect to the node device determined as the shift device; and the control unit 335 as a shift destination information transmission means reads out device information of the node device 2 on the shift end thus determined (e.g. including location information) and transmits the device information to the node device 2 as the shift device thus determined. By this, the nonparticipating node device can participate in the tree type network system S by connecting to the node device 2 thus determined as the connection end.

For example, the control unit 335 as a shift device determining means, when there are a plurality of node devices 2 connected to the lower hierarchy level of the node device 2 or the broadcast station device 200 thus determined to be the connection end, determines one node device 2 from among the plurality of node devices on the basis of connection status information registered on the network administration database (for example, a part or all of number of lower stream devices, transfer ability, and participation time). For example, because a node device 2 having few lower stream devices, a node device 2 having low transfer ability, or a node device 2 having short participation time can be determined to be the shift device, it is possible to construct better balanced and stable topology.

Then, the control unit 335 judges as a re-shifting judging means whether or not to shift a node device 2 as the shift device again on the basis of lower stream device number indicative of number of node devices 2, arranged in the lower stream side of the node device 2 as a shift device, or difference of levels between the hierarchy levels of the node device 2 as the shift device before and after shifting in a case where a nonparticipating node device is connected to a lower hierarchy level of the node device 2 thus determined and the node device 2 as the shift device is connected to the lower hierarchy level of the node device 2 thus determined. Then, in a case where the re-shift is necessary, the control unit 335 reads out device information of the newly participating node device from the memory unit 336, and transmits the read out device information as re-shift destination information to the node device 2 as the shift device. For example, when there are more lower stream devices of the node device 2 as the shift device than predetermined number or the difference of levels between the hierarchy levels of the node device 2 as the shift device before and after shifting is more than the predetermined difference level, the node device 2 as shift device is re-shifted to, for example, a lower hierarchy level of a newly participating node device to be connected thereto. Thus, it is possible to construct a better-balanced and stable topology. It is not preferable to construct a topology in which a specific branch extremely grows because in such the topology, extent of affection to communication error in that branch becomes large. Moreover, in an unbalanced tree, since times of transfer differ in each branch, delay time also differs and difference in playback start time in each node device 2 becomes large. Therefore, this is not preferable depending on the aspect of usage. From such view points, since it is preferable to control the tree so as to have uniform length of branches as much as possible, in the present embodiment, it is controlled so that a lower stream tree of a specific node device 2 (lower branch) does not grow too long or hierarchy level does not get too deep.

FIG. 28 is a view for showing an example of operation of each node device 2 when one node device 2 is selected as a connection end under the condition where there are a plurality of node devices 2 having the same affiliation information as that of a nonparticipating node device, and number of node devices 2 connected to lower hierarchy levels reaches connection permissible number corresponding thereto.

In the example of FIG. 28, it is assumed that a node device 2a is determined as a connection end for a nonparticipating node device. A node device 2c connected to a lower hierarchy level of the node device 2a is connected to a lower hierarchy level of a node device 2o to be a new connection end (shift destination) (FIGS. 28 (A) and (B)), a nonparticipating node device is connected to a lower hierarchy level of the node device 2a as a node device 2x which is newly participating in and subsequently, and the node device 2c is connected (re-shift) to a lower hierarchy level of the newly participating node device 2x, which is re-shifting destination (FIGS. 28 (C) and (D)).

The control unit 335 as shift destination determining means compares and judges connection permissible number of node devices 2, which can be connected to lower hierarchy levels of a node device 2, hierarchy of a node device 2, transfer ability of a node device 2, participation time of the node device 2 in the tree type network system S, and the like, in a manner similar to the case where the control unit 335 functions as connection end determining means, to thereby determine one node device 2 among a plurality of node devices as shift destination.

Moreover, although there is a method to directly change from FIG. 28 (A) to (D), that is, to allow a nonparticipating node device interpose between the node devices 2a and 2c, sudden interposing may cause a buffer of the node device 2x to take time until accumulating data, provided to be transferred to the node device 2c, while disturbing delivery of data to lower tree of the node device 2c. Therefore, it is preferable to connect as shown in FIGS. 28(A) and 28(B). This is because in the node device 2o, data to be transferred are buffered and it is possible to transfer the data without delay. It is judged whether or not a position of the node device 2c is appropriate after once moving a tree including and following after the node device 2c to thereby temporally make the tree escape, and thereafter it is determined whether or not re-shifting shown in FIGS. 28(C) and 28(D) are necessary. Although, in this example, re-shifting is employed, when there is no problem in tree balance, the process may be stopped at FIG. 28 (B).

[5. Operation of Tree Type Network System]

Next, with reference to FIGS. 29 to 32, operation example of the tree type network system will be explained.

Figure 30A:
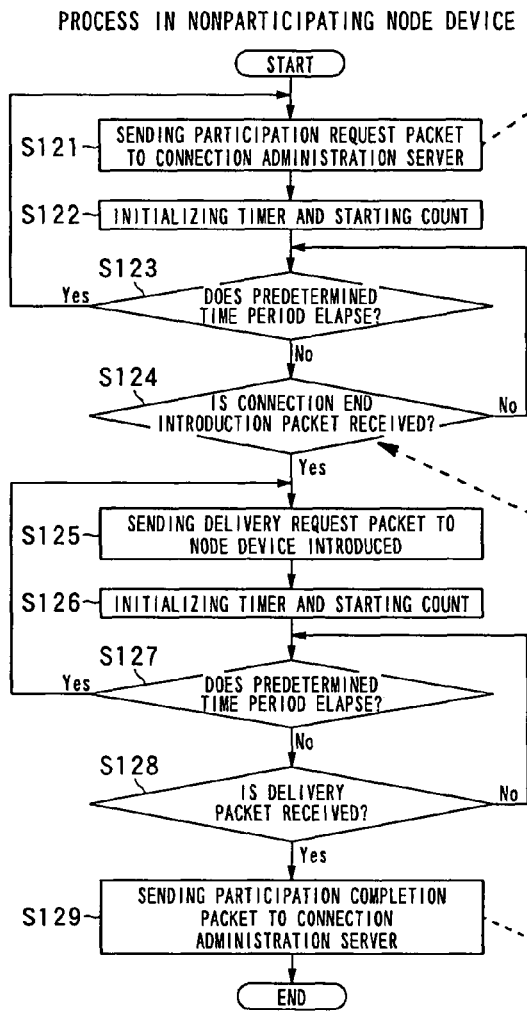
FIG. 30(A) is a flowchart showing registration request process in a control unit 221 of a nonparticipating node device.
Figure 30B:
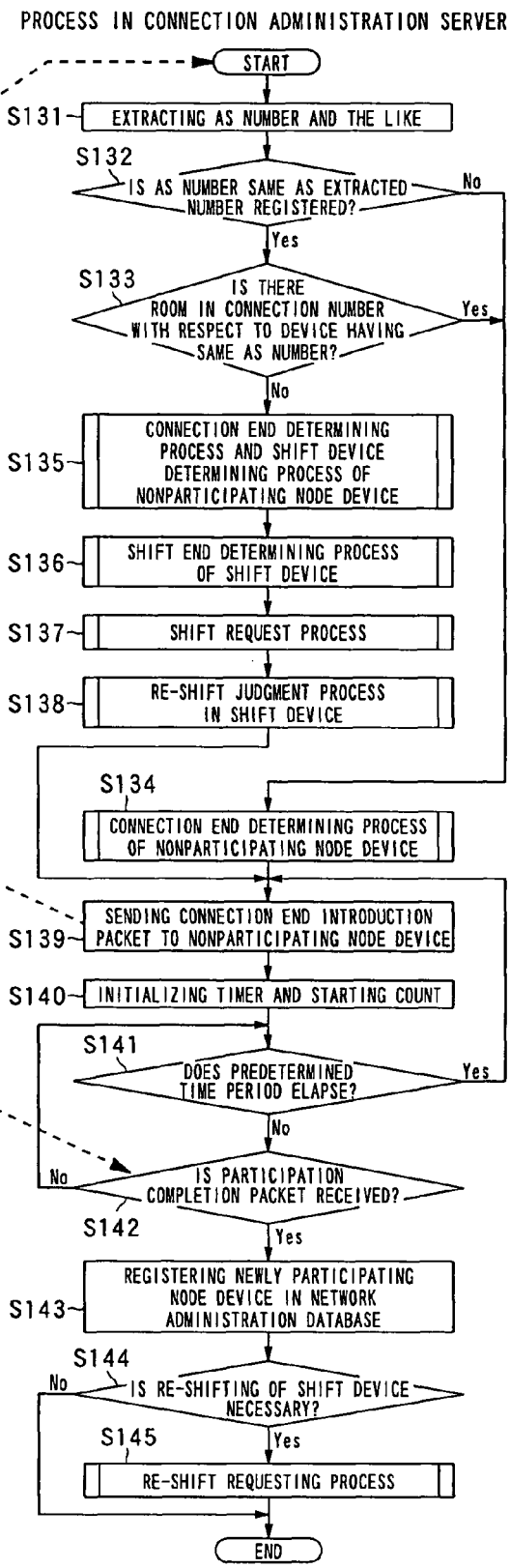
FIG. 30(B) is a flowchart showing registration receiving process in a control unit 335 of the connection administration server 300.

FIG. 29 (A) is a flowchart for showing registration request processing in the control unit 221 of a nonparticipating node device, and FIG. 29 (B) is a flow chart for showing registration reception process in the control unit 335 of the connection administration server 300. FIG. 30 (A) is a flowchart for showing participation request process in the control unit 221 of the nonparticipating node device, and FIG. 30 (B) is a flowchart for showing participation reception process in the control unit 335 of the connection administration server 300. FIG. 31 (A) is a flowchart for showing details of connection end determining process in Steps S34 and S36, shown in FIG. 30 (B), and FIG. 31 (B) is a flowchart for showing details of connection end determining and shift device determining process for the nonparticipating node device in Step S35 shown in FIG. 30 (B). FIG. 32 (A) is a flowchart for showing details of shift request process and re-shift request process in Steps S37 and 45 shown in FIG. 30 (B), FIG. 32 (B) is a flowchart for showing shift process in control unit 221 of a node device 2 as a shift device, and FIG. 32 (C) is a flowchart for showing details of re-shift judgment process of a shift device in Step S38 shown in FIG. 30 (B).

First, with reference to FIG. 29, operation example of a case where a nonparticipating node device performs registration request to the connection administration server 300 will be explained.

The process shown in FIG. 29 (A) is started when registration request instruction from a user of a nonparticipating node device is transmitted via the input unit 229b. First, the control unit 221 acquires IP address and port number of the connection administration server 300 from the IC card 229e, establishes connection with the connection administration server 300 using the IP address and the port number thus acquired as destination IP address and destination port number, transmits registration request packet (including device ID, AS number, IP address, and port number of the nonparticipating node device) to the connection administration server 300 (Step S101), and initializes a timer so that counting is started (Step S102). When a predetermined period of time (for example, several minutes) passes without later-described registration completion packet being transmitted from the connection administration server 300 (Step S103: Yes), the process returns to Step S101 and registration request packet is transmitted to the connection administration server 300 again.

Meanwhile, the control unit 335 of the connection administration server 300 starts process shown in FIG. 29 (B) when registration request packet transmitted from a nonparticipating node device is received, extracts IP address, port number, AS number, and device ID of the nonparticipating node device from the received registration request packet (Step S111), coordinates the IP address, port number, AS number, and device ID thus extracted with each other and registers them in a registration database in the memory unit 222 (Step S112), and transmits (replies) registration completion packet indicative of completion of registration (Step S113), to finish the process.

When the registration completion packet thus transmitted from the connection administration server 300 is received by the control unit 221 of the nonparticipating node device (Step S104: Yes), the control unit 221 notifies the user information that registration is completed (Step S105) by, for example, causing the audio processing unit 217 and the speaker 19 output the information as voice or causes the image processing unit 215 and the display unit 216 to display the information.

When the registration of the nonparticipating node device is thus completed, the nonparticipating node device can participate in the tree type network system S.

Next, with reference to FIGS. 30 to 32, operation example of a case where a nonparticipating node device requests participation to the connection administration server 300 will be explained.

Processing shown in FIG. 30 (A) is started when participation request instruction from a user of a nonparticipating node device is received via the input unit 229b. The control unit 221 of the nonparticipating node device first acquires IP address and port number of the connection administration server 300 from the IC card 229e, establishes connection with the connection administration server 300 using the IP address and the port number thus acquired as destination IP address and destination port number, respectively, transmits participation request packet (including device ID, AS number, IP address, and port number of the nonparticipating node device) to the connection administration server 300 (Step S121), and initializes a timer to start counting (Step S122). When a predetermined period of time passes without later-described connection end introduction packet being transmitted from the connection administration server 300 (Step S123: Yes), the process returns to Step S121, and participation request packet is transmitted to the connection administration server 300 again.

Meanwhile, the control unit 335 of the connection administration server 300 starts process shown in FIG. 30 (B) when the participation request packet transmitted from a nonparticipating node device is received, extracts AS number and the like from the received participation request packet (or may acquire from the registration database) (Step S131), judges whether or not an AS number same as thus extracted AS number is registered on the network administration database of the control unit 336 (Step S132). When registered (Step S132: Y), the control unit 335 specifies (recognizes) the broadcast station device 200 or a node device 2, of which AS number is the same as the extracted AS number, acquires connection status information from the network administration database (stored in RAM), and the process proceeds to Step S133. For example, when it is assumed that the network connection group of the nonparticipating node device is "C", in the example of FIG. 24, the broadcast station device 200, and node devices 2a, 2b and 2d belonging to the network connection group C are specified.

Meanwhile, when the AS number same as the AS number thus extracted is not registered on the network administration database (Step S132: N), that is, when the broadcast station device 200 or a node device 2 belonging to the same network connection group as that of the nonparticipating node device does not exist, connection status information with respect to all the broadcast station device 200 and node devices 2 is acquired from the network administration database (stored in RAM) and the process proceeds to Step S134.

In Step S133, the control unit 335 judges whether there is margin in connection number to the broadcast station device 200 or the node device 2 thus specified (or the broadcast station device 200 and the node device 2), that is, whether or not the number of node devices 2 connected to the lower hierarchy level of the device respectively reaches a connection permissible number corresponding to the device. For example, when it is assumed that connection permissible number of all the broadcast station device 200 and node devices 2 is "2" (though the number can be set for each device), in the example of FIG. 24, since the number of devices connected to the broadcast station device 200 and node devices 2a, 2b, and 2d thus specified reach connection permissible number, it means there is no margin in the connection number.

Then, when there is no margin in the connection number to all the broadcast station device 200 and the node devices 2 thus specified (Step S133: N), since it is necessary to shift the node device 2 currently connected to the lower hierarchy level, the process proceeds to Step S135. In a case where there is margin in the connection number to the broadcast station device 200 and the node devices 2 thus specified (Step S133: Y), the process proceeds to Step S134.

As a premise for connection end determining process for a nonparticipating node device in Step S134, it is assumed that priority order of judgment elements is set. The order of priority of the judgment elements may be arbitrarily determined. In an example of FIG. 31 (A), transfer ability is in the first priority, followed by hierarchy in the second priority and participation time in the third priority.

In the connection end determining process shown in FIG. 31 (A), the control unit 335 first carries out a narrowing process by transfer ability (first priority) (Step S341). In Step S341 in connection end determining process performed when the process proceeds from Step S132 to Step S134, the control unit 335 refers to transfer ability information of all the broadcast station device 200 and the node devices 2 registered on the network administration database, narrows down node devices 2 having transfer ability of a predetermined standard ability value or more (or one having the highest ability), and selects connection end candidates (node devices 2 and the like). Meanwhile, in Step S341 in connection end determining process performed in a case where the process proceeds from Step S133 to Step S134, for example, the control unit 335 refers to transfer ability of the broadcast station device 200 or the node devices 2 (or all the broadcast station device 200 and the node devices 2) thus specified as ones having margin for connection, narrows down node devices 2 having transfer ability of a predetermined standard ability value or more (or one having the highest ability), and selects connection end candidates (node devices 2 and the like).

Subsequently, the control unit 335 judges whether or not a plurality of candidates is selected in Step S341 (Step S342), and in a case where there are a plurality of candidates (Step S342: Y), the process proceeds to Step S343. On the other hand, in a case where there are not a plurality of candidates (Step S342: N), that is, in a case where the candidate is narrowed down to only one broadcast station device 200 or node device 2, the device is determined to be a connection end for the nonparticipating node device.

In Step S343, the control unit 335 carries out narrowing process in use of hierarchy (second priority). For example, the control unit 335 refers to hierarchy information of the plurality of candidates thus selected in Step S341, narrows down node device 2 or the like of which hierarchy level is higher than predetermined standard hierarchy level (or the one of which hierarchy level is the highest), and selects connection end candidates (node device 2 or the like).

Then, the control unit 335 judges whether or not there are a plurality of candidates thus selected in Step S343 (Step S344). In a case where there are a plurality of candidates (Step S344: Y), the process proceeds to Step S345. On the other hand, in a case where there are not a plurality of candidates (Step S344: N), that is, one broadcast station device 200 or one node device 2 is narrowed down, it is determined that the device is the connection end.

In Step S345, the control unit 335 carries out narrowing process by participation time (third priority). For example, the control unit 335 refers to participation time information of the plurality of candidates thus selected in Step S343, narrows down node device 2 or the like of which participation time is longer than predetermined standard participation time (or the one of which participation time is the longest), and selects connection end candidates (node device 2 or the like).

Next, the control unit 335 judges whether or not there are a plurality of candidates thus selected in Step S345 (Step S346). In a case where there are a plurality of candidates (Step S346: Y), the process proceeds to Step S347, randomly selects the broadcast station device 200 or one node device 2 from the plurality of candidates, and determines thus selected device as the connection end for the nonparticipating node device (Step S348). On the other hand, in a case where there are not a plurality of candidates (Step S346: N), that is, one broadcast station device 200 or one node device 2 is narrowed down, the process proceeds to Step S348, and it is determined that the device is the connection end. When the connection end for the nonparticipating node device is thus determined, the process goes back to the process shown in FIG. 30 (B) and proceeds to Step S139.

Although, in Step S348, the broadcast station device 200 or one node device 2 is selected from a plurality of candidates, it is unnecessary to limit to one device, and a plurality of node devices may be selected until the number reaches a certain predetermined number (for example, 5), connection end introduction packet including IP addresses and port numbers of the plurality of node devices 2, which are connection end candidates, may be transmitted to the nonparticipating node device in Step S139 described below, and the nonparticipating node device may select one node device 2 to be the connection end from the plurality of node devices, which are connection end candidates (by, for example, instruction of a user).

Meanwhile, in the connection end determining process for the nonparticipating node device and shift device determining process in Step S135 shown in FIG. 30 (B), as a premise thereof, priority order of judgment elements is set. The order of priority of elements may be arbitrarily decided, and, in an example of FIG. 31 (B), number of arranged node devices 2 in lower stream trees is the first priority, followed by transfer ability as the second priority and participation time as the third priority.

In the connection end determining process for the nonparticipating node device and shift device determining process shown in FIG. 31 (B), the control unit 335 first carries out only narrowing process by the number of arranging node devices 2 in lower stream trees (first priority) (Step S351). For example, the control unit 335 refers to arranged device number in lower tree information of the broadcast station device 200 or a node device 2 (or the broadcast station device 200 and the node device 2), which is specified as one having no margin in the connection number, narrows down a node device 2 and the like having number of arranging node devices 2 inside lower trees being a predetermined standard arrangement number or less (or the one having the smallest arrangement number) from the devices, and selects candidates (node device 2 and the like) on the connection end therefrom. In the example of FIG. 24, among the specifies broadcast station device 200, node devices 2a, 2b, and 2d, node device 2a of which number of arranged devices is lower than the predetermined number of arranged devices of the standard arrangement number or less, for example, of 5 or less, is selected as the connection end candidate.

Subsequently, the control unit 335 judges whether or not there are a plurality of candidates thus selected in Step S351 (Step S352). When there are a plurality of candidates (Step S352: Y), the process proceeds to Step S353. On the other hand, when there are not a plurality of candidates (Step S352: N), that is, one broadcast station device 200 or one node device 2 is narrowed down, it is determined that the device is the connection end.

In Step S353, the control unit 335 performs narrowing process by transfer ability (second priority). For example, the control unit 335 refers to transfer ability of the plurality of candidates thus selected in Step S351, narrows down node devices 2 or the like having transfer ability of a predetermined standard ability value or more (or one having the highest ability), and selects connection end candidates (node devices 2 and the like).

Subsequently, the control unit 335 judges whether or not a plurality of candidates is selected in Step S353 (Step S354), and in a case where there are a plurality of candidates (Step S354: Y), the process proceeds to Step S355. On the other hand, in a case where there are not a plurality of candidates (Step S354: N), that is, in a case where the candidate is narrowed down to only one broadcast station device 200 or node device 2, the device is determined to be a connection end for the nonparticipating node device.

In Step S355, the control unit 335 performs narrowing process by participation time (third priority). For example, the control unit 335 refers to participation time information of the plurality of candidates thus selected in Step S353, narrows down node device 2 or the like of which participation time is a predetermined standard participation time or more (or the one of which participation time is the longest), and selects connection end candidates (node device 2 or the like).

Next, the control unit 335 judges whether or not there are a plurality of candidates thus selected in Step S355 (Step S356). When there are a plurality of candidates (Step S356: Y), the process proceeds to Step S357, randomly selects the broadcast station device 200 or one node device 2 from the plurality of candidates, and determines the selected device as the connection end for the nonparticipating node device (Step S358). On the other hand, in a case where there are not a plurality of candidates (Step S356: N), that is, one broadcast station device 200 or one node device 2 is narrowed down, the process proceeds to Step S358 and it is determined that the device is the connection end.

Next, the control unit 335 determines the node device 2 connected to a lower level hierarchy of (immediately beneath) connection end thus determined as a shift device (Step S359), and goes back to process shown in FIG. 30 (B). Then the process proceeds to Step S136. When it is assumed that the node device 2a shown in FIG. 24 is determined as a connection end for the nonparticipating node device, for example, the node device 2c out of the node devices 2c and 2d, which are connected to the lower hierarchy of the node device 2a, is determined as a shift device to thereby maintain better-balanced and stable topology. Node devices 2g and 2h connected to lower hierarchy level of the node device 2c, determined as the shift device, moves along with the node device 2c.

Connection target determining process of the shift device in Step S136 is carried out in a manner similar to the case where the process moves from Step S132 to 134 as described above. the connection target determining process is carried out as shown in Steps 341 to 348 in FIG. 31 (A), whereby a connection end of a node device 2 determined as the shift device (for example, node device 2c) is determined.

Subsequently, the control unit 335 carries out shift request process (Step S137). In the shift request process, as shown in FIG. 32 (A), the control unit 335 first acquires IP address and port number of a node device 2 determined as a shift device from the network administration database, establishes connection with the node device 2 using the IP address and the port number thus acquired respectively as destination IP address and destination port number, transmits shift destination introduction packet (including IP address and port number of a node device 2 determined as a connection end (shift destination) (for example, node device 2o) in Step S136) to the node device 2 (for example, the node device 2c), initializes a timer, and starts counting (Step S372). When a predetermined period of time (for example, several minutes) elapses without transmission of shift completion packet (described below) from a node device 2 (for example, node device 2c) (Step S373: Y), the process goes back to Step S371, and shift destination introduction packet is again transmitted to the node device 2 (for example, node device 2c).

Meanwhile, the control unit 221 of the node device 2 (for example, node device 2c), upon receipt of a shift destination introduction packet transmitted from the connection administration server 300, starts process shown in FIG. 32 (B), extracts IP address and port number of a node device 2 (for example, node device 2o), which is a shift destination, from the shift destination introduction packet, establishes connection with the node device 2 thus introduced using the IP address and the port number thus acquired respectively as destination IP address and destination port number, (for example, through connection request as shown in FIG. 28 (A)), transmits delivery request packet (including IP address and port number of a node device 2 (for example, node device 2c)) to the node device 2 (Step S151), initializes a timer, and starts counting (Step S152).

Then, when a predetermined period of time (for example, several minutes) elapses without transmission of a delivery packet from the node device 2 (for example, node device 2c) (Step S153: Y), the process goes back to Step S151 and a delivery request packet is again transmitted to the node device 2.

On the other hand, in a case where the control unit 221 of the node device 2 (for example, node device 2c) receives delivery packet from a node device 2 (for example, node device 2o) (Step S154: Y), the control unit 221 cuts off connection with the node device 2a, which is connected to a higher level hierarchy, transmits (replies) a shift completion packet to the connection administration server 300 (Step S155), and finishes the processing.

Then, when the control unit 335 of the connection administration server 300 receives the shift completion packet transmitted from a node device 2 (Step S374: Y), the control unit 335 registers information regarding the node device 2 thus shifted (for example, node device 2c) on the network administration database (for example, update connection status information) (Step S375), and goes back to the process shown in FIG. 30 (B). Then the process proceeds to Step S138.

In the re-shifting judgment process with the shift device in Step S138, as shown in FIG. 32 (C), the control unit 335 of the connection administration server 300 first judges whether or not more than a predetermined number (for example, 10) of other node devices are arranged in a lower stream side of the node device 2 as the shift device or (Step S381). In a case where there are not the predetermined number or more of node devices 2 (Step S381: N), the process proceeds to Step S382. In a case where there are the predetermined number or more of node devices 2 (Step S381: Y), the process proceeds to Step S383 to thereby judge re-shifting of the node device as the shift device is necessary. This information is saved, and the processing goes back to processing shown in FIG. 30 (B).

Then the process proceeds to Step S139. For example, on the lower stream side of the node device 2c as the shift device shown in FIG. 28 (A), two node devices 2g and 2h are arranged (exist).

In Step S382, the control unit 335 judges whether or not there is a predetermined number or more of hierarchy level (for example, 3 layers) between hierarchy levels before and after shifting the node device 2 as the shift device. In a case where there is not the predetermined number or more of difference (Step S382: N), the process goes back to process shown in FIG. 30 (B). In a case where there is the predetermined number or more of difference in hierarchy levels (Step S382: Y), the process moves to Step S383 to thereby judge that re-shifting of the node device as the shift device is necessary, and saves this information. Then the process goes back to what shown in FIG. 30 (B). The reason why such re-shifting of a shift device is required is that when there are too many node devices 2 arranged on the lower stream side, the hierarchy level on an overlay network becomes too many (too deep), and transfer of a packet is unstably carried out (for example, there are many lacked packets that do not reach lower stream).

Then, the process goes back to the process in FIG. 30 (B) In Step S139, the control unit 335 of the connection administration server 300 transmits a connection end introduction packet including IP address and port number of a node device 2 (for example, the node device 2a) on the connection end thus determined to a nonparticipating node device 2 (Step S139), initializes a timer, and starts counting (Step S140). In a case where a predetermined period of time elapses without transmission of participation completion packet described below (Step S141: Y), the process goes back to Step S139, and a connection end introduction packet is again transmitted to the nonparticipating node device.

Meanwhile, after the control unit 221 of the nonparticipating node device receives the connection end introduction packet thus transmitted from the connection administration server 300 (Step S124: Y), the control unit 221 extracts IP address and port number of a node device 2 (for example, node device 2a), which is a connection end, from the connection end introduction packet, establishes connection with the node device 2 (for example, node device 2a) thus introduced using the IP address and the port number thus acquired respectively as destination IP address and destination port number (for example, through connection request as shown in FIG. 28 (A)), transmits a delivery request packet (including IP address and port number of the nonparticipating node device) to the node device 2 (Step S125), initializes a timer, and starts counting (Step S126).

Then, in a case where a predetermined period of time (for example, several minutes) elapses without transmission of delivery packet from the node device 2 (for example, node device 2a) (Step S127: Y), the process goes back to Step S125 and a delivery request packet is again transmitted to the node device 2.

On the other hand, in a case where the control unit 221 of the nonparticipating node device receives delivery packet from a node device 2 (for example, node device 2a) (Step S128: Y), the control unit 221 transmits (replies) a shift completion packet to the connection administration server 300 (Step S129), and finishes the process.

Then, in a case where the control unit 335 of the connection administration server 300 receives a participation completion packet transmitted from a node device 2 (Step S142: Y), the control unit 335 registers information regarding the nonparticipating node device (that is, location information, affiliation information, and connection status information) on the network administration database as information of a newly participated node device (Step S143).

Subsequently, the control unit 335 of the connection administration server 300 judges whether or not re-shifting of the node device 2 as a shift device is necessary (Step S144). In a case where re-shifting is not necessary (Step S144: N), the process is finished. On the other hand, in a case where re-shifting is necessary (that is, when it is judged that re-shifting is necessary in the process of above-mentioned Step S138) (Step S144: Y), re-shifting request process shown in Step S145 is carried out.

Figure 28A:
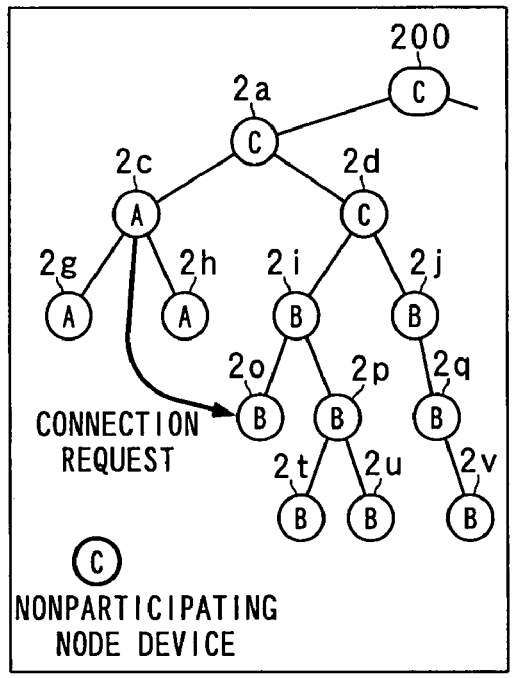
FIG. 28 is a view showing an example of a case where there are a plurality of node devices 2 of which affiliate information is the same as that of a nonparticipating node device and the number of the node devices 2 currently connected to lower hierarchy levels of each node device 2 reaches corresponding connection permissible number.
Figure 28B:
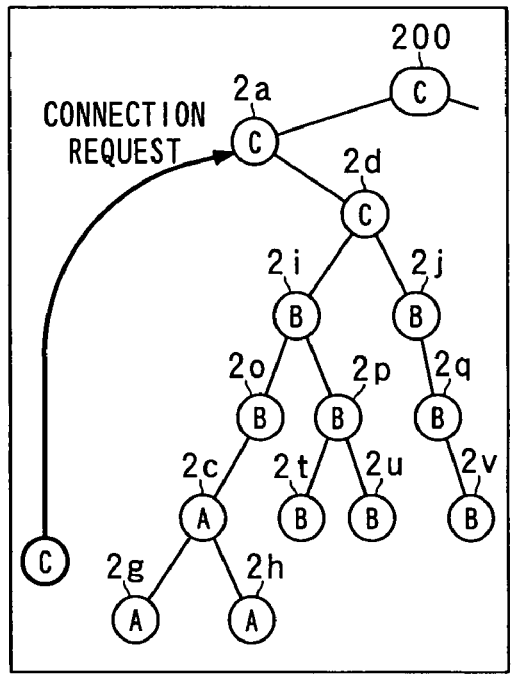
Figure 28D:
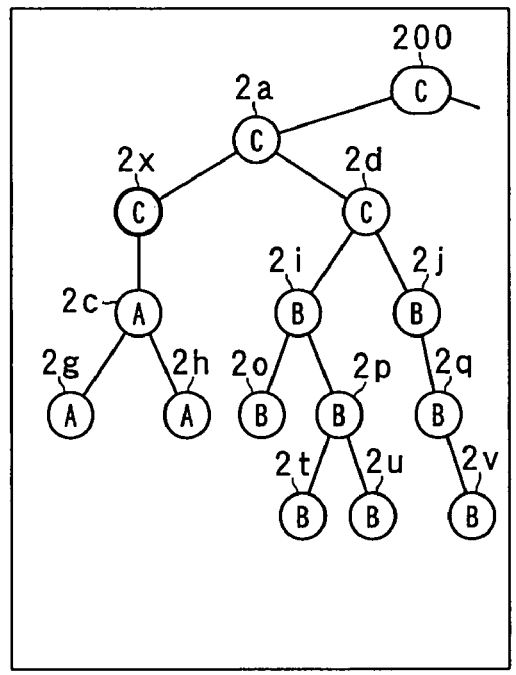
Figure 28C:
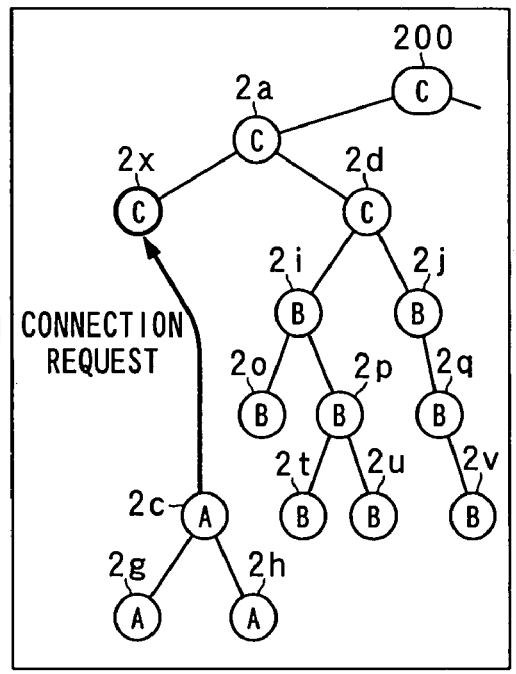

In the re-shifting request process, as shown in FIG. 32 (A), the control unit 335 first determines that a newly participated node device, having information registered in above-mentioned Step S143, as a re-shifting destination, and transmits a shift destination introduction packet including IP address and port number of the newly participated node device to a node device 2 as the shift device (for example, node device 2c) (Step S371). Since the following process is same as that in above-mentioned Step S137, explanation thereof is omitted. By such the process, for example as shown in FIGS. 28(C) and 28(D), the node device 2c as the shift device is connected to a lower level hierarchy of a newly participated node device 2x.

As a re-shifting destination for a node device 2 as the shift device (for example, the node device 2c), instead of a newly participated node device, it is possible to construct such that node devices which have an identical AS number are extracted, one or more of the node devices thus extracted are subjected to the process of Steps S341 to S348 to thereby determine a re-shifting destination.

As explained above, according to the second embodiment, when a nonparticipating node device participates in the tree type network system S, a node device 2 having a network connection group same as that of the nonparticipating node device is determined as a connection end of the nonparticipating node device. Therefore, a topology that reduces events that content data are transmitted through (over) IX can be constructed even when a plurality of node devices respectively belonging to different network connection groups such as ISP participate in the tree type network system S. Accordingly, it is possible to reduce lack or delay of data packets.

Moreover, in a case where there are a plurality of node devices 2 belonging to a network connection group same as that of a nonparticipating node device, based on connection status information registered on the network administration database, for example, all or a part of judgment elements, such as connection permissible number of node devices 2 which can be connected to a lower hierarchy of a broadcast station device 200 or a node device 2, hierarchy level of the broadcast station device 200 or the node device 2, transfer ability of the broadcast station device 200 or the node device 2, participation time of the broadcast station device 200 or the node device 2 in the tree type network system S, and number of arranged node devices 2 in a lower tree of the broadcast station device 200 or the node device 2 are compared and judged to determine one connection end. Therefore, it is possible to construct a better-balanced and stable topology.

The present invention is not confined to the configuration listed in the foregoing embodiments, but it is easily understood that the person skilled in the art can modify such configurations into various other modes, within the scope of the present invention described in the claims.

What is claimed is:

1. A tree type network system comprising an information delivery device for delivering delivery information, a plurality of node devices for receiving the delivery information, and an administration device for receiving participation request information indicative of participation request transmitted from the node device in response to participating in the system by the node device,
  wherein the plurality of node devices are connected in a tree-like shape via a communication route and configure a plurality of hierarchy levels,
  and the information delivery device is positioned in the uppermost hierarchy level and the delivery information transmitted from the information delivery device is sequentially transferred from the node device in the uppermost hierarchy level to the node devices in lower hierarchy levels,
  wherein the administration device comprising:
  a saving unit that saves device information indicating location in a network with respect to attribute information indicating attribute of the node device;
  a participation request information receiving unit that receives the participation request information from a first node device to participate in the tree type network system;
  an attribute information acquisition unit configured to acquire the attribute information of the first node device;
  a connection candidate information determining unit that is configured to determine the device information from the device information of the information delivery device and the device information of the node device saved by the saving unit, as a candidate node device to be connected to the first node device, on the basis of the acquired attribute information by the attribute information acquisition unit; and
  a candidate information transmission unit that transmits the device information of the candidate node device determined to the first node device,
  wherein the first node device comprising:
  a participation request information transmission unit that transmits the participation request information to the administration device in response to participating in the tree type network system;
  a candidate information receiving unit that receives the device information of the candidate node device transmitted from the administration device; and
  a connection request information transmission unit that transmits connection request information indicative of requesting connection to the candidate node device or to the information delivery device;
  wherein at least one of the plurality of the node devices comprising:
  a connection request information receiving unit that receives the connection request information transmitted from the first node device;
  a judgment unit configured to judge whether the node device received the connection request information by the connection request information receiving unit is to be connected to the first node device; and
  a node device connection unit that is configured to connect the first node device, and transmit the delivery information to the first node device in response to judging that the first node device should be connected by the judgment unit;
  a child node device saving unit that is configured to save device information of a child node device which is the node device connected as a lower level hierarchy of the first node device;
  a child node device selection unit that is configured to select at least one child node device by determining a lower level priority order of the child node devices on the basis of device information of the child node device, saved in the child node device saving unit, in response to determining that a number of the child node devices exceeds a delivery permissible number of the first node device;
  a child node device disconnection unit that is configured to disconnect connection between the child node device selected by the child node device selection unit and the first node device; and
  a candidate information transmission unit that is configured to transmit device information of the child node device saved in the child node device saving unit as candidate information to the child node device selected by the child node device selection unit.

2. A node device in a tree-type network system comprising an information delivery device for delivering delivery information, a plurality of node devices for receiving the delivery information, and an administration device for receiving participation request information indicative of participation request transmitted from the node device in response to participating in the system by the node device,
  wherein the plurality of node devices are connected in a tree-like shape via a communication route and configure a plurality of hierarchy levels,
  and the information delivery device is positioned in the uppermost hierarchy level and the delivery information transmitted from the information delivery device is sequentially transferred from the node device in the uppermost hierarchy level to the node devices in lower hierarchy levels,
  at least one of the plurality of the node devices comprising:
  a connection request information receiving unit that receives the connection request information transmitted from a first node device, wherein the first node device transmits connection request information indicative of requesting connection to at least one candidate node device or to the information delivery device, the candidate node device indicating that candidates of connecting;
  a judgment unit that is configured to judge whether the node device received the connection request information by the connection request information receiving unit is to be connected to the first node device;
  a node device connection unit that is configured to connect the first node device and transmits the delivery information to the first node device in response to judging that the first node device should be connected by the judgment unit,
  a child node device saving unit that is configured to save device information of a child node device which is the node device connected as a lower level hierarchy of the first node device;
  a child node device selection unit that is configured to select at least one child node device by determining a lower level priority order of the child node devices on the basis of device information of the child node device, saved in the child node device saving unit, in response to determining that a number of the child node devices exceeds a delivery permissible number of the first node device;
  a child node device disconnection unit that is configured to disconnect connection between the child node device selected by the child node device selection unit and the first node device; and
  a candidate information transmission unit that is configured to transmit device information of the child node device saved in the child node device saving unit as candidate information to the child node device selected by the child node device selection unit.

3. The node device according to claim 2,
wherein the judgment unit comprising a comparison unit that is configured to compare upper level adequacy of the node device with the upper level adequacy of the first node,
wherein, as a result of the comparison, in response to judging that the upper adequacy of the node device is more than the upper level adequacy of the first node, the node device connection unit connects the judged node device.

4. The node device according to claim 2, further comprising:
a parent candidate device saving unit that is configured to save the device information of the candidate node device received by the candidate information receiving unit as parent candidate device information; and
a parent device selection unit that is configured to select at least one parent device from the parent candidate device information saved in the parent candidate device saving unit,
wherein the connection request information transmission unit transmits the connection request information to a parent device selected by the parent device selection unit.

5. The node device according to claim 4,
wherein the parent candidate device saving unit saves device information of all of the node devices, existing on a communication route from the information delivery device to the node device, and
the parent device selection unit determines upper level priority order of the node devices based on the device information saved as the parent candidate device information and selects the node device of the highest upper level priority order.

6. The node device according to claim 2, further comprising:
a parent candidate device saving control unit that is configured to add device information of the first node device to the parent candidate device information saved in a parent candidate device saving unit, when as a result of comparison by the comparison unit upper level adequacy of the node device is lower than that of the first node device; and
a parent device disconnection unit that is configured to disconnect connection with a node device, connected as a parent device.

7. The node device according to claim 3, further comprising:
a top node device replacement notifying unit that is configured to notify an issue that the first node device becomes an uppermost node device concerning attribute information in place of the node device to the administration device in a case where, as a result of comparison by the comparison unit, upper level adequacy of the node device is lower than that of the first node device; the attribute information of the node device is same as the attribute information of the first node device; and the node device is a top node device being a node device in the uppermost level.

8. The node device according to claim 2,
wherein when the candidate information is received from other node device, a parent candidate device saving control unit adds device information of the node device concerning the candidate information to a parent candidate device information saved in a parent candidate device saving unit.

9. The node device according to claim 3,
wherein the upper level adequacy concerning the node device is determined on the basis of at least any one of delivery ability of the node device, or number of descendant node devices from one connected immediately beneath the node device to a node device in the lowest level hierarchy.

10. The node device according to claim 9,
wherein the upper level adequacy becomes higher as the delivery ability becomes higher, and the upper level adequacy becomes higher as the number of descendant node devices becomes smaller.

11. The node device according to claim 2,
wherein the parent device selection unit determines the upper level priority order on the basis of at least any one of attribute information regarding each of the device information saved as parent candidate device information in the parent candidate device saving unit, the delivery ability, number of hierarchy levels in the tree type network system, and number of descendant node devices, and
the child node device selection unit determines the lower level priority order on the basis of at least one of the attribute information regarding device information of the child node device, saved in the saving unit, the delivery ability, and number of the descendant node devices.

12. The node device according to claim 11,
wherein the parent device selection unit determines the upper level priority on the basis of two or more of the attribute information having weight added thereto, the delivery ability, number of hierarchy levels in the tree type network system, and number of the descendant node devices; and
the child node device selection unit determines the lower level priority order on the basis of two or more of the attribute information having weight added thereto, the delivery ability, and the number of the descendant node devices.

13. The node device according to claim 9,
wherein the delivery ability of the node device is determined on the basis of at least any one of processing ability of the node device, effective bandwidth of the communication route appended to the node device, participation time duration when the node device participates in the tree type network system, and the amount of the delivery information already received and still retained.

14. The node device according to claim 7,
wherein the attribute information in affiliate information indicative of a network connection service group to which a node device belongs in the network.

15. The node device according to claim 7,
wherein the attribute information is AS number.

16. A non-transitory computer-readable recording medium recording a node device control program to be performed in a node device in a tree type network system comprising an information delivery device for delivering delivery information, a plurality of node devices for receiving the delivery information, and an administration device for receiving participation request information indicative of participation request transmitted from the node device in response to participating in the system by the node device, wherein the plurality of node devices are connected in a tree-like shape via a communication route and configure a plurality of hierarchy levels, and the information delivery device is positioned in the uppermost hierarchy level and the delivery information transmitted from the information delivery device is sequentially transferred from the node device in the uppermost hierarchy level to the node devices in lower hierarchy levels, the program causing a computer of at least one of the plurality of the node device executes receiving the connection request information transmitted from a first node device, wherein the first node device transmits connection request information indicative of requesting connection to at least one candidate node device or to the information delivery device, and the candidate node device indicating that candidates of connecting;

judging whether the node device received the connection request information by the connection request information receiving unit is to be connected to the first node device; and connecting the first node device and transmits the delivery information to the first node device in response to judging that the first node device should be connected;

selecting at least one child node device by determining a lower level priority order of child node devices on the basis of device information of the child node device, saved in a child node device saving unit saving device information of the child node device which is the node device connected as a lower level hierarchy of the first node device, in response to determining that a number of the child node devices exceeds a delivery permissible number of the first node device;

disconnecting connection between the selected child node device and the first node device; and transmitting device information of the child node device saved in the child node device saving unit as candidate information to the selected child node device.

17. An information delivery method in a tree type network system comprising an information delivery device for delivering delivery information, a plurality of node devices for receiving the delivery information, and an administration device for receiving participation request information indicative of participation request transmitted from the node device in response to participating in the system by the node device, wherein the plurality of node devices are connected in a tree-like shape via a communication route and configure a plurality of hierarchy levels, and the information delivery device is positioned in the uppermost hierarchy level and the delivery information transmitted from the information delivery device is sequentially transferred from the node device in the uppermost hierarchy level to the node devices in lower hierarchy levels, the information delivery method comprising:

receiving the connection request information transmitted from a first node device, wherein the first node device transmits connection request information indicative of requesting connection to at least one candidate node device or to the information delivery device, and the candidate node device indicating that candidates of connecting;

judging whether the node device received the connection request information by the connection request information receiving unit is to be connected to the first node device; and connecting the first node device and transmits the delivery information to the first node device in response to judging that the first node device should be connected in the aforementioned judging step;

selecting at least one child node device by determining a lower level priority order of child node devices on the basis of device information of the child node device, saved in a child node device saving unit saving device information of the child node device which is the node device connected as a lower level hierarchy of the first node device, in response to determining that a number of the child node devices exceeds a delivery permissible number of the first node device;

disconnecting connection between the selected child node device and the first node device; and transmitting device information of the child node device saved in the child node device saving unit as candidate information to the selected child node device.

18. A connection administration device which manages connection status between a broadcast device and a plurality of node devices which acquire broadcasted broadcast information, the broadcast device broadcasts broadcast information through an overlay network comprised by the plurality of the node devices connected to at least either a first network or a second network, the second network including a plurality of the first networks, the connection administration device comprising:

a first saving unit that saves location information indicating location of the node devices in a network, and network information indicating the first network to which the node device connects, wherein the network information is provider information indicating network connection service provider of the first network, and the location information and the network information are correlated to each other;

a participation request information receiving unit that receives participation request information indicative of requesting of participating in the overlay network in the network, from a first node device which newly participates in the overlay network;

a network information acquisition unit configured to acquire the provider information of the first node device, as the network information of the first node device;

a connection determining unit configured to determine a second node device whose location information corresponding to the provider information is same as the provider information of the first node device, on the basis of the provider information saved in the first saving unit and the provider information acquired by the network information acquisition unit, wherein the first node device is to be connected to the second node device; and a connection node information transmission unit that transmits the location information of the second node device determined by the connection determining unit, to the first node device.

19. The connection administration device according to claim 18, wherein the first saving unit saves location information indicating location of the broadcast device and location of the first network to which the broadcast device is connected, wherein the location information of the broadcast device and the network information are correlated to each other;

the connection determining unit determines the second node device or the broadcast device whose the location information corresponding to the network information same as the network information of the first node device, wherein the first node device is to connect to the second node device or the broadcast device.

20. The connection administration device according to claim 18,
wherein the first network is AS (Autonomous System) or ISP (Internet Service Provider), the second network is Internet,
the first saving unit saves AS number assigned to the network of AS or ISP to which the node device is connected, as the network information,
the network information acquisition unit acquires the AS number corresponding to the first node device,
the connection determining unit determines a second node device whose the location information corresponding to the AS number same as the AS number of the first node device on the basis of the AS number saved in the first saving unit and the AS number acquired by the network information acquisition unit, wherein the first node device is to be connected to the second node device.

21. The connection administration device according to claim 18,
the connection form of the node device in the overlay network, is hierarchical structure form in which the plurality of the node devices are connected to,
a second saving unit configured to save lower level device information indicating the node device which are connected to lower hierarchy level of each of the node device and the broadcast device for the node device and the broadcast device participating in the overlay network; and
a third saving unit configured to save connection permissible number which indicates the number of node devices which can be connected to the lower level hierarchy of the node device and the broadcast device for the node device and the broadcast device participating in the overlay network; wherein
in response to saving a plurality of the location information including the network information same as the network information of the first node device in the first saving unit, the connection determining unit determines, on the basis of the lower level device information saved in the second saving unit, any of the second node device or the broadcast device from the broadcast device or plurality of the second node devices whose network information is same as the network information of the first node device, of which number of node devices connected to the lower hierarchical level does not reach the connection permissible number in the third saving unit, wherein the first node device is to be connected to the second node device or the broadcast device.

22. The connection administration device according to claim 18,
the connection form of the node device in the overlay network, is hierarchical structure form in which the plurality of the node devices are connected to,
a fourth saving unit configured to save transfer ability for transferring the broadcasted information to the other node device for the node device and the broadcast device participating in the overlay network, and
in response to saving a plurality of the location information including the network information same as the network information of the first node device in the first saving unit, or in response to not saving the location information including the network information same as the network information of the first node device in the first saving unit, the connection determining unit determines a second node device on the basis of the transfer ability saved in the fourth saving unit, wherein the first node device is to be connected to the second node device.

23. The connection administration device according to claim 22,
wherein the connection determining unit determines a second node device or the broadcast device of which transfer ability is set in advance to be above standard ability value, wherein the first node device is to be connected to the second node device or the broadcast device.

24. The connection administration device according to claim 18,
the connection form of the node device in the overlay network, is hierarchical structure form in which each of the node devices are connected to,
a hierarchy level position saving unit configured to save hierarchy levels in the hierarchy structure for the node device and the broadcast device participating in the overlay network, and
in response to saving a plurality of the location information including the network information same as the network information of the first node device in the first saving unit, or in response to not saving the location information including the network information same as the network information of the first node device in the first saving unit, the connection determining unit determines a second node device on the basis of the hierarchy levels saved in the hierarchy level position saving unit, wherein the first node device is to be connected to the second node device.

25. The connection administration device according to claim 18,
the connection form of the node device in the overlay network, is hierarchical structure form in which each of the node devices are connected to,
a fifth saving unit configured to save a participation time in the overlay network for the plurality of the node device, and
in response to saving a plurality of the location information including the network information same as the network information of the first node device in the first saving unit, or in response to not saving the location information including the network information same as the network information of the first node device in the first saving unit, the connection determining unit determines a second node device on the basis of the participation time thus saved in the fifth saving unit, wherein the first node device is to be connected to the second node device.

26. The connection administration device according to claim 18,
the connection form of the node device in the overlay network, is hierarchical structure form in which each of the node devices are connected to,
a second saving unit configured to save lower level device information indicating the node device which are connected to lower hierarchy level of the node device and the broadcast device for the node device and the broadcast device already participating in the broadcast system;
a sixth saving unit configured to save connection permissible number which indicates the number of node devices which can be connected to the lower level hierarchy of the node device and the broadcast device for the node device and the broadcast device already participating in the broadcast system;
a shift device determining unit configured to determine a node device, as a shift device, to which current connection is shifted from among the node devices connected to the lower hierarchy level of the node device or the broadcast device determined to be connected to, in response to, the number of node devices connected to the lower hierarchy level of the node device or the broadcast device determined to be connected to, already reaches the connection permissible number;

a shift destination determining unit configured to newly determine a second node device to which the shift device is connected; and a shift destination information transmission unit configured to read out the device information of the second node device from the device information saving unit and transmit the information as shift destination information to the shift device.

27. The connection administration device according to claim 26, a seventh saving unit configured to save lower device number indicating number of the node devices arranged on the lower stream side for the node device is further comprised, in response that there are a plurality of node devices connected to the lower hierarchy level of the node device or the broadcast device determined to be connected to, the shift device determining unit determines one node from among the node devices connected to the lower hierarchy level of the node device or the broadcast device determined to be connected to, as the shift device, on the basis of the lower device number, saved in the lower device number saving unit.

28. The connection administration device according to claim 26, further comprising:

a fourth saving unit configured to save transfer ability for transferring the broadcasted information to other node device for the node device and the broadcast device already participating in the overlay network is further comprised;

in response to there are a plurality of node devices connected to the lower hierarchy level of the node device or the broadcast device determined to be connected to, the shift device determining unit determines one node from among the node devices connected to the lower hierarchy level of the node device or the broadcast device determined to be connected to, as the shift device, on the basis of the transfer ability saved in the fourth saving unit.

29. The connection administration device according to claim 26, a fifth saving unit configured to save participation time in the overlay network for the node device is further comprised:

in response that there are a plurality of node devices connected to the lower hierarchy level of the node device or the broadcast device determined to be connected to, the shift device determining unit determines one node from among the node devices connected to the lower hierarchy level of the node device or the broadcast device determined to be connected to, as the shift device, on the basis of the participation time saved in the fifth saving unit.

30. The connection administration device according to claim 26, further comprising:

a seventh saving unit configured to save lower stream device number indicating number of node devices arranged on the lower stream side for the node device;

a re-shift judgment unit configured to judge whether the shift device is moved again or not on the basis of the lower stream device number saved in the seventh saving unit, in response that the first node device is connected to the lower hierarchy level of the node device determined by the connection determining unit and the shift device is connected to the lower hierarchy level of the node device thus determined by the shift destination determining unit; and a re-shift target information transmission unit configured to read out the location information of the first node device from the first saving unit and to transmit the location information to the shift device in response to it is judged by the re-shift judgment unit that the shift device is moved.

31. The connection administration device according to claim 26, further comprising:

an eighth saving unit configured to save hierarchy level in the hierarchy structure for the node device and the broadcast device already participating in the overlay network;

a re-shift judgment unit configured to judge whether the shift device is moved again or not on the basis of a difference in hierarchy level between before and after shifting the shift device in response that the first node device is connected to the lower hierarchy level of the node device determined by the connection determining unit and the shift device is connected to the lower hierarchy level of the node device determined by the shift destination determining unit; and re-shift target information transmission unit configured to read out the location information of the first node device from the first saving unit and to transmit the location information to the shift device in response that it is judged by the re-shift judgment unit that the shift device is moved.

32. The connection administration device according to claim 26, wherein, the connection form of the overlay network, is a tree shape structure in which each of the node devices are connected and the broadcast device is located on the top of the tree shape structure, the broadcast system is configured to sequentially transfer the broadcast information broadcasted from the broadcast device by the node devices.

33. A connection administration method of a connection administration device which manages connection status between a broadcast device and a plurality of node devices which acquire broadcasted broadcast information, the broadcast device broadcasts broadcast information through an overlay network comprised by the plurality of the node devices connected to at least either a first network or a second network, the second network including a plurality of the first networks, the connection administration device comprises a saving unit saves location information indicating location of the node devices in a network, and network information indicating the first network to which the node device connects, wherein the network information is provider information indicating network connection service provider of the first network, and the location information and the network information are correlated to each other;

the connection administration method comprising:

receiving participation request information indicative of requesting of participating in the overlay network, from a first node device which newly participates in the overlay network;

acquiring the provider information of the first node device, as the network information of the first node device;

determining a second node device whose location information corresponding to the provider information is same as the provider information of the first node device, on the basis of the provider information saved in the saving unit and the acquired provider information of the first node device, wherein the first node device is to be connected to the second node device; and transmitting the location information of the determined second node device, to the first node device.

34. A non-transitory computer-readable recording medium recording a connection administration device control program to be performed in a connection administration device which manages connection status between a broadcast device and a plurality of node devices which acquire broadcasted broadcast information, the broadcast device broadcasts broadcast information through an overlay network comprised by the plurality of the node devices connected to at least either a first network or a second network, the second network including a plurality of the first networks, the connection administration device comprises a saving unit saves location information indicating location of the node devices in a network, and network information indicating the first network to which the node device connects, wherein the network information is provider information indicating network connection service provider of the first network, and the location information and the network information are correlated to each other;

the program causing a computer of the connection administration device executes:

receiving participation request information indicative of requesting of participating in the overlay network, from a first node device which newly participates in the overlay network;

acquiring the provider information of the first node device, as the network information of the first node device;

determining a second node device whose location information corresponding to the provider information is same as the provider information of the first node device, on the basis of the provider information saved in the saving unit and the acquired provider information of the first node device, wherein the first node device is to be connected to the second node device; and transmitting the location information of the determined second node device, to the first node device.

35. A broadcast system comprising a broadcast device broadcasts broadcast information through an overlay network comprised by a plurality of node devices connected to at least a first network or a second network, a plurality of the node devices which acquire broadcasted broadcast information, and a connection administration device which manages connection status between the broadcast device, the second network including a plurality of the first networks, wherein the connection administration device comprising:

a location information saving unit that saves location information indicating location of the node devices in a network, and network information indicating the first network to which the node device connects, wherein the network information is provider information indicating network connection service provider of the first network, and the location information and the network information are correlated to each other;

a participation request information receiving unit that receives participation request information indicative of requesting of participating in the overlay network, from a first node device which newly participates in the overlay network;

a network information acquisition unit configured to acquire the provider information of the first node device, as the network information of the first node device;

a connection determining unit configured to determine a second node device whose location information corresponding to the provider information is same as the provider information of the first node device, on the basis of the provider information saved in the first saving unit and the provider information acquired by the network information acquisition unit, wherein the first node device is to be connected to the second node device; and a connection node information transmission unit that transmits the location information of the second node device determined by the connection determining unit, to the first node device.

36. A broadcast method executed in a broadcast system including a broadcast device broadcasts broadcast information through an overlay network comprised by a plurality of node devices connected to at least either a first network or a second network, a plurality of the node devices which acquire broadcasted broadcast information, and a connection administration device which manages connection status between the broadcast device, the second network including a plurality of the first networks, the connection administration device comprises a location information saving unit that saves location information indicating location of the node devices in a network, and network information indicating the first network to which the node device connects, wherein the network information is provider information indicating network connection service provider of the first network, and the location information and the network information are correlated to each other;

the broadcast method comprising:

receiving participation request information indicative of requesting of participating in the overlay network in the network, from a first node device which newly participates in the overlay network;

acquiring the provider information of the first node device, as the network information of the first node device;

determining a second node device whose location information corresponding to the provider information is same as the provider information of the first node device, on the basis of the provider information saved in the location information saving unit and the acquired provider information of the first node device, wherein the first node device is to be connected to the second device;

transmitting the location information of the determined second node device, to the first node device; and broadcasting the broadcast information to the first node device, after the first node device participating in the overlay network on the basis of the location information.

* * * * *